US011314766B2

(12) United States Patent
LeTourneau

(10) Patent No.: US 11,314,766 B2
(45) Date of Patent: *Apr. 26, 2022

(54) METHOD AND/OR SYSTEM FOR MANIPULATING TREE EXPRESSIONS

(71) Applicant: Robert T. and Virginia T. Jenkins as Trustees of the Jenkins Family Trust Dated Feb. 8, 2002, Sacramento, CA (US)

(72) Inventor: Jack J. LeTourneau, Ventura, CA (US)

(73) Assignee: Robert T. and Virginia T. Jenkins, Sacramento, CA (US), as Trustees of the Jenkins Family Trust dated Feb. 8, 2002

( * ) Notice: Subject to any disclaimer, the term of this patent is extended or adjusted under 35 U.S.C. 154(b) by 5 days.

This patent is subject to a terminal disclaimer.

(21) Appl. No.: 16/379,674

(22) Filed: Apr. 9, 2019

(65) Prior Publication Data

US 2019/0236078 A1    Aug. 1, 2019

Related U.S. Application Data

(63) Continuation of application No. 15/250,118, filed on Aug. 29, 2016, now Pat. No. 10,325,031, which is a continuation of application No. 14/635,836, filed on Mar. 2, 2015, now Pat. No. 9,430,512, which is a continuation of application No. 14/086,837, filed on Nov. 21, 2013, now Pat. No. 9,043,347, which is a continuation of application No. 12/578,411, filed on (Continued)

(51) Int. Cl.
*G06F 16/25* (2019.01)
*G06F 16/2453* (2019.01)
*G06F 16/901* (2019.01)
*G06F 16/22* (2019.01)
*G06F 16/28* (2019.01)
*G06F 16/21* (2019.01)

(52) U.S. Cl.
CPC ......... *G06F 16/258* (2019.01); *G06F 16/211* (2019.01); *G06F 16/2246* (2019.01); *G06F 16/24535* (2019.01); *G06F 16/282* (2019.01); *G06F 16/9027* (2019.01); *Y10S 707/99942* (2013.01)

(58) Field of Classification Search
CPC ......... G06F 17/30327; G06F 17/30292; G06F 17/30961; G06F 17/30589; G06F 17/30451; G06F 17/30569; G06F 16/2246; G06F 16/282; G06F 16/211; G06F 16/9027; G06F 16/24535; G06F 16/258; Y10S 707/99942
USPC .......................................................... 707/756
See application file for complete search history.

(56) References Cited

U.S. PATENT DOCUMENTS 3,201,701 A    8/1965   Maitra
3,704,345 A   11/1972   Coker
(Continued)

OTHER PUBLICATIONS

"Core Technology Benchmarks A White Paper", Jul. 2002, downloaded from the internet Mar. 2, 2004.

(Continued)

*Primary Examiner* — Kuen S Lu
(74) *Attorney, Agent, or Firm* — Berkeley Law & Technology Group, LLP

(57) ABSTRACT

Embodiments of methods and/or systems of manipulating tree expressions are disclosed.

30 Claims, 17 Drawing Sheets

Related U.S. Application Data

Oct. 13, 2009, now Pat. No. 8,626,777, which is a continuation of application No. 11/006,841, filed on Dec. 7, 2004, now Pat. No. 7,627,591.

(60) Provisional application No. 60/623,280, filed on Oct. 29, 2004.

(56) References Cited

U.S. PATENT DOCUMENTS

| | | |
|---|---|---|
| 4,001,951 A | 1/1977 | Fasse |
| 4,134,218 A | 1/1979 | Adams et al. |
| 4,156,910 A | 5/1979 | Barton et al. |
| 4,286,330 A | 8/1981 | Isaacson |
| 4,439,162 A | 3/1984 | Blaine |
| 4,677,550 A | 6/1987 | Ferguson |
| 4,737,109 A | 4/1988 | Abramson |
| 4,745,561 A | 5/1988 | Hirosawa et al. |
| 4,751,684 A | 6/1988 | Holt |
| 4,831,525 A | 5/1989 | Saito et al. |
| 4,867,686 A | 9/1989 | Goldstein |
| 4,916,655 A | 4/1990 | Ohsone |
| 4,931,928 A | 6/1990 | Greenfeld |
| 4,949,388 A | 8/1990 | Bhaskaran |
| 4,989,132 A | 1/1991 | Mellender et al. |
| 4,991,087 A | 2/1991 | Burkowski et al. |
| 5,010,478 A | 4/1991 | Deran |
| 5,021,943 A | 6/1991 | Grimes |
| 5,021,992 A | 6/1991 | Kondo |
| 5,050,071 A | 9/1991 | Harris et al. |
| 5,136,593 A | 8/1992 | Moon |
| 5,191,522 A | 3/1993 | Bosco et al. |
| 5,235,701 A | 8/1993 | Ohler et al. |
| 5,265,245 A | 11/1993 | Nordstrom et al. |
| 5,295,261 A | 3/1994 | Simonetti |
| 5,325,531 A | 6/1994 | McKeeman |
| 5,335,320 A | 8/1994 | Iwata |
| 5,335,345 A | 8/1994 | Frieder et al. |
| 5,355,496 A | 10/1994 | Fant et al. |
| 5,450,581 A | 9/1995 | Bergen |
| 5,463,777 A | 10/1995 | Bialkowski et al. |
| 5,493,504 A | 2/1996 | Minato |
| 5,493,678 A | 2/1996 | Arcuri |
| 5,497,500 A | 3/1996 | Rogers et al. |
| 5,509,088 A | 4/1996 | Robson |
| 5,511,159 A | 4/1996 | Baker |
| 5,519,627 A | 5/1996 | Mahmood et al. |
| 5,522,068 A | 5/1996 | Berkowitz |
| 5,544,301 A * | 8/1996 | Orton .............. G09G 5/14 715/790 |
| 5,548,755 A | 8/1996 | Leung |
| 5,577,253 A | 11/1996 | Blickstein |
| 5,598,350 A | 1/1997 | Kawanishi et al. |
| 5,606,669 A | 2/1997 | Bertin et al. |
| 5,636,155 A | 6/1997 | Kabuo |
| 5,687,362 A | 11/1997 | Bhargava et al. |
| 5,706,406 A | 1/1998 | Pollock |
| 5,724,512 A | 3/1998 | Winterbottom |
| 5,724,576 A | 3/1998 | Letourneau |
| 5,742,806 A | 4/1998 | Reiner |
| 5,745,892 A | 4/1998 | Miyata |
| 5,748,975 A | 5/1998 | Van De Vanter |
| 5,758,152 A | 5/1998 | LeTourneau |
| 5,778,354 A | 7/1998 | Leslie |
| 5,778,371 A | 7/1998 | Fujihara |
| 5,781,906 A | 7/1998 | Aggarwal et al. |
| 5,784,557 A | 7/1998 | Oprescu |
| 5,787,415 A | 7/1998 | Jacobson et al. |
| 5,787,432 A | 7/1998 | Letourneau |
| 5,796,356 A | 8/1998 | Okada et al. |
| 5,802,370 A | 9/1998 | Sitbon et al. |
| 5,822,593 A | 10/1998 | Lamping et al. |
| 5,826,262 A | 10/1998 | Bui |
| 5,838,319 A | 11/1998 | Guzak |
| 5,848,159 A | 12/1998 | Collins et al. |
| 5,905,138 A | 5/1999 | Van Broeckhoven |
| 5,930,805 A | 7/1999 | Marquis |
| 5,937,181 A | 8/1999 | Godefroid |
| 5,960,425 A | 8/1999 | Buneman |
| 5,970,490 A | 10/1999 | Morgenstern |
| 5,978,790 A | 11/1999 | Buneman et al. |
| 5,987,449 A | 11/1999 | Suciu |
| 5,999,926 A | 12/1999 | Suciu |
| 6,002,879 A | 12/1999 | Radigan et al. |
| 6,003,033 A | 12/1999 | Amano et al. |
| 6,022,879 A | 2/2000 | Crow et al. |
| 6,028,987 A | 2/2000 | Hirairi |
| 6,055,537 A | 4/2000 | LeTourneau |
| 6,076,087 A | 6/2000 | Suciu |
| 6,088,691 A | 7/2000 | Bhargava et al. |
| 6,141,655 A | 10/2000 | Johnson et al. |
| 6,199,059 B1 | 3/2001 | Dahan |
| 6,199,103 B1 | 3/2001 | Sakuguchi et al. |
| 6,236,410 B1 | 5/2001 | Politis et al. |
| 6,240,418 B1 | 5/2001 | Shadmon |
| 6,243,859 B1 | 6/2001 | Chen-Kuang |
| 6,272,495 B1 | 8/2001 | Hetherington |
| 6,279,007 B1 | 8/2001 | Uppala |
| 6,289,354 B1 | 9/2001 | Aggarwal et al. |
| 6,292,938 B1 | 9/2001 | Sarkar et al. |
| 6,314,559 B1 | 11/2001 | Sollich |
| 6,336,812 B1 | 1/2002 | Cooper et al. |
| 6,341,372 B1 | 1/2002 | Datig |
| 6,377,953 B1 | 4/2002 | Gawlick |
| 6,411,957 B1 | 6/2002 | Dijkstra |
| 6,442,584 B1 | 8/2002 | Kolli et al. |
| 6,446,256 B1 | 9/2002 | Hymen et al. |
| 6,466,240 B1 | 10/2002 | Maslov |
| 6,480,857 B1 | 11/2002 | Chandler |
| 6,499,036 B1 | 12/2002 | Gurevich |
| 6,505,205 B1 | 1/2003 | Kothuri et al. |
| 6,542,899 B1 | 4/2003 | Saulpaugh et al. |
| 6,550,024 B1 | 4/2003 | Pagurek et al. |
| 6,556,983 B1 | 4/2003 | Altschuler et al. |
| 6,598,052 B1 | 7/2003 | Saulpaugh et al. |
| 6,598,502 B1 | 7/2003 | Rosa |
| 6,606,632 B1 | 8/2003 | Saulpaugh |
| 6,606,741 B2 | 8/2003 | Kojima |
| 6,609,130 B1 | 8/2003 | Saulpaugh |
| 6,610,106 B1 | 8/2003 | Jenks |
| 6,611,844 B1 | 8/2003 | Saulpaugh et al. |
| 6,640,218 B1 | 10/2003 | Golding |
| 6,658,649 B1 | 12/2003 | Bates et al. |
| 6,665,664 B2 | 12/2003 | Paulley |
| 6,687,734 B1 | 2/2004 | Sellink |
| 6,691,301 B2 | 2/2004 | Bowen |
| 6,714,939 B2 | 3/2004 | Saldanha et al. |
| 6,728,953 B1 | 4/2004 | Walster |
| 6,742,054 B1 | 5/2004 | Upton |
| 6,745,384 B1 | 6/2004 | Biggerstaff |
| 6,748,378 B1 | 6/2004 | Lavender et al. |
| 6,763,515 B1 | 7/2004 | Vazquez et al. |
| 6,785,673 B1 | 8/2004 | Fernandez et al. |
| 6,795,868 B1 | 9/2004 | Dingman |
| 6,804,677 B2 | 10/2004 | Shadmon |
| 6,817,865 B2 | 11/2004 | Charbonneau |
| 6,829,695 B1 | 12/2004 | Ross |
| 6,847,979 B2 | 1/2005 | Allemang et al. |
| 6,854,976 B1 | 2/2005 | Suhr |
| 6,874,005 B2 | 3/2005 | Fortenberry et al. |
| 6,880,148 B1 | 4/2005 | Raph |
| 6,941,511 B1 | 9/2005 | Hind |
| 6,965,990 B2 | 11/2005 | Barsness et al. |
| 6,968,330 B2 | 11/2005 | Edwards et al. |
| 6,978,271 B1 | 12/2005 | Hoffman |
| 7,043,555 B1 | 5/2006 | McCain et al. |
| 7,051,033 B2 | 5/2006 | Agarwal et al. |
| 7,072,904 B2 | 7/2006 | Najork et al. |
| 7,103,838 B1 | 9/2006 | Krishnamurthy |
| 7,107,265 B1 | 9/2006 | Calvignac et al. |
| 7,111,016 B2 | 9/2006 | Gurevich |
| 7,117,196 B2 | 10/2006 | Gaur et al. |
| 7,117,479 B2 | 10/2006 | Van De Vanter |
| 7,127,704 B2 | 10/2006 | Van De Vanter et al. |

(56) References Cited

U.S. PATENT DOCUMENTS

| | | |
|---|---|---|
| 7,134,075 B2 | 11/2006 | Hind et al. |
| 7,139,765 B1 | 11/2006 | Balkany |
| 7,140,006 B2 | 11/2006 | Harrison et al. |
| 7,162,485 B2 | 1/2007 | Gottlob et al. |
| 7,167,856 B2 | 1/2007 | Lawder |
| 7,190,376 B1 | 3/2007 | Tonisson |
| 7,191,182 B2 | 3/2007 | Anonsen et al. |
| 7,203,680 B2 | 4/2007 | Parida |
| 7,203,774 B1 | 4/2007 | Zhou et al. |
| 7,225,199 B1 | 5/2007 | Green |
| 7,287,026 B2 | 10/2007 | Oommen |
| 7,313,563 B2 | 12/2007 | Bordawekar et al. |
| 7,318,066 B2 | 1/2008 | Kaufman |
| 7,318,215 B1 | 1/2008 | Krishnan et al. |
| 7,337,163 B1 | 2/2008 | Srinivasan |
| 7,356,802 B2 | 4/2008 | de Sutter et al. |
| 7,360,202 B1 | 4/2008 | Seshadri et al. |
| 7,392,239 B2 | 6/2008 | Fontoura |
| 7,409,673 B2 | 8/2008 | Kuo et al. |
| 7,419,376 B2 | 9/2008 | Sarvazyan et al. |
| 7,421,648 B1 | 9/2008 | Davis |
| 7,437,666 B2 | 10/2008 | Ramarao |
| 7,475,070 B2 | 1/2009 | Fan et al. |
| 7,496,892 B2 | 2/2009 | Nuss |
| 7,512,932 B2 | 3/2009 | Davidov et al. |
| 7,536,675 B2 | 5/2009 | Gallagher |
| 7,536,676 B2 | 5/2009 | Baker |
| 7,544,062 B1 | 6/2009 | Hauschild et al. |
| 7,561,927 B2 | 7/2009 | Oyama et al. |
| 7,571,156 B1 | 8/2009 | Gupta et al. |
| 7,571,169 B1 | 8/2009 | Jones et al. |
| 7,574,692 B2 | 8/2009 | Herscu |
| 7,575,434 B2 | 8/2009 | Palakodeti |
| 7,620,632 B2 | 11/2009 | Andrews |
| 7,627,591 B2 | 12/2009 | LeTourneau |
| 7,630,995 B2 | 12/2009 | LeTourneaU |
| 7,636,727 B2 | 12/2009 | Schiffmann et al. |
| 7,650,592 B2 | 1/2010 | Eckels et al. |
| 7,669,183 B2 | 2/2010 | Bowman et al. |
| 7,681,177 B2 | 3/2010 | LeTourneau |
| 7,720,830 B2 | 5/2010 | Wen |
| 7,761,847 B2 | 7/2010 | Kornerup et al. |
| 7,761,858 B2 | 7/2010 | Chang et al. |
| 7,765,183 B2 | 7/2010 | Williams, Jr. |
| 7,779,396 B2 | 8/2010 | Meijer et al. |
| 7,801,923 B2 | 9/2010 | LeTourneau |
| 7,827,523 B2 | 11/2010 | Ahmed |
| 7,861,304 B1 | 12/2010 | Nachenberg |
| 7,882,147 B2 | 2/2011 | LeTourneau |
| 7,890,471 B2 | 2/2011 | Fan |
| 7,890,927 B2 | 2/2011 | Eldridge |
| 7,890,928 B2 | 2/2011 | Patrudu |
| 7,899,821 B1 | 3/2011 | Schiffmann |
| 7,962,494 B2 | 6/2011 | Furusho |
| 8,005,869 B2 | 8/2011 | Corl |
| 8,020,145 B2 | 9/2011 | Fant |
| 8,032,860 B2 | 10/2011 | Piehler et al. |
| 8,037,102 B2 | 10/2011 | LeTourneau |
| 8,060,868 B2 | 11/2011 | Meijer et al. |
| 8,086,998 B2 | 12/2011 | Bansal |
| 8,112,740 B2 | 2/2012 | Meijer et al. |
| 8,151,276 B2 | 4/2012 | Grechanik |
| 8,181,155 B2 | 5/2012 | Pinto et al. |
| 8,203,972 B2 | 6/2012 | Sauermann |
| 8,230,526 B2 | 7/2012 | Holland et al. |
| 8,250,526 B2 | 8/2012 | Anderson et al. |
| 8,307,102 B2 | 11/2012 | Skog |
| 8,316,059 B1 | 11/2012 | Schiffmann |
| 8,332,428 B2 | 12/2012 | Bonneau |
| 8,356,040 B2 | 1/2013 | LeTourneau |
| 8,365,137 B2 | 1/2013 | Fant |
| 8,438,534 B2 | 5/2013 | Thomson |
| 8,443,339 B2 | 5/2013 | LeTourneau |
| 8,458,191 B2 | 6/2013 | Bhattacharjee |
| 8,484,236 B1 | 7/2013 | Andrews |
| 8,606,794 B2 | 12/2013 | Amer-Yahia |
| 8,612,461 B2 | 12/2013 | Schiffmann |
| 8,615,530 B1 | 12/2013 | Letourneau |
| 8,626,777 B2 | 1/2014 | LeTourneau |
| 8,645,346 B2 | 2/2014 | Dumitru |
| 8,650,201 B2 | 2/2014 | LeTourneau |
| 8,683,431 B2 | 3/2014 | Thomson et al. |
| 8,745,070 B2 | 6/2014 | Krishnamurthy |
| 8,762,942 B2 | 6/2014 | Langworthy et al. |
| 8,868,621 B2 | 10/2014 | D'Onofrio, II |
| 8,869,106 B2 | 10/2014 | Jazdzewski |
| 8,930,896 B1 | 1/2015 | Wiggins |
| 8,935,232 B2 | 1/2015 | Abadi |
| 8,990,769 B2 | 3/2015 | LeTourneau |
| 9,002,862 B2 | 4/2015 | Schiffmann |
| 9,015,202 B2 | 4/2015 | Letourneau |
| 9,020,961 B2 | 4/2015 | LeTourneau |
| 9,043,347 B2 | 5/2015 | LeTourneau |
| 9,077,515 B2 | 7/2015 | LeTourneau |
| 9,167,579 B2 | 10/2015 | Fettweis |
| 9,177,003 B2 | 11/2015 | Letourneau |
| 9,245,050 B2 | 1/2016 | Schiffmann |
| 9,330,128 B2 | 5/2016 | Schiffmann |
| 9,411,841 B2 | 8/2016 | Schiffmann |
| 9,425,951 B2 | 8/2016 | LeTourneau |
| 9,430,512 B2 | 8/2016 | LeTourneau |
| 9,563,653 B2 | 2/2017 | LeTourneau |
| 9,563,663 B2 | 2/2017 | Shukla |
| 9,646,034 B2 | 5/2017 | Schiffmann |
| 9,646,107 B2 | 5/2017 | LeTourneau |
| 9,842,130 B2 | 12/2017 | Schiffmann |
| 10,055,438 B2 | 8/2018 | Schiffmann |
| 10,068,003 B2 | 9/2018 | Schiffmann |
| 10,140,349 B2 | 11/2018 | Letourneau |
| 10,255,311 B2 | 4/2019 | LeTourneau |
| 10,275,489 B1 | 4/2019 | Muniswamy Reddy |
| 10,325,031 B2 | 6/2019 | Letourneau |
| 10,380,039 B2 | 8/2019 | Cooray |
| 10,380,089 B2 | 8/2019 | Letourneau |
| 10,394,785 B2 | 8/2019 | Letourneau |
| 10,411,878 B2 | 9/2019 | Letourneau |
| 10,437,886 B2 | 10/2019 | Andrews |
| 10,713,274 B2 | 7/2020 | Letourneau |
| 10,725,989 B2 | 7/2020 | Schiffmann |
| 10,733,234 B2 | 8/2020 | Letourneau |
| 11,100,070 B2 | 8/2021 | Schiffmann |
| 11,100,137 B2 | 8/2021 | Letourneau |
| 2001/0003211 A1 | 6/2001 | Bera |
| 2001/0037496 A1* | 11/2001 | Simonyi ............... G06F 8/33 717/146 |
| 2002/0023166 A1 | 2/2002 | Bar-Noy |
| 2002/0062259 A1 | 2/2002 | Katz et al. |
| 2002/0040292 A1 | 4/2002 | Marcu |
| 2002/0059281 A1 | 5/2002 | Watanabe et al. |
| 2002/0091676 A1 | 7/2002 | Agrawal |
| 2002/0107860 A1 | 8/2002 | Gobeille et al. |
| 2002/0129129 A1 | 9/2002 | Bloch et al. |
| 2002/0130796 A1 | 9/2002 | Tsuchido et al. |
| 2002/0130907 A1 | 9/2002 | Chi |
| 2002/0133347 A1 | 9/2002 | Schoneburg |
| 2002/0133497 A1 | 9/2002 | Draper |
| 2002/0149604 A1 | 10/2002 | Wilkinson |
| 2002/0169563 A1 | 11/2002 | de Carvalho Ferreira |
| 2002/0194163 A1 | 12/2002 | Hopeman |
| 2003/0041088 A1 | 2/2003 | Wilson et al. |
| 2003/0065659 A1 | 4/2003 | Agarwal et al. |
| 2003/0074436 A1 | 4/2003 | Gieseke |
| 2003/0115559 A1 | 6/2003 | Sawada |
| 2003/0130977 A1 | 7/2003 | Oommen |
| 2003/0167445 A1 | 9/2003 | Su et al. |
| 2003/0195885 A1 | 10/2003 | Emmick et al. |
| 2003/0195890 A1* | 10/2003 | Oommen ............ G06F 16/9027 |
| 2003/0236787 A1 | 12/2003 | Burges |
| 2003/0236794 A1 | 12/2003 | Hostetter et al. |
| 2004/0003028 A1 | 1/2004 | Emmett |
| 2004/0010752 A1 | 1/2004 | Chan et al. |
| 2004/0019599 A1* | 1/2004 | Trappen ............... G06F 16/284 |
| 2004/0024724 A1 | 2/2004 | Rubin |
| 2004/0024790 A1 | 2/2004 | Everett |

(56) References Cited

U.S. PATENT DOCUMENTS

| | | | |
|---|---|---|---|
| 2004/0044659 A1 | 3/2004 | Judd et al. | |
| 2004/0054692 A1 | 3/2004 | Seyrat et al. | |
| 2004/0060006 A1 | 3/2004 | Lindblad | |
| 2004/0060007 A1 | 3/2004 | Gottlob et al. | |
| 2004/0068498 A1 | 4/2004 | Patchet et al. | |
| 2004/0075677 A1* | 4/2004 | Loyall | G06T 13/40 715/706 |
| 2004/0103105 A1 | 5/2004 | Lindblad et al. | |
| 2004/0122844 A1 | 6/2004 | Malloy | |
| 2004/0125124 A1* | 7/2004 | Kim | G06F 16/71 715/716 |
| 2004/0160464 A1* | 8/2004 | Reyna | G06F 8/34 715/854 |
| 2004/0205047 A1 | 10/2004 | Carpenter | |
| 2004/0215642 A1 | 10/2004 | Cameron et al. | |
| 2004/0239674 A1 | 12/2004 | Ewald et al. | |
| 2004/0254909 A1 | 12/2004 | Testa | |
| 2004/0260683 A1 | 12/2004 | Chan et al. | |
| 2004/0260684 A1 | 12/2004 | Agrawal et al. | |
| 2004/0267958 A1 | 12/2004 | Reed | |
| 2004/0268236 A1 | 12/2004 | Childlovskii et al. | |
| 2005/0021548 A1 | 1/2005 | Bohannon et al. | |
| 2005/0021683 A1* | 1/2005 | Newton | H04L 63/1425 709/220 |
| 2005/0023524 A1 | 2/2005 | Beatty | |
| 2005/0027495 A1 | 2/2005 | Matichuk | |
| 2005/0027743 A1 | 2/2005 | O'Neil et al. | |
| 2005/0028091 A1 | 2/2005 | Bordawekar | |
| 2005/0050016 A1 | 3/2005 | Stanoi et al. | |
| 2005/0050066 A1 | 3/2005 | Hughes | |
| 2005/0055369 A1* | 3/2005 | Gorelik | G06F 16/24544 |
| 2005/0058976 A1 | 3/2005 | Vernon | |
| 2005/0060320 A1 | 3/2005 | Bostrom | |
| 2005/0060332 A1 | 3/2005 | Bernstein et al. | |
| 2005/0065964 A1 | 3/2005 | Ziemann et al. | |
| 2005/0065965 A1 | 3/2005 | Ziemann | |
| 2005/0097084 A1 | 5/2005 | Balmin | |
| 2005/0102636 A1* | 5/2005 | McKeon | G06F 9/451 715/854 |
| 2005/0125432 A1 | 6/2005 | Lin et al. | |
| 2005/0138073 A1 | 6/2005 | Zhou et al. | |
| 2005/0149471 A1 | 7/2005 | Lassalle | |
| 2005/0154265 A1 | 7/2005 | Miro et al. | |
| 2005/0154979 A1 | 7/2005 | Chidlovskii et al. | |
| 2005/0156761 A1 | 7/2005 | Oh | |
| 2005/0165732 A1 | 7/2005 | Burges | |
| 2005/0171962 A1 | 8/2005 | Martin | |
| 2005/0187900 A1 | 8/2005 | LeTourneau | |
| 2005/0195741 A1 | 9/2005 | Doshi | |
| 2005/0210014 A1 | 9/2005 | Asano | |
| 2005/0214727 A1 | 9/2005 | Stoianovici et al. | |
| 2005/0216445 A1 | 9/2005 | Rao | |
| 2005/0267908 A1 | 12/2005 | LeTourneau | |
| 2005/0286788 A1 | 12/2005 | Orr | |
| 2006/0004817 A1 | 1/2006 | Andrews | |
| 2006/0005122 A1 | 1/2006 | Lemoine | |
| 2006/0015538 A1 | 1/2006 | LeTourneau | |
| 2006/0053122 A1 | 3/2006 | Korn et al. | |
| 2006/0074838 A1 | 4/2006 | Srivastava | |
| 2006/0095442 A1 | 5/2006 | LeTourneau | |
| 2006/0095455 A1 | 5/2006 | LeTourneau | |
| 2006/0123029 A1 | 6/2006 | LeTourneau | |
| 2006/0129582 A1 | 6/2006 | Schiffmann et al. | |
| 2006/0209351 A1 | 9/2006 | Saito et al. | |
| 2006/0259533 A1 | 11/2006 | LeTourneau | |
| 2006/0271573 A1 | 11/2006 | LeTourneau | |
| 2007/0003917 A1 | 1/2007 | Kitching et al. | |
| 2007/0198538 A1 | 8/2007 | Palacios | |
| 2008/0270435 A1 | 10/2008 | Furusho | |
| 2008/0313196 A1 | 10/2008 | Furusho | |
| 2010/0094885 A1 | 4/2010 | LeTourneau | |
| 2010/0094908 A1 | 4/2010 | LeTourneau | |
| 2010/0114969 A1 | 5/2010 | LeTourneau | |
| 2010/0191775 A1 | 7/2010 | Schiffmann et al. | |
| 2010/0205581 A1 | 8/2010 | LeTourneau | |
| 2010/0318521 A1 | 12/2010 | Letourneau | |
| 2011/0131259 A1 | 6/2011 | Letourneau | |
| 2011/0282898 A1 | 11/2011 | Schiffmann | |
| 2011/0320499 A1 | 12/2011 | Letourneau | |
| 2012/0144388 A1 | 6/2012 | Schiffmann | |
| 2013/0151566 A1 | 6/2013 | Letourneau | |
| 2013/0198239 A1 | 8/2013 | Letourneau | |
| 2014/0040293 A1 | 2/2014 | Letourneau | |
| 2014/0184430 A1 | 7/2014 | Jiang | |
| 2014/0289266 A1 | 9/2014 | Letourneau | |
| 2014/0289278 A1 | 9/2014 | Schiffmann | |
| 2014/0289279 A1 | 9/2014 | Letourneau | |
| 2014/0362961 A1 | 12/2014 | Letourneau | |
| 2015/0193517 A1 | 7/2015 | Letourneau | |
| 2015/0220582 A1 | 8/2015 | Letourneau | |
| 2015/0242449 A1 | 8/2015 | Schiffmann | |
| 2015/0242450 A1 | 8/2015 | Letourneau | |
| 2015/0310048 A1 | 10/2015 | Letourneau | |
| 2015/0341165 A1 | 11/2015 | Letourneau | |
| 2016/0117353 A1 | 4/2016 | Schiffmann | |
| 2016/0162528 A1 | 6/2016 | LeTourneau | |
| 2016/0283611 A1 | 9/2016 | Letourneau | |
| 2016/0328431 A1 | 11/2016 | Schiffmann | |
| 2016/0359616 A1 | 12/2016 | Letourneau | |
| 2017/0032053 A1 | 2/2017 | Letourneau | |
| 2017/0053006 A1 | 2/2017 | Letourneau | |
| 2017/0132301 A1 | 5/2017 | Letourneau | |
| 2017/0255660 A1 | 9/2017 | Letourneau | |
| 2018/0107698 A1 | 4/2018 | Schiffmann | |
| 2019/0026326 A1 | 1/2019 | Schiffmann | |
| 2019/0034510 A1 | 1/2019 | Letourneau | |
| 2019/0121795 A1 | 4/2019 | Schiffmann | |
| 2019/0129899 A1 | 5/2019 | Letourneau | |
| 2019/0171628 A1 | 6/2019 | Letourneau | |
| 2019/0236078 A1 | 8/2019 | Letourneau | |
| 2019/0356465 A1 | 11/2019 | Letourneau | |
| 2019/0377718 A1 | 12/2019 | Letourneau | |
| 2019/0384753 A1 | 12/2019 | Letourneau | |
| 2019/0384792 A1 | 12/2019 | Andrews | |
| 2020/0218707 A1 | 7/2020 | Letourneau | |
| 2020/0372041 A1 | 11/2020 | Letourneau | |
| 2020/0394168 A1 | 12/2020 | Schiffmann | |
| 2020/0394224 A1 | 12/2020 | Letourneau | |
| 2021/0149860 A1 | 5/2021 | Letourneau | |
| 2021/0349871 A1 | 11/2021 | Letourneau | |

OTHER PUBLICATIONS

"Origin Data, Inc. White Paper", © 1999, pp. 1-13.
"The Associative Model of Data White Paper", Lazy Software, Ltd., 2000.
ACM Portal Search Results (Kleene and prime and enumeration and operation and natural and numerals and sequences and "enumeration operation") conducted by Examiner on Jul. 18, 2009, 6 pages.
ACM Portal Search Results (Kleene and prime and enumeration and operation and natural and numerals and sequences and enumeration and operation) conducted by Examiner on Jul. 18, 2009, 1 page.
Alderson et al., "Toward an Optimization Driven Framework for Designing and Generating Realistic Internet Topologies" ACM SIGCOMM Computer Communications Review 41, vol. 33, No. 1, pp. 41-46, 2003.
Apostol, "A Centennial History of the Prime Number Theorem", Engineering and Science, No. 4, 1996.
Benedikt et al., "Definable Relations and First-Order Query Languages over Strings" Journal of the ACM, vol. 50, No. 5, pp. 694-751, 2003.
Boppana et al., "Full Fault Dictionary Storage Based on Labeled Tree Encoding", Proceedings of $14^{th}$ VLSI Test Symposium, 1996, pp. 174-179.
Borodin et al., "A Tradeoff Between Search and Update Time for the Implicit Dictionary Problem", Theoretical Computer Science vol. 1 No. 4 (1990), 425-447.
Cano et al., "Lazy Evaluation in Penniless Propagation over Join Trees", Networks, vol. 39(4), 2002 Wiley Periodicals, Inc., 175-185, 2002.

(56) References Cited

OTHER PUBLICATIONS

Caviness et al, "Simplification of Radical Expressions", ACM, pp. 329-338, 1976.
Cole, Richard, Hariharan, Ramesh, and Indyk, Piotr. "Tree pattern matching and subset matching in deterministic O(n log 3 n)-time", Proceedings of the Tenth Annual ACM-SIAM Symposium on Discrete Algorithms, p. 1-10, Jan. 2, 1999, Baltimore, Maryland, United States.
Cooper et al., "Oh! Pascal!", 1982, W.W. Norton & Company, Inc., Chapter 12, Arrays for Random Access, pp. 295-327.
Coenen, Frans; Leng, Paul and Ahmed, Shakil; "T-Trees, Vertical Partitioning and Distributed Association Rule Mining", IEEE, 2003.
Dubiner, M., Galil, Z., and Magen, E. "Faster Tree Pattern Matching.", Journal of the Association for Computing Machinery, vol. 41, No. 2, Mar. 1994, pp. 205-213.
Durango Bill's Enumeration of Trees. http://web.archive.org/web/20021028184112/http://www.durangobill.com/Trees.html, 1998.
Er, M.C., "Enumerating Ordered Trees Lexicographically", The Computation Journal, vol. 28, Issue 5, pp. 538-542, 1985.
Google search (Kleene prime enumeration operation natural numerals sequences "Kleene prime") conducted by Examiner on Jul. 18, 2009, 2 pages.
Ferragina et al., "The String B-Tree: A New Data Structure for String Search in External Memory and Its Applications", Journal of the ACM, vol. 46, No. 2, pp. 236-280, 1999.
Google Search (Kleene prime enumeration operation natural numerals sequences "enumeration operation") conducted by Examiner on Jul. 18, 2009, 2 pages.
Google Search (Kleene prime enumeration operation) conducted by Examiner on Jul. 18, 2009, 2 pages.
Hirschberg, "Algorithm for Computing Maximal Common Sebsequences", Communication of the ACM, vol. 18, No. 6, pp. 341-343, 1975.
Hoffman et al., "Pattern Matching in Trees", Purdue University, Jan. 1982, Journal for the Association for Computing Machinery, vol. 29, Issue 1, pp. 68-95.
Iacob et al., "XPath Extension for Querying Concurrent XML Markup", Technical Report #TR 394-04, Department of Computer Science, University of Kentucky, Lexington, KY 40506, Mar. 6, 2004, 15 pages.
IEEE Explore Digital Library Search Result conducted by Examiner on Jul. 18, 2009, 1 page.
Johnston et al. Advances in Dataflow Programming Languages, ACM Computing Surveys, vol. 36, No. 1, pp. 1-34, 2004.
Katajainen et al., "Tree Compression and Optimization with Applications", International Journal of Foundations of Computer Science, vol. 1 No. 4 (1990), 425-447.
Kharbutli et al., "Using Prime Numbers for Cache Indexing to Eliminate Conflict Misses", Dept. of Electrical and Computer Engineering, North Carolina State University, Feb. 2004, 24 pages.
Kilpelainen, "Tree Matching Problems with Applications to Structured Text Databases", Ph.D. Dissertation, Department of Computer Science, University of Helsinki, Report A—Jun. 1992, Helsinki, Finland, pp. 1-109, Nov. 1992.
Knuth, "The Art of Computer Programming", vol. 1 Fundamental Algorithms, Second edition, Addison-Wesley Series in *Computer Science and Information Processing*, ISBN 0-201-03809-9, Reading, Massachusetts, Copyright 1973.
Leinonen et al., "Automation of Document Structure Transformations", Auditorium, Microteknia Building, University of Kuopio, Nov. 5, 2004, 68 pages.
Lerman et al., "Learning the Common Structure of Data", American Association for Artificial Intelligence, AAAI-00 Proceedings, www.aaai.org, Apr. 13, 2000, 6 pages.
Letourneau, "The Elementary Theory of Object Oriented Arithmetic", pp. 1-9, Apr. 1990.
Malhotra et al., "A Methodology for Formal Expression of Hierarchy in Model Solution", IEEE, pp. 258-267, 1983.
Navarro, "A Guided Tour to Approximate String Matching", ACM Computing Surveys, vol. 33, No. 1, pp. 31-88, 2001.

Neven, Frank and Thomas Schwentick, "Expressive and efficient pattern languages for tree-structured data" Proceedings of the Nineteenth ACM SIGACT-SIGMOD-SIGART Symposium on Principles of Database Systems, May 2000.
Prasad et al., "Efficient Bit-Parallel Multi-Patterns String Matching Algorithms for Limited Expression", ACM, pp. 1-6, 2010.
Ramesh, R. and Ramakrishnan, I.V., "Nonlinear Pattern Matching in Trees." Journal of the Association for Computer Machinery, vol. 39, No. 2. Apr. 1992, pp. 295-316.
Reiss, "Semantics-Based Code Search", IEEE ICSE, pp. 243-253, 2009.
Schmidt et al., "Comparision of Tree and Graph Encodings as Function of Problem Complexity", ACM, pp. 1674-1679, 2007.
Sechrest et al., "Blending Hierarchical and Attribute-Based File Naming", Distributed Computing System, 1992, Proceedings of the $12^{th}$ International Conference on Jun. 9-12, 1992, pp. 572-580.
Shanmugasundaram et al., "Querying SML Views of Relational Data", Proceedings of the $27^{th}$ VLDB Conference, Roma, Italy, 2001, 9 pages.
Siegel, "All Searches Are Divided into Three Parts String Searches Using Ternary Trees", ACM, pp. 57-68, 1988.
Sinha et al., "Efficient Trie Based Sorting of Large Sets of Strings," ACM, pp. 1-8, 2003.
Sitaraman, Krishna, Ranganathan, N., and Ejnioui, Abdel, "A VLSI Architecture for Object Recognition using Tree Matching" Proceedings of the IEEE International Conference on Application-Specific Systems, Architectures, and Processors (ASAP'02) Dec. 2001, pp. 1-71.
Smorynski, Craig, "Logical Number Theory I: An Introduction", Springer-Verlag Berlin Heidelberg, © 1991, Arithmetic Encoding, The Cantor Pairing Function, pp. 14-23, and 305.
Somani et al., "Phased-Mission System Analysis Using Boolean Algebraic Methods", May 1994, ACM Press, vol. 22, Issue 1.
Spinells "Declarative Peephole Optimization Using String Pattern Matching", ACM, pp. 47-51, 1999.
Sproat et al., "Compilation of Weighted Finite-State Tranducers from Decision Trees" ACM, pp. 215-222, 1996.
Stanat, D.F., and McAllister, D.F., "Discrete Mathematics in Computer Science", Prentice-Hall, 1977, Binary Relations, Ch. 3, Sec. 3.2, Trees, p. 131-145.
Talukdar, "Learning to Create Data-Integrating Queries", ACM PVLDB, pp. 785-796, 2008.
Thiemann, "Grammar-Based Analysis of String Expressions", ACM, pp. 59-70, 2005.
Valiente, "Algorithms on Trees and Graphs", Tree Isomorphism, pp. 151-251, Springer 2002.
Valiente, Gabriel, "Tree Isomorphism," of Algorithms on Trees and Graphs, Chapter 4, published by Springer, 2002, 51 pages.
Wagner et al., "The String-to-String Correction Problem", Journal of the Association for Computing Machinery, vol. 21, No. 1, pp. 168-173, 1974.
Wu, "A Prime Number Labeling Scheme for Dynamic Ordered XML Trees", IEEE, 2004, 13 pages.
Xie et al., "S-Looper: Automatice Summarization for Multipath String Loops", ACM, pp. 188-198, 2015.
Yates et al., "A New Approach to Text Searchin", Communications of the ACM, vol. 35, No. 10, pp. 74-82, 1992.
Zaks, S., "Lexicographic Generation of Ordered Trees", Dep. of Computer Science, University of Illinois, The Journal of Theoretical Computer Science, vol. 10(1), pp. 63-82, Revised 1978.
U.S. Appl. No. 11/005,859, filed Dec. 6, 2004, 120 pages.
U.S. Appl. No. 11/005,859, Notice to File Missing parts dated Jan. 10, 2005, 2 pages.
U.S. Appl. No. 11/005,859, Response to Notice to File Missing parts dated Apr. 1, 2005, 9 pages.
U.S. Appl. No. 11/005,859, Preliminary Amendment dated Apr. 28, 2005, 193 pages.
U.S. Appl. No. 11/005,859: Office Action—Restriction Requirement dated Dec. 12, 2007, 7 pages.
U.S. Appl. No. 11/005,859: Response to Office Action—Restriction Requirement dated Jan. 14, 2008, 82 pages.
U.S. Appl. No. 11/005,859: Non-final Office Action dated Mar. 21, 2008, 10 pages.

(56) References Cited

OTHER PUBLICATIONS

U.S. Appl. No. 11/005,859: Amendment dated Jul. 21, 2008, 86 pages.
U.S. Appl. No. 11/005,859: Final Office Action dated Oct. 30, 2008, 14 pages.
U.S. Appl. No. 11/005,859: Amendment dated Dec. 30, 2008, 83 pages.
U.S. Appl. No. 11/005,859: Advisory Action dated Jan. 13, 2009, 4 pages.
U.S. Appl. No. 11/005,859: RCE with amendment dated Apr. 30, 2009, 86 pages.
U.S. Appl. No. 11/005,859: Final Office Action dated Jul. 8, 2009, 9 pages.
U.S. Appl. No. 11/005,859: Examiner Interview Summary dated Oct. 27, 2009, 3 pages.
U.S. Appl. No. 11/005,859: Amendment dated Dec. 8, 2009, 83 pages.
U.S. Appl. No. 11/005,859: Advisory Action dated Dec. 22, 2009, 3 pages.
U.S. Appl. No. 11/005,859: RCE with Amendment dated Jan. 7, 2010, 85 pages.
U.S. Appl. No. 11/005,859: Non-Final Office Action dated Jan. 21, 2010, 8 pages.
U.S. Appl. No. 11/005,859: Response to Non-Final Office Action dated Feb. 25, 2010, 83 pages.
U.S. Appl. No. 11/005,859: Final Office Action dated Jun. 8, 2010, 9 pages.
U.S. Appl. No. 11/005,859: Office Action Response dated Sep. 1, 2010, 89 pages.
U.S. Appl. No. 11/005,859: Advisory Action dated Sep. 14, 2010, 3 pages.
U.S. Appl. No. 11/005,859: Notice of Appeal dated Sep. 29, 2010, 1 page.
U.S. Appl. No. 11/005,859: Office Action dated Oct. 15, 2010, 5 pages.
U.S. Appl. No. 11/005,859: Office Action Response dated Jan. 18, 2011, 95 pages.
U.S. Appl. No. 11/005,859: Final Office Action dated Mar. 30, 2011, 7 pages.
U.S. Appl. No. 11/005,859: Notice of Allowance and Fees Due, dated Jun. 9, 2011, 11 pages.
U.S. Appl. No. 11/005,859: Amendment after Notice of Allowance and Issue Fee Payment, dated Sep. 9, 2011, 2 pages.
U.S. Appl. No. 11/005,859: Issue Notification, dated Sep. 21, 2011, 1 page.
U.S. Appl. No. 13/229,624, filed Sep. 9, 2011, 139 pages.
U.S. Appl. No. 13/229,624: Filing receipt, dated Sep. 21, 2011, 4 pages.
U.S. Appl. No. 13/229,624: Non-Final Office Action, dated Nov. 23, 2011, 8 pages.
U.S. Appl. No. 13/229,624: Notice of Publication, dated Dec. 30, 2011, 1 page.
U.S. Appl. No. 13/229,624: Amendment, dated Feb. 23, 2012, 22 pages.
U.S. Appl. No. 13/229,624: Final Office Action, dated Mar. 20, 2012, 10 pages.
U.S. Appl. No. 13/229,624: Amendment after final, dated Jun. 13, 2012, 25 pages.
U.S. Appl. No. 13/229,624: Advisory Action, dated Jun. 20, 2012, 4 pages.
U.S. Appl. No. 13/229,624: RCE, dated Jul. 20, 2012, 26 pages.
U.S. Appl. No. 13/229,624: Non-Final Rejection, dated Oct. 2, 2013, 9 pages.
U.S. Appl. No. 13/229,624: Response to non-final office action, dated Dec. 27, 2013, 11 pages.
U.S. Appl. No. 13/229,624: Non-Final Office Action, dated Apr. 4, 2014, 5 Pages.
U.S. Appl. No. 13/229,624: Non-Final Office Action Response, dated Aug. 1, 2014, 9 Pages.
U.S. Appl. No. 13/229,624: Final Rejection. dated Oct. 30, 2014, 6 pages.
U.S. Appl. No. 13/229,624: Response and Amendments after Final, dated Jan. 30, 2015, 11 pages.
U.S. Appl. No. 13/229,624: Advisory Action, dated Mar. 11, 2015, 3 pages
U.S. Appl. No. 13/229,624: Applicant Initiated Interview Summary, dated Mar. 19, 2015, 3 pages.
U.S. Appl. No. 13/229,624: Response After Final Action and Interview Summary, dated Mar. 27, 2015, 20 pages.
U.S. Appl. No. 13/229,624: RCE and Amendments, dated Apr. 27, 2015, 17 pages.
U.S. Appl. No. 13/229,624: Notice of Allowance and Fees, dated Jul. 6, 2015, 21 pages.
U.S. Appl. No. 13/229,624: Issue Fee Payment, Sep. 28, 2015, 1 page.
U.S. Appl. No. 13/229,624: Issue Notification, dated Oct. 14, 2015, 1 page.
U.S. Appl. No. 14/870,744, filed Sep. 30, 2015, 127 pages.
U.S. Appl. No. 14/870,744 : Preliminary Amendments, Oct. 6, 2015, 10 pages.
U.S. Appl. No. 14/870,744: Notice to File Missing Parts, dated Oct. 16, 2015, 2 pages.
U.S. Appl. No. 14/870,744: Filing Receipt, dated Oct. 16, 2015, 3 pages.
U.S. Appl. No. 14/870,744: Applicant Response to Pre-Exam Formalities Notice, dated Feb. 19, 2016, 2 pages.
U.S. Appl. No. 14/870,744: Filing Receipt, dated Mar. 2, 2016, 3 pages.
U.S. Appl. No. 14/870,744 : Notice of Publication, dated Jun. 9, 2016, 1 page.
U.S. Appl. No. 14/870,744: Non-Final Rejection, dated Aug. 24, 2017, 11 pages.
U.S. Appl. No. 14/870,744: Amendment/Req. Reconsideration—After Non-Final Reject, dated Nov. 24, 2017, 30 pages.
U.S. Appl. No. 14/870,744: Final Rejection, dated Mar. 30, 2018, 20 pages.
U.S. Appl. No. 14/870,744: Response After Final Action, dated May 30, 2018, 33 pages.
U.S. Appl. No. 14/870,744: Advisory Action, dated Jul. 3, 2018, 5 pages.
U.S. Appl. No. 14/870,744: RCE and Amendments, dated Jul. 27, 2018, 33 pages.
U.S. Appl. No. 14/870,744: Notice of Allowance and Fees Due, dated Sep. 6, 2018, 11 pages.
U.S. Appl. No. 14/870,744: Response to Amendment under Rule 312, dated Jan. 9, 2019, 2 pages.
U.S. Appl. No. 14/870,744: Notice of Allowance and Fees Due, dated Mar. 12, 2019, 7 pages.
U.S. Appl. No. 14/870,744: Issue Notification, dated Mar. 20, 2019, 1 page.
U.S. Appl. No. 16/209,872, filed Dec. 4, 2018, 129 pages.
U.S. Appl. No. 16/209,872: Notice to File Missing Parts, dated Dec. 28, 2018, 2 pages.
U.S. Appl. No. 16/209,872: Filing Receipt, dated Dec. 28, 2018, 3 pages
U.S. Appl. No. 16/209,872: Applicant Response to Pre-Exam Formalities Notice, dated Feb. 21, 2019, 17 pages.
U.S. Appl. No. 16/209,872: Filing Receipt, dated Feb. 26, 2019, 3 pages.
U.S. Appl. No. 11/007,139: Application filed Dec. 7, 2004, 90 pages.
U.S. Appl. No. 11/007,139: Notice to File Missing Parts dated Jan. 19, 2005, 2 pages.
U.S. Appl. No. 11/007,139: Response to Notice to File Missing Parts dated Apr. 1, 2005, 9 pages.
U.S. Appl. No. 11/007,139: Preliminary Amendment dated Apr. 28, 2005, 146 pages.
U.S. Appl. No. 11/007,139: Non-final Office Action dated May 14, 2007, 58 pages.
U.S. Appl. No. 11/007,139: Amendment dated Oct. 15, 2007, 32 pages.

(56) References Cited

OTHER PUBLICATIONS

U.S. Appl. No. 11/007,139: Supplemental Response filed Oct. 17, 2007, 7 pages.
U.S. Appl. No. 11/007,139: Non-final Office Action dated Jan. 2, 2008 with Examiner's search results, 21 pages.
U.S. Appl. No. 11/007,139: Amendment dated Apr. 2, 2008, 30 pages.
U.S. Appl. No. 11/007,139: Final Office Action dated Aug. 15, 2008, 30 pages.
U.S. Appl. No. 11/007,139: Amendment filed Oct. 15, 2008, 26 pages.
U.S. Appl. No. 11/007,139: Advisory Action dated Oct. 22, 2008, 26 pages.
U.S. Appl. No. 11/007,139: RCE with Amendment dated Nov. 14, 2008, 32 pages.
U.S. Appl. No. 11/007,139: Non-final Office Action dated Dec. 8, 2008, 24 pages.
U.S. Appl. No. 11/007,139: Amendment dated May 8, 2009, 31 pages.
U.S. Appl. No. 11/007,139: Final Office Action dated Aug. 4, 2009, 26 pages.
U.S. Appl. No. 11/007,139: Amendment dated Dec. 4, 2009, 28 pages.
U.S. Appl. No. 11/007,139: Advisory Action dated Dec. 14, 2009, 4 pages.
U.S. Appl. No. 11/007,139: RCE with amendment dated Jan. 4, 2010, 27 pages.
U.S. Appl. No. 11/007,139: Non-Final Office Action dated Jan. 27, 2010, 31 pages.
U.S. Appl. No. 11/007,139: Response to Non-Final Office Action dated Apr. 27, 2010, 30 pages
U.S. Appl. No. 11/007,139: Office Action dated Jul. 20, 2010, 20 pages.
U.S. Appl. No. 11/007,139: Office Action response dated Oct. 20, 2010, 33 pages.
U.S. Appl. No. 11/007,139: Advisory Action dated Oct. 25, 2010, 2 pages.
U.S. Appl. No. 11/007,139: Office Action response dated Nov. 18, 2010, 24 pages.
U.S. Appl. No. 11/007,139: Advisory Action dated Dec. 1, 2010, 4 pages.
U.S. Appl. No. 11/007,139: Office Action response and Notice of Appeal dated Dec. 20, 2010, 29 pages.
U.S. Appl. No. 11/007,139: Office Action dated Jan. 3, 2011, 24 pages.
U.S. Appl. No. 11/007,139: Office Action response, dated May 3, 2011, 27 pages.
U.S. Appl. No. 11/007,139: Final Office Action, dated Jul. 18, 2011, 23 pages.
U.S. Appl. No. 11/007,139: Amendment after final dated Oct. 18, 2011, 30 pages.
U.S. Appl. No. 11/007,139: Advisory Action and rule 312 amendment, dated Nov. 4, 2011, 4 pages.
U.S. Appl. No. 11/007,139: Notice of Appeal dated Nov. 16, 2011, 1 page.
U.S. Appl. No. 11/007,139: Appeal Brief filed May 1, 2012, 93 pages.
U.S. Appl. No. 11/007,139: Notice of defective appeal brief, dated May 7, 2012, 3 pages.
U.S. Appl. No. 11/007,139: Appeal Brief dated May 15, 2012, 9 pages.
U.S. Appl. No. 11/007,139: Examiner's answer to appeal brief, dated Aug. 20, 2012, 35 pages.
U.S. Appl. No. 11/007,139: Reply Brief, dated Oct. 22, 2012, 29 pages.
U.S. Appl. No. 11/007,139: Appeal Docketing Notice, dated Nov. 6, 2012, 2 pages.
U.S. Appl. No. 11/007,139: Patent Board Decision, dated Jul. 24, 2015, 8 pages.
U.S. Appl. No. 11/007,139: RCE, dated Sep. 18, 2015, 19 pages.
U.S. Appl. No. 11/007,139: Non-Final Rejection, dated Dec. 31, 2015, 10 pages.
U.S. Appl. No. 11/007,139: Amendment/Req. Reconsideration—After Non-Final Rejection, dated Mar. 28, 2016, 19 pages.
U.S. Appl. No. 11/007,139: Final Rejection, dated Jun. 20, 2016, 12 pages.
U.S. Appl. No. 11/007,139: Response After Final Action, dated Jul. 29, 2016, 17 pages
U.S. Appl. No. 11/007,139: Notice of Allowance and Fees, dated Aug. 23, 2016, 10 pages.
U.S. Appl. No. 11/007,139: Filing Receipt, dated Sep. 2, 2016, 3 pages.
U.S. Appl. No. 11/007,139: RCE, dated Nov. 10, 2016, 3 pages.
U.S. Appl. No. 11/007,139: Notice of Allowance and Fees, dated Dec. 29, 2016, 8 pages.
U.S. Appl. No. 11/007,139: Issue Notification, dated Apr. 19, 2017, 1 page.
U.S. Appl. No. 15/043,267, filed Feb. 12, 2016, 92 pages.
U.S. Appl. No. 15/043,267: Preliminary Amendment, dated Feb. 12, 2016, 7 pages.
U.S. Appl. No. 15/043,267: Filing Receipt, dated Mar. 7, 2016, 3 pages.
U.S. Appl. No. 15/043,267: Preliminary Amendment, Jun. 10, 2016, 9 pages.
U.S. Appl. No. 15/043,267: Filing Receipt, dated Oct. 25, 2016, 3 pages.
U.S. Appl. No. 15/043,267: Notice of Publication, dated Feb. 2, 2017, 1 page.
U.S. Appl. No. 15/043,267: Non-Final Rejection, dated Apr. 2, 2019, 21 pages.
U.S. Appl. No. 11/006,320, filed Dec. 6, 2004, 75 pages.
U.S. Appl. No. 11/006,320: Response to Missing Parts and Preliminary Amendment dated May 9, 2005, 135 pages.
U.S. Appl. No. 11/006,320: Office Action—Restriction Requirement dated Mar. 26, 2007, 7 pages.
U.S. Appl. No. 11/006,320: Response to Restriction Requirement dated Apr. 27, 2007, 34 pages.
U.S. Appl. No. 11/006,320: Notice of Non-Compliant Amendment dated Jul. 6, 2007, 3 pages.
U.S. Appl. No. 11/006,320: Response to Non-Compliant Amendment dated Jul. 25, 2007, 33 pages.
U.S. Appl. No. 11/006,320: Non-final Office Action dated Oct. 1, 2007, 24 pages.
U.S. Appl. No. 11/006,320: Amendment dated Jan. 29, 2008, 45 pages.
U.S. Appl. No. 11/006,320: Notice of Non-Compliant Amendment dated Apr. 8, 2008, 4 pages.
U.S. Appl. No. 11/006,320: Amendment dated May 5, 2008, 44 pages.
U.S. Appl. No. 11/006,320: Non-final Office Action dated Aut. 15, 2008, 33 pages.
U.S. Appl. No. 11/006,320: Amendment dated Nov. 14, 2008, 40 pages
U.S. Appl. No. 11/006,320: Office Action—Shortened Statutory Period dated Jan. 27, 2009, 2 pages.
U.S. Appl. No. 11/006,320: Amendment dated Apr. 27, 2009, 44 pages.
U.S. Appl. No. 11/006,320: Final Office Action dated Jul. 29, 2009, 13 pages.
U.S. Appl. No. 11/006,320: Amendment dated Nov. 30, 2009, 10 pages.
U.S. Appl. No. 11/006,320: Non-final Office Action dated Dec. 4, 2009, 25 pages.
U.S. Appl. No. 11/006,320: Response to Non-Final Office Action dated Feb. 23, 2010, 11 pages.
U.S. Appl. No. 11/006,320: Final Office Action dated May 24, 2010, 11 pages.
U.S. Appl. No. 11/006,320: Office Action response dated Aug. 24, 2010, 15 pages.
U.S. Appl. No. 11/006,320: Notice of Allowance dated Sep. 17, 2010, 8 pages.
U.S. Appl. No. 11/006,320: Examiner Interview Summary and supplemental Notice of Allowance dated Dec. 17, 20, 9 pages.

(56) References Cited

OTHER PUBLICATIONS

U.S. Appl. No. 11/006,320: Rule 312 Amendment and Issue Fee payment dated Dec. 17, 2010, 10 pages.
U.S. Appl. No. 11/006,320: Issue Notification dated Jan. 12, 2011, 1 page.
U.S. Appl. No. 12/972,326, filed Dec. 17, 2010, 74 pages.
U.S. Appl. No. 12/972,326: Filing receipt and Notice to File Missing Parts dated Jan. 6, 2011, 5 pages.
U.S. Appl. No. 12/972,326: Response to Notice to File Missing parts dated Jan. 26, 2011, 14 pages.
U.S. Appl. No. 12/972,326: Filing Receipt, dated Feb. 18, 2011, 3 pages.
U.S. Appl. No. 12/972,326: Preliminary amendment dated May 20, 2011, 15 pages.
U.S. Appl. No. 12/972,326: Notice of publication and non-compliant amendment dated Jun. 2, 2011, 3 pages.
U.S. Appl. No. 12/972,326: Preliminary amendment dated Jul. 5, 2011, 21 pages.
U.S. Appl. No. 12/972,326: Notice of additional fee due, dated Jul. 12, 2011, 2 pages.
U.S. Appl. No. 12/972,326: Preliminary Amendment dated Aug. 10, 2011, 7 pages.
U.S. Appl. No. 12/972,326: Non-Final Office Action, dated Feb. 23, 2012, 9 pages
U.S. Appl. No. 12/972,326: Abandonment, dated Sep. 18, 2012, 2 pages.
U.S. Appl. No. 13/014,677, filed Jan. 26, 2011, 90 pages.
U.S. Appl. No. 13/014,677: Notice to file missing parts and filing receipt, dated Mar. 23, 2011, 5 pages.
U.S. Appl. No. 13/014,677: Notice of Abandonment dated Nov. 29, 2011, 2 pages.
U.S. Appl. No. 11/006,848, filed Dec. 7, 2004, 59 pages.
U.S. Appl. No. 11/006,848: Notice to File Missing Parts dated Mar. 18, 2005, 2 pages.
U.S. Appl. No. 11/006,848: Response to Notice to File Missing Parts dated May 3, 2005, 101 pages.
U.S. Appl. No. 11/006,848: Non-Final Office Action dated Apr. 4, 2007, 11 pages.
U.S. Appl. No. 11/006,848: Response to Non-Final Office Action dated Oct. 3, 2007, 20 pages.
U.S. Appl. No. 11/006,848: Supplemental Amendment dated Nov. 13, 2007, 4 pages.
U.S. Appl. No. 11/006,848: Non-Final Office Action dated Feb. 5, 2008, 16 pages.
U.S. Appl. No. 11/006,848: Response to Non-Final Office Action dated Aug. 4, 2008, 27 pages.
U.S. Appl. No. 11/006,848: Final Office Action dated Dec. 2, 2008, 30 pages.
U.S. Appl. No. 11/006,848: RCE filed May 4, 2009, 24 pages.
U.S. Appl. No. 11/006,848: Notice of Allowance dated Jun. 11, 2009, 8 pages.
U.S. Appl. No. 11/006,848: Issue fee dated Sep. 11, 2009, 10 pages.
U.S. Appl. No. 11/006,848: Issue Notification dated Oct. 28, 2009, 1 page.
U.S. Appl. No. 12/573,829, filed Oct. 5, 2009, 64 pages.
U.S. Appl. No. 12/573,829: Notice to File Missing Parts and Filing Receipt dated Oct. 20, 2009, 5 pages.
U.S. Appl. No. 12/573,829: Preliminary Amendment dated Dec. 21, 2009, 17 pages.
U.S. Appl. No. 12/573,829: Filing receipt dated Jan. 4, 2010, 5 pages.
U.S. Appl. No. 12/573,829: Notice of Publication dated Apr. 15, 2010, 1 page.
U.S. Appl. No. 12/573,829: Office Action dated Jun. 28, 2010, 35 pages
U.S. Appl. No. 12/573,829: Office Action Response dated Sep. 28, 2010, 22 pages.
U.S. Appl. No. 12/573,829: Office Action dated Nov. 1, 2010, 29 pages.
U.S. Appl. No. 12/573,829: Office Action Response dated Jan. 3, 2011, 29 pages.
U.S. Appl. No. 12/573,829: Advisory Action dated Jan. 7, 2011, 3 pages.
U.S. Appl. No. 12/573,829: Notice of Appeal dated Jan. 11, 2011, 1 page.
U.S. Appl. No. 12/573,829: Appeal Brief, dated May 4, 2011, 68 pages.
U.S. Appl. No. 12/573,829: Examiner's Answer to Appeal Brief, dated Jul. 21, 2011, 31 pages.
U.S. Appl. No. 12/573,829: Reply brief dated Sep. 21, 2011, 17 pages.
U.S. Appl. No. 12/573,829: Reply brief noted dated Oct. 5, 2011, 2 pages.
U.S. Appl. No. 12/573,829: Appeal Docketing notice Oct. 11, 2011, 2 pages.
U.S. Appl. No. 12/573,829: Appeal Board Decision, dated May 9, 2014, 10 pages.
U.S. Appl. No. 12/573,829: Request for continued examination, dated Jul. 9, 2014, 19 pages.
U.S. Appl. No. 12/573,829: Non-Final Rejection and Examiner's Search, dated Apr. 28, 2015, 22 pages.
U.S. Appl. No. 12/573,829: Amendment/Req. Reconsideration After Non-Final Rejection, dated Jul. 27, 2015, 21 pages.
U.S. Appl. No. 12/573,829: Final Rejection and Examiner search, dated Sep. 15, 2015, 17 pages.
U.S. Appl. No. 12/573,829: Response After Final Action, dated Nov. 16, 2015, 17 pages.
U.S. Appl. No. 12/573,829: Advisory Action, filed Dec. 2, 2015, 4 pages.
U.S. Appl. No. 12/573,829: Request for Continued Examination and Amendments, dated Dec. 14, 2015, 17 pages.
U.S. Appl. No. 12/573,829: Non-Final Rejection, dated Jun. 13, 2016, 18 pages.
U.S. Appl. No. 12/573,829: Amendment/Req. Reconsideration-After Non-Final Reject, filed Sep. 13, 2016, 24 pages.
U.S. Appl. No. 12/573,829: Filing Receipt, Sep. 15, 2016, 3 pages.
U.S. Appl. No. 12/573,829: Non-Final Rejection, dated Dec. 16, 2016, 10 pages.
U.S. Appl. No. 12/573,829: Amendment/Req. Reconsideration—After Non-Final Reject, dated Mar. 16, 2017, 18 pages.
U.S. Appl. No. 12/573,829: Final Rejection, dated May 2, 2017, 20 pages
U.S. Appl. No. 12/573,829: After Final Consideration Program Request, dated Jul. 5, 2017, 13 pages.
U.S. Appl. No. 12/573,829: Advisory Action/After Final Consideration Program Decision, dated Aug. 29, 2017, 5 pages.
U.S. Appl. No. 12/573,829: RCE and Amendments, dated Sep. 5, 2017, 24 pages.
U.S. Appl. No. 12/573,829: Non-Final Rejection, dated Dec. 27, 2017, 13 pages.
U.S. Appl. No. 12/573,829: Amendment/Req. Reconsideration—After Non-Final Reject, dated Mar. 27, 2018, 22 pages.
U.S. Appl. No. 12/573,829: Final Rejection, dated Jul. 11, 2018, 15 pages.
U.S. Appl. No. 12/573,829: After Final Consideration Program Request, dated Sep. 7, 2018, 23 pages.
U.S. Appl. No. 12/573,829: Advisory Action, dated Sep. 24, 2018, 4 pages.
U.S. Appl. No. 12/573,829: RCE and Amendments, dated Oct. 9, 2018, 20 pages.
U.S. Appl. No. 11/006,841, filed Dec. 7, 2004, 63 pages.
U.S. Appl. No. 11/006,841: Notice to file missing parts dated Jan. 10, 2005, 2 pages.
U.S. Appl. No. 11/006,841: Response to Notice to file missing parts and preliminary amendment dated Apr. 14, 2005, 105 pages.
U.S. Appl. No. 11/006,841: Non-Final OA dated Apr. 6, 2007, 16 pages.
U.S. Appl. No. 11/006,841: Response to Non-Final OA dated Sep. 6, 2007, 63 pages.
U.S. Appl. No. 11/006,841: Restriction Requirement dated Nov. 27, 2007, 5 pages.

(56) References Cited

OTHER PUBLICATIONS

U.S. Appl. No. 11/006,841: Restriction Requirement response dated Dec. 27, 2007, 36 pages.
U.S. Appl. No. 11/006,841: Restriction Requirement dated Mar. 17, 2008, 9 pages.
U.S. Appl. No. 11/006,841: Response to Restriction Requirement dated Jul. 17, 2008, 33 pages.
U.S. Appl. No. 11/006,841: Final Office Action dated Oct. 29, 2008, 54 pages.
U.S. Appl. No. 11/006,841: Response to Final Office Action dated Dec. 29, 2008, 45 pages.
U.S. Appl. No. 11/006,841: Advisory Action dated Jan. 6, 2009, 3 pages.
U.S. Appl. No. 11/006,841: RCE dated Apr. 23, 2009, 48 pages.
U.S. Appl. No. 11/006,841: Supplemental Response dated Jun. 26, 2009, 34 pages.
U.S. Appl. No. 11/006,841: Notice of Allowance dated Jun. 29, 2009, 40 pages
U.S. Appl. No. 11/006,841: Issue Fee dated Sep. 29, 2009, 4 pages.
U.S. Appl. No. 11/006,841: Issue Notification dated Nov. 11, 2009, 1 page.
U.S. Appl. No. 12/578,411: Continuation application dated Oct. 13, 2009, 75 pages.
U.S. Appl. No. 12/578,411: Notice of Missing Parts dated Oct. 28, 2009, 6 pages.
U.S. Appl. No. 12/578,411: Response to Missing Parts dated Dec. 28, 2009, 25 pages.
U.S. Appl. No. 12/578,411: Filing Receipt dated Jan. 7, 2010, 3 pages.
U.S. Appl. No. 12/578,411: Notice of Publication dated Apr. 15, 2010, 1 page.
U.S. Appl. No. 12/578,411: Restriction requirement dated Jun. 8, 2011, 6 pages.
U.S. Appl. No. 12/578,411: Response to restriction requirement dated Jul. 6, 2011, 19 pages.
U.S. Appl. No. 12/578,411: Non-Final Office Action, dated Aug. 23, 2011, 19 pages.
U.S. Appl. No. 12/578,411: Non-Final Office Action response dated Dec. 22, 2011, 38 pages.
U.S. Appl. No. 12/578,411: Final Rejection dated Jan. 20, 2012, 16 pages.
U.S. Appl. No. 12/578,411: Amendment, dated May 21, 2012, 23 pages.
U.S. Appl. No. 12/578,411: Advisory Action, dated May 31, 2012, 4 pages.
U.S. Appl. No. 12/578,411: RCE, dated Jun. 12, 2012, 38 pages.
U.S. Appl. No. 12/578,411: Notice of Allowance, dated Aug. 19, 2013, 19 pages.
U.S. Appl. No. 12/578,411: Issue fee payment and Rule 312 amendment, dated Nov. 14, 2013, 14 pages.
U.S. Appl. No. 12/578,411: Examiner response to rule 312 amendment, dated Nov. 19, 2013, 2 pages.
U.S. Appl. No. 12/578,411: Response to Amendment under rule 312, dated Dec. 3, 2013, 3 pages.
U.S. Appl. No. 12/578,411: Issue Notification, dated Dec. 18, 2013, 1 page.
U.S. Appl. No. 14/086,837, filed Nov. 21, 2013, 68 Pages.
U.S. Appl. No. 14/086,837: Notice to File Missing Parts, dated Dec. 12, 2013, 5 Pages.
U.S. Appl. No. 14/086,837: Applicant Response to Pre-Exam Formalities Notice, dated Jun. 11, 2014, 26 Pages.
U.S. Appl. No. 14/086,837: Notice of Publication, dated Sep. 25, 2014, 4 Pages.
U.S. Appl. No. 14/086,837, Terminal Disclaimer, filed Nov. 14, 2014, 1 page.
U.S. Appl. No. 14/086,837: Examiner's search strategy and results, dated Dec. 2, 2014, 9 pages.
U.S. Appl. No. 14/086,837: Notice of Allowance and Fees, dated Dec. 2, 2014, 17 pages.
U.S. Appl. No. 14/086,837: Amendment After Notice of Allowance, dated Feb. 27, 2015, 9 pages.
U.S. Appl. No. 14/086,837, Issue Fee Payment, filed Feb. 27, 2015, 1 page.
U.S. Appl. No. 14/086,837: Issue Notification, dated May 6, 2015, 1 page.
U.S. Appl. No. 14/635,836, filed Mar. 2, 2015, 70 pages.
U.S. Appl. No. 14/635,836: Filing Receipt, dated Mar. 12, 2015, 3 pages.
U.S. Appl. No. 14/635,836: Notice to File Missing Parts, dated Mar. 12, 2015, 2 pages.
U.S. Appl. No. 14/635,836: Applicant Response to Pre-Exam Formalities Notice, dated May 12, 2015, 40 pages.
U.S. Appl. No. 14/635,836: Filing Receipt, dated May 19, 2015, 3 pages.
U.S. Appl. No. 14/635,836: Notice of Publication, dated Aug. 27, 2015, 1 page.
U.S. Appl. No. 14/635,836, Electronic Terminal Disclaimer Approved and Filed, dated Nov. 13, 2015, 3 pages.
U.S. Appl. No. 14/635,836: Notice of Allowance and Fees Due, dated Apr. 18, 2016, 25 pages.
U.S. Appl. No. 14/635,836: Issue Fee Payment and Amendment after NOA, dated Jul. 15, 2016, 15 pages.
U.S. Appl. No. 14/635,836: Response to Amendment under Rule 312, dated Jul. 21, 2016, 1 page.
U.S. Appl. No. 14/635,836: Response to Amendment under Rule 312, dated Jul. 22, 2016, 2 page.
U.S. Appl. No. 14/635,836: Issue Notification, dated Aug. 10, 2016, 1 page.
U.S. Appl. No. 15/250,118, filed Aug. 29, 2016, 71 pages.
U.S. Appl. No. 15/250,118: Preliminary Amendment, dated Aug. 29, 2016, 20 pages.
U.S. Appl. No. 15/250,118: Filing Receipt, dated Sep. 9, 2016, 3 pages.
U.S. Appl. No. 15/250,118: Applicant Response to Pre-Exam Formalities Notice, dated Nov. 8, 2016, 21 pages
U.S. Appl. No. 15/250,118: Filing Receipt, dated Nov. 15, 2016, 3 pages.
U.S. Appl. No. 15/250,118: Notice of Publication, dated Feb. 23, 2017, 1 page.
U.S. Appl. No. 15/250,118: Non-Final Rejection, dated Jun. 15, 2017, 22 pages.
U.S. Appl. No. 15/250,118: Amendment/Req. Reconsideration—After Non-Final Reject, dated Sep. 14, 2017, 44 pages.
U.S. Appl. No. 15/250,118: Final Rejection, dated Dec. 15, 2017, 25 pages.
U.S. Appl. No. 15/250,118: RCE and Amendments, dated Apr. 16, 2018, 44 pages.
U.S. Appl. No. 15/250,118: Terminal Disclaimer, Dec. 11, 2018, 4 pages.
U.S. Appl. No. 15/250,118: Notice of Allowance and Fees Due, dated Jan. 8, 2019, 32 pages.
U.S. Appl. No. 15/250,118: Amendment after Notice of Allowance, dated Jan. 23, 2019, 18 pages.
U.S. Appl. No. 15/250,118: Issue Fee Payment, dated Apr. 5, 2019, 20 pages.
U.S. Appl. No. 11/006,440, filed Dec. 6, 2004, 85 pages.
U.S. Appl. No. 11/006,440: Notice to file missing parts dated Jan. 11, 2005, 2 pages.
U.S. Appl. No. 11/006,440: Response to Notice to file missing parts dated Mar. 15, 2005, 8 pages.
U.S. Appl. No. 11/006,440: Preliminary Amendment dated Apr. 28, 2005, 140 pages.
U.S. Appl. No. 11/006,440: Preliminary Amendment and Substitute Specification dated Oct. 10, 2006, 139 pages.
U.S. Appl. No. 11/006,440: Restriction Requirement dated Mar. 29, 2007, 5 pages.
U.S. Appl. No. 11/006,440: Response to Restriction Requirement dated Apr. 30, 2007, 42 pages.
U.S. Appl. No. 11/006,440: Non-Final Office Action dated Jun. 21, 2007, 15 pages.
U.S. Appl. No. 11/006,440: Response to Non-Final Office Action dated Nov. 20, 2007, 42 pages.

(56) References Cited

OTHER PUBLICATIONS

U.S. Appl. No. 11/006,440: Final Office Action dated Feb. 6, 2008, 13 pages.
U.S. Appl. No. 11/006,440: Response to Final Office Action dated Apr. 7, 2008, 34 pages.
U.S. Appl. No. 11/006,440: Advisory Action dated May 9, 2008, 3 pages.
U.S. Appl. No. 11/006,440: Notice of appeal dated Aug. 4, 2008, 1 page.
U.S. Appl. No. 11/006,440: RCE dated Nov. 4, 2008, 39 pages.
U.S. Appl. No. 11/006,440: Final Office Action dated Jan. 23, 2009, 22 pages
U.S. Appl. No. 11/006,440: Amendment after Final dated Apr. 23, 2009, 34 pages.
U.S. Appl. No. 11/006,440: Supplemental Amendment dated Jul. 17, 2009, 29 pages.
U.S. Appl. No. 11/006,440: Notice of Allowance dated Jul. 31, 2009, 15 pages.
U.S. Appl. No. 11/006,440: Examiner's Amendment and Reasons for Allowance dated Sep. 3, 2009, 9 pages.
U.S. Appl. No. 11/006,440: Issue Fee dated Nov. 2, 2009, 12 pages.
U.S. Appl. No. 11/006,440: Issue Notification dated Dec. 2, 2009, 1 page.
U.S. Appl. No. 12/627,816: Continuation application dated Nov. 30, 2009, 95 pages.
U.S. Appl. No. 12/627,816: Notice of Missing Parts dated Dec. 15, 2009, 2 pages.
U.S. Appl. No. 12/627,816: Response to Missing Parts dated Apr. 12, 2010, 21 pages.
U.S. Appl. No. 12/627,816: Filing Receipt dated Apr. 20, 2010, 3 pages.
U.S. Appl. No. 12/627,816: Notice of Publication dated Jul. 29, 1200, 1 page.
U.S. Appl. No. 12/627,816, Non-Final OA, filed May 5, 2011, 19 pages.
U.S. Appl. No. 12/627,816: Non-Final OA response, filed Nov. 7, 2011, 12 pages.
U.S. Appl. No. 12/627,816: Final Rejection dated Nov. 17, 2011, 18 pages.
U.S. Appl. No. 12/627,816: RCE dated Feb. 17, 2012, 20 pages.
U.S. Appl. No. 12/627,816: Terminal disclaimer review, dated Mar. 7, 2012, 1 page.
U.S. Appl. No. 12/627,816: Notice of Allowance, dated Aug. 1, 2013, 16 pages.
U.S. Appl. No. 12/627,816: Issue fee payment and Rule 312 amendment, dated Nov. 1, 2013, 14 pages.
U.S. Appl. No. 12/627,816: Examiner response to rule 312 amendment, dated Nov. 13, 2013, 2 pages.
U.S. Appl. No. 12/627,816: Issue Notification, dated Nov. 26, 2013, 1 page.
U.S. Appl. No. 14/086,808, filed Nov. 21, 2013, 87 Pages.
U.S. Appl. No. 14/086,808: Notice to File Missing Parts and Filing Receipt, dated Dec. 11, 2013, 5 Pages.
U.S. Appl. No. 14/086,808: Applicant Response to Pre-Exam Formalities Notice, dated Jun. 11, 2014, 53 Pages.
U.S. Appl. No. 14/086,808: Filing receipt, dated Jun. 17, 2014, 3 Pages.
U.S. Appl. No. 14/086,808: Notice of Publication, dated Sep. 25, 2014, 1 Page.
U.S. Appl. No. 14/086,808: Terminal Disclaimer, dated Oct. 24, 2014, 2 pages.
U.S. Appl. No. 14/086,808: Terminal Disclaimer Review Decision, dated Oct. 29, 2014, 1 page.
U.S. Appl. No. 14/086,808: Terminal Disclaimer, dated Nov. 4, 2014, 2 pages.
U.S. Appl. No. 14/086,808: Terminal Disclaimer Review Decision, dated Nov. 13, 2014, 1 page.
U.S. Appl. No. 14/086,808: Examiner's search strategy and results, dated Nov. 17, 2014, 5 pages.
U.S. Appl. No. 14/086,808: Notice of Allowance and fees, dated Nov. 17, 2014, 16 pages.
U.S. Appl. No. 14/086,808: Issue Fee Payment and Rule 312 amendment, dated Feb. 17, 2015, 1 page.
U.S. Appl. No. 14/086,808: Amendment After Notice of Allowance, dated Feb. 17, 2015, 17 pages.
U.S. Appl. No. 14/086,808: Response to Amendment under Rule 312, dated Feb. 20, 2015, 2 pages.
U.S. Appl. No. 14/086,808: Response to Amendment under Rule 312, dated Feb. 25, 2015, 3 pages.
U.S. Appl. No. 14/086,808: Issue Notification, dated Mar. 18, 2015, 1 page.
U.S. Appl. No. 14/625,473, filed Feb. 18, 2015, 92 pages.
U.S. Appl. No. 14/625,473: Filing Receipt, dated Mar. 18, 2015, 3 pages.
U.S. Appl. No. 14/625,473: Notice to File Missing Parts, dated Mar. 18, 2015.
U.S. Appl. No. 14/625,473, Response to Pre-Exam Formalities Notice and Preliminary Amendment, filed May 18, 2015, 28 pages.
U.S. Appl. No. 14/625,473: Filing Receipt, dated May 20, 2015, 3 pages.
U.S. Appl. No. 14/625,473: Notice of Publication, dated Aug. 27, 2015, 1 page.
U.S. Appl. No. 14/625,473: Electronic Terminal Disclaimer Filed and Approved, dated Nov. 13, 2015, 3 pages.
U.S. Appl. No. 14/625,473: Notice of Allowance, dated Mar. 28, 2016, 19 pages.
U.S. Appl. No. 14/625,473: Issue Fee Payment and Amendments after Notice of Allowance, dated Jun. 28, 2016, 24 pages.
U.S. Appl. No. 14/625,473: Issue Notification, dated Jul. 20, 2016, 1 page
U.S. Appl. No. 15/214,168: Application as filed with preliminary amendments, dated Jul. 19, 2016, 116 pages.
U.S. Appl. No. 15/214,168: Filing Receipt, dated Aug. 3, 2016, 4 pages.
U.S. Appl. No. 15/214,168: Corrected Filing Receipt, dated Oct. 12, 2016, 4 pages.
U.S. Appl. No. 15/214,168: Notice of Publication, dated Nov. 10, 2016, 1 page.
U.S. Appl. No. 15/214,168: Non-Final Rejection, Mar. 2, 2017, 20 pages.
U.S. Appl. No. 15/214,168: Amendment/Req. Reconsideration—After Non-Final Reject, dated Jun. 2, 2017, 39 pages.
U.S. Appl. No. 15/214,168: Terminal Disclaimer, dated Jul. 17, 2017, 4 pages.
U.S. Appl. No. 15/214,168: Notice of Allowance and Fees Due, dated Aug. 1, 2017, 26 pages.
U.S. Appl. No. 15/214,168: Amendment after Notice of Allowance, dated Nov. 1, 2017, 22 pages.
U.S. Appl. No. 15/214,168: Issue Notification, dated Nov. 21, 2017, 1 page.
U.S. Appl. No. 15/802,348: Application as filed with Preliminary Amendment, dated Nov. 2, 2017, 126 pages.
U.S. Appl. No. 15/802,348: Filing Receipt, dated Nov. 30, 2017, 4 pages.
U.S. Appl. No. 15/802,348: Notice to File Corrected Application Papers, dated Nov. 30, 2017, 2 pages.
U.S. Appl. No. 15/802,348: Applicant Response to Pre-Exam Formalities Notice, dated Jan. 9, 2018, 17 pages.
U.S. Appl. No. 15/802,348: Filing Receipt, dated Jan. 11, 2018, 4 pages.
U.S. Appl. No. 15/802,348: Notice of Publication, dated Apr. 19, 2018, 1 page.
U.S. Appl. No. 15/802,348: Preliminary Amendment, dated Oct. 26, 2018, 24 pages.
U.S. Appl. No. 15/802,348: Non-Final Rejection, dated Feb. 11, 2019, 18 pages.
U.S. Appl. No. 15/802,348: Amendment/Req. Reconsideration—After Non-Final Reject, dated May 13, 2019, 22 pages.
U.S. Appl. No. 11/006,446, filed Dec. 6, 2004, 91 pages.
U.S. Appl. No. 11/006,446: Notice of Missing Parts dated Jan. 24, 2005, 3 pages.

(56) References Cited

OTHER PUBLICATIONS

U.S. Appl. No. 11/006,446: Response to Notice to File Missing Parts dated Mar. 29, 2005, 8 pages.
U.S. Appl. No. 11/006,446: Preliminary Amendment dated Apr. 28, 2005, 118 pages.
U.S. Appl. No. 11/006,446: Office Action—Restriction Requirement dated Apr. 4, 2007, 5 pages.
U.S. Appl. No. 11/006,446: Response to Office Action—Restriction Requirement dated May 3, 2007, 6 pages.
U.S. Appl. No. 11/006,446: Non-final Office Action dated Jul. 26, 2007, 45 pages.
U.S. Appl. No. 11/006,446: Amendment dated Nov. 26, 2007, 38 pages.
U.S. Appl. No. 11/006,446: Non-final Office Action dated Feb. 20, 2008, 67 pages.
U.S. Appl. No. 11/006,446: Amendment dated Jul. 21, 2008, 33 pages.
U.S. Appl. No. 11/006,446: Final Office Action dated Oct. 28, 2008, 49 pages.
U.S. Appl. No. 11/006,446: Amendment dated Dec. 29, 2008, 33 pages.
U.S. Appl. No. 11/006,446: Advisory Action datled Jan. 7, 2009, 4 pages.
U.S. Appl. No. 11/006,446: RCE with Amendment dated Apr. 28, 2009, 38 pages.
U.S. Appl. No. 11/006,446: Non-final Office Action dated Jul. 7, 2009, 41 pages.
U.S. Appl. No. 11/006,446: Examiner Interview Summary and Search Results dated Oct. 26, 2009, 6 pages.
U.S. Appl. No. 11/006,446: Amendment dated Dec. 7, 2009, 33 pages.
U.S. Appl. No. 11/006,446: Examiner Interview Summary datled Mar. 19, 2010, 4 pages.
U.S. Appl. No. 11/006,446: Notice of Allowance/Allowability dated Mar. 19, 2010, 29 pages.
U.S. Appl. No. 11/006,446: Issue Fee Payment and 312 Amendment filed Jun. 21, 2010, 23 pages.
U.S. Appl. No. 11/006,446: Rule 312 Amendment dated Aug. 19, 2010, 2 pages.
U.S. Appl. No. 11/006,446: Formal drawings dated Aug. 25, 2010, 29 pages.
U.S. Appl. No. 11/006,446: Issue Notification dated Sep. 1, 2010, 1 page.
U.S. Appl. No. 12/830,236: Divisional Application filed Jul. 2, 2010, 103 pages.
U.S. Appl. No. 12/830,236: Notice to File Corrected Application Papers dated Jul. 16, 2010, 5 pages.
U.S. Appl. No. 12/830,236: Response to Notice to File Corrected Application Papers dated Aug. 25, 2010, 32 pages.
U.S. Appl. No. 12/830,236: Filing receipt dated Sep. 3, 2010, 3 pages.
U.S. Appl. No. 12/830,236: Notice of Publication dated Dec. 16, 2010, 1 page.
U.S. Appl. No. 12/830,236: Restriction requirement dated Mar. 18, 2011, 6 pages
U.S. Appl. No. 12/830,236: Restriction requirement response, dated Apr. 18, 2011, 5 pages.
U.S. Appl. No. 12/830,236: Non-Final Office Action, dated May 11, 2011, 10 pages.
U.S. Appl. No. 12/830,236: Response to Non-Final Office Action dated Jul. 6, 2011,18 pages.
U.S. Appl. No. 12/830,236: Final Office Action, dated Oct. 14, 2011, 18 pages.
U.S. Appl. No. 12/830,236: Amendment after final, dated Jan. 17, 2012, 26 pages.
U.S. Appl. No. 12/830,236: Advisory Action, dated Feb. 8, 2012, 6 pages.
U.S. Appl. No. 12/830,236: Notice of Appeal dated Mar. 8, 2012, 3 pages.
U.S. Appl. No. 12/830,236: RCE, dated Jun. 5, 2012, 23 pages.
U.S. Appl. No. 12/830,236: Non-Final Office Action, dated Jul. 31, 2012, 18 pages.
U.S. Appl. No. 12/830,236: Amendment, filed Nov. 1, 2012, 27 pages.
U.S. Appl. No. 12/830,236: Final Office Action, dated Feb. 27, 2013, 35 pages.
U.S. Appl. No. 12/830,236: Response after final, dated Jun. 27, 2013, 36 pages.
U.S. Appl. No. 12/830,236: Advisory action, dated Jul. 12, 2013, 4 pages.
U.S. Appl. No. 12/830,236: Notice of appeal, dated Jul. 19, 2013, 2 pages.
U.S. Appl. No. 12/830,236: Appeal brief, dated Sep. 18, 2013, 44 pages.
U.S. Appl. No. 12/830,236: Appeal brief, filed Sep. 18, 2013, 44 pages.
U.S. Appl. No. 12/830,236: Examiners answer to appeal brief, dated Dec. 18, 2013, 35 pages.
U.S. Appl. No. 12/830,236: Reply Brief as Filed on Feb. 18, 2014, 16 Pages.
U.S. Appl. No. 12/830,236: Appeal Docketing Notice, dated Mar. 21, 2014, 2 Pages.
U.S. Appl. No. 12/830,236: Patent Board Decision, dated Mar. 9, 2016, 6 pages.
U.S. Appl. No. 12/830,236: RCE and Amendments, dated Apr. 27, 2016, 15 pages.
U.S. Appl. No. 12/830,236: Non-Final Rejection and Examiner Search, dated Jun. 29, 2016, 75 pages.
U.S. Appl. No. 12/830,236: Amendment/Req. Reconsideration—After Non-Final Reject, dated Sep. 6, 2016, 12 pages.
U.S. Appl. No. 12/830,236: Final Rejection, dated Dec. 14, 2016, 22 pages.
U.S. Appl. No. 12/830,236: Response After Final Action, dated Feb. 13, 2017, 14 pages.
U.S. Appl. No. 12/830,236: Advisory Action, dated Mar. 3, 2017, 2 pages.
U.S. Appl. No. 12/830,236: RCE and Amendments, dated Apr. 14, 2017, 17 pages.
U.S. Appl. No. 12/830,236: Non-Final Rejection, dated Jun. 21, 2017, 30 pages.
U.S. Appl. No. 12/830,236: Amendment/Req. Reconsideration—After Non-Final Reject, dated Oct. 23, 2017, 18 pages.
U.S. Appl. No. 12/830,236: Non-Final Rejection, dated Feb. 6, 2018, 28 pages.
U.S. Appl. No. 12/830,236: Amendment/Req. Reconsideration—After Non-Final Reject, dated May 4, 2018, 26 pages.
U.S. Appl. No. 12/830,236: Final Rejection, dated Sep. 5, 2018, 30 pages.
U.S. Appl. No. 12/830,236: After Final Consideration Program Request, dated Nov. 5, 2018, 24 pages.
U.S. Appl. No. 12/830,236: After Final Consideration Program Decision, dated Nov. 18, 2018, 4 pages.
U.S. Appl. No. 12/830,236: Notice of Allowance and Fees Due, dated Apr. 2, 2019, 15 pages.
U.S. Appl. No. 11/385,257, filed Mar. 20, 2006, 118 pages.
U.S. Appl. No. 11/385,257: Notice of Missing Parts mailed May 3, 2006, 2 pages.
U.S. Appl. No. 11/385,257: Response to Missing Parts filed Aug. 3, 2006, 46 pages.
U.S. Appl. No. 11/385,257: Notice of Publication dated Nov. 30, 2006, 1 page.
U.S. Appl. No. 11/385,257: Non-final Office Action dated Apr. 29, 2008, 44 pages.
U.S. Appl. No. 11/385,257: Amendment filed Jul. 29, 2008, 29 pages.
U.S. Appl. No. 11/385,257: Final Office Action dated Dec. 9, 2008, 47 pages.
U.S. Appl. No. 11/385,257: RCE with Amendment dated May 11, 2009, 38 pages.
U.S. Appl. No. 11/385,257: Supplemental Amendment dated May 26, 2009, 32 pages.
U.S. Appl. No. 11/385,257: Notice of Non-Compliant Amendment dated Jun. 1, 2009, 3 pages.

(56) References Cited

OTHER PUBLICATIONS

U.S. Appl. No. 11/385,257: Amendment dated Jun. 30, 2009, 34 pages.
U.S. Appl. No. 11/385,257: Non-final Office Action dated Sep. 14, 2009, 60 pages.
U.S. Appl. No. 11/385,257: Response to Non-Final Office Action dated Jan. 13, 2010, 34 pages
U.S. Appl. No. 11/385,257: Final Office Action dated Apr. 12, 2010, 47 pages.
U.S. Appl. No. 11/385,257: RCE dated Aug. 12, 2010, 35 pages.
U.S. Appl. No. 11/385,257: Office Action dated Sep. 30, 2010, 39 pages.
U.S. Appl. No. 11/385,257: Office Action response, dated Mar. 29, 2011, 31 pages.
U.S. Appl. No. 11/385,257: Final Rejection dated Jun. 1, 2011, 40 pages.
U.S. Appl. No. 11/385,257: Request for continued Examination dated Nov. 1, 2011, 30 pages.
U.S. Appl. No. 11/385,257: Non-Final Office Action, dated Jan. 9, 2012, 40 pages.
U.S. Appl. No. 11/385,257: Amendment, dated Apr. 6, 2012, 30 pages.
U.S. Appl. No. 11/385,257: Notice of allowance and Examiner interview summary, dated Jun. 22, 2012, 36 pages.
U.S. Appl. No. 11/385,257: Office communication concerning previous IDS filing, dated Oct. 4, 2012, 4 pages.
U.S. Appl. No. 11/385,257: Miscellaneous Communication to Applicant, dated Oct. 15, 2012, 3 pages.
U.S. Appl. No. 11/385,257: Rule 312 Amendment, dated Dec. 12, 2012, 10 pages.
U.S. Appl. No. 11/385,257: Issue Notification, dated Dec. 22, 2012, 1 page.
U.S. Appl. No. 13/625,812, filed Sep. 24, 2012, 123 pages.
U.S. Appl. No. 13/625,812, Notice to file missing parts, filed Oct. 15, 2012, 6 pages.
U.S. Appl. No. 13/625,812: Response to Notice to file missing parts and preliminary amendment, dated Mar. 8, 2013, 47 pages.
U.S. Appl. No. 13/625,812: Notice of incomplete reply, dated Mar. 15, 2013, 3 pages.
U.S. Appl. No. 13/625,812: Response to incomplete reply notice, dated Apr. 2, 2013, 5 pages.
U.S. Appl. No. 13/625,812: Non-Final office action, dated Jul. 26, 2013, 29 pages.
U.S. Appl. No. 13/625,812: Publication notice, dated Aug. 1, 2013, 1 page.
U.S. Appl. No. 13/625,812: Response to non-final office action, dated Oct. 9, 2013, 15 pages.
U.S. Appl. No. 13/625,812: Final rejection, dated Dec. 3, 2013, 28 pages
U.S. Appl. No. 13/625,812: Response After Final Action, dated Apr. 1, 2014, 1 Page.
U.S. Appl. No. 13/625,812: Advisory Action (PTOL-303), dated Apr. 9, 2014, 3 Pages.
U.S. Appl. No. 13/625,812: Notice of Appeal, filed May 5, 2014, 1 Page.
U.S. Appl. No. 13/625,812: Request for Continued Examination, dated Aug. 4, 2014, 18 Pages.
U.S. Appl. No. 13/625,812: Request for Corrected Filing Receipt, dated Aug. 21, 2014, 6 Pages.
U.S. Appl. No. 13/625,812: Filing Receipt, dated Aug. 27, 2014, 3 Pages.
U.S. Appl. No. 13/625,812: Notice of Allowance and Fees, dated Dec. 9, 2014, 20 pages.
U.S. Appl. No. 13/625,812: Filing Receipt, dated Feb. 2, 2015, 3 pages.
U.S. Appl. No. 13/625,812: Filing Receipt, dated Feb. 6, 2015, 3 pages.
U.S. Appl. No. 13/625,812, Terminal Disclaimer filed Mar. 2, 2015, 1 page.
U.S. Appl. No. 13/625,812: Post Allowance Arguments/Amendments, dated Mar. 6, 2015, 6 pages.
U.S. Appl. No. 13/625,812: Amendment After Notice of Allowance, dated Mar. 9, 2015, 3 pages.
U.S. Appl. No. 13/625,812, Issue Fee Payment, filed Mar. 9, 2015, 1 page.
U.S. Appl. No. 13/625,812, Terminal Disclaimer Review Decision, filed Mar. 12, 2015.
U.S. Appl. No. 14/641,735, filed Mar. 9, 2015, 126 pages.
U.S. Appl. No. 14/641,735, Filing Receipt, filed Mar. 20, 2015, 3 pages.
U.S. Appl. No. 14/641,735, Notice to File Missing Parts, filed Mar. 20, 2015, 2 pages.
U.S. Appl. No. 14/641,735: Notice of Incomplete Reply,dated Jun. 26, 2015, 2 pages.
U.S. Appl. No. 14/641,735: Applicant Response to Pre-Exam Formalities Notice and Amendments, dated Jul. 8, 2015, 32 pages.
U.S. Appl. No. 14/641,735, Electronic Terminal Disclaimer, filed Aug. 27, 2015, 3 pages.
U.S. Appl. No. 14/641,735: Notice of Publication, dated Oct. 29, 2015, 1 page.
U.S. Appl. No. 14/641,735: Preliminary Amendment, dated Jan. 14, 2016, 8 pages.
U.S. Appl. No. 14/641,735: Non-Final Rejection, dated Jul. 14, 2017, 14 pages.
U.S. Appl. No. 14/641,735, Letter Restarting Period for Response, filed Aug. 24, 2017, 22 pages.
U.S. Appl. No. 14/641,735: Amendment/Req. Reconsideration—After Non-Final Reject, dated Nov. 24, 2017, 28 pages
U.S. Appl. No. 14/641,735: Final Rejection, dated Mar. 15, 2018, 25 pages.
U.S. Appl. No. 14/641,735: Response After Final Action, dated May 15, 2018, 28 pages.
U.S. Appl. No. 14/641,735: Advisory Action, dated Jun. 8, 2018, 4 pages.
U.S. Appl. No. 14/641,735: Internet Communications Authorized, dated Jun. 23, 2018, 2 pages.
U.S. Appl. No. 14/641,735: RCE and Amendments, dated Jul. 16, 2018, 34 pages.
U.S. Appl. No. 14/641,735: Preliminary Amendment, dated Oct. 26, 2018, 10 pages.
U.S. Appl. No. 14/641,735: Non-Final Rejection, dated Nov. 2, 2018, 28 pages.
U.S. Appl. No. 14/641,735: Amendment/Req. Reconsideration—After Non-Final Reject, dated Feb. 4, 2019, 27 pages.
U.S. Appl. No. 14/641,735: Notice of Allowance and Fees Due, dated Apr. 15, 2019, 47 pages.
U.S. Appl. No. 11/319,758, Application filed Dec. 27, 2005, 79 pages.
U.S. Appl. No. 11/319,758, Notice of Missing Parts filed Feb. 1, 2006, 2 pages.
U.S. Appl. No. 11/319,758: Response to Missing Parts filed Jul. 3, 2006, 15 pages.
U.S. Appl. No. 11/319,758: Non-final Office Action dated Nov. 12, 2008, 46 pages.
U.S. Appl. No. 11/319,758: Amendment dated May 12, 2009, 40 pages.
U.S. Appl. No. 11/319,758: Final Office Action dated Aug. 3, 2009, 39 pages.
U.S. Appl. No. 11/319,758: RCE filed Jan. 4, 2010, 45 pages.
U.S. Appl. No. 11/319,758: Non-Final Office Action dated Mar. 30, 2010, 39 pages.
U.S. Appl. No. 11/319,758: Office Action response dated Jul. 29, 2010, 30 pages.
U.S. Appl. No. 11/319,758: Final Office Action dated Oct. 28, 2010, 31 pages.
U.S. Appl. No. 11/319,758, Request for Continued Examination, filed Mar. 28, 2011, 32 pages.
U.S. Appl. No. 11/319,758: Non-Final office action dated Jun. 3, 2011, 31 pages.
U.S. Appl. No. 11/319,758: Non-Final Action Response dated Nov. 3, 2011, 29 pages.

(56) References Cited

OTHER PUBLICATIONS

U.S. Appl. No. 11/319,758: Final Office Action, dated Jan. 1, 2012, 22 pages
U.S. Appl. No. 11/319,758: Amendment after final, dated May 17, 2012, 34 pages.
U.S. Appl. No. 11/319,758: Advisory Action, dated Jun. 20, 2012, 3 pages.
U.S. Appl. No. 11/319,758: Amendment after final, dated Jun. 28, 2012, 29 pages.
U.S. Appl. No. 11/319,758: Notice of Allowance and examiner's interview summary, dated Jul. 17, 2012, 10 pages.
U.S. Appl. No. 11/319,758, Issue Fee payment, Rule 312 and Miscellaneous Communication, filed Oct. 12, 2012, 12 pages.
U.S. Appl. No. 11/319,758: Issue Notification, dated Oct. 31, 2012, 1 page.
U.S. Appl. No. 13/632,581, filed Oct. 1, 2012, 88 Pages.
U.S. Appl. No. 13/632,581, Notice to File Missing Parts and Filing Receipt, filed Oct. 22, 2012, 27 Pages.
U.S. Appl. No. 13/632,581, Filing Receipt, filed Mar. 5, 4, 3 Pages.
U.S. Appl. No. 13/632,581, Notice of Publication, filed Jun. 13, 2013, 1 Page.
U.S. Appl. No. 13/632,581: Non-final Office Action, dated Jul. 3, 2013, 22 Pages.
U.S. Appl. No. 13/632,581: Non-Final Office Action Response, dated Sep. 11, 2013, 23 Pages.
U.S. Appl. No. 13/632,581: Final Office Action, dated Dec. 18, 2013, 27 Pages.
U.S. Appl. No. 13/632,581: Response After Final Action, dated Mar. 18, 2014, 37 Pages.
U.S. Appl. No. 13/632,581: Advisory Action (PTOL-303), dated Apr. 3, 2014, 4 Pages.
U.S. Appl. No. 13/632,581: Notice of Appeal dated Jul. 17, 2014, 2 Pages.
U.S. Appl. No. 13/632,581: Request for Continued Examination, dated Jul. 16, 2014, 23 Pages.
U.S. Appl. No. 13/632,581: Notice Non-Compliant Amendment, dated Oct. 20, 2014, 5 pages.
U.S. Appl. No. 13/632,581: Amendment/Req Reconsideration after Non-Final Reject, dated Nov. 4, 2014, 16 pages.
U.S. Appl. No. 13/632,581: Non-Final Rejection, dated Jan. 27, 2015, 16 pages.
U.S. Appl. No. 13/632,581: Amendment/Req Reconsideration NonFinal Rejection and Amendments, dated Apr. 20, 2015, 24 pages.
U.S. Appl. No. 13/632,581: Final Rejection, dated Jul. 20, 2015, 21 pages.
U.S. Appl. No. 13/632,581, After Final Consideration Request and Response, filed Sep. 21, 2015, 28 pages.
U.S. Appl. No. 13/632,581: Advisory Action and After Final Decision, dated Oct. 2, 2015, 18 pages.
U.S. Appl. No. 13/632,581 RCE and Amendments, dated Nov. 30, 2015, 55 pages.
U.S. Appl. No. 13/632,581: Notice of Allowance and Fees, dated Dec. 17, 2015, 5 pages.
U.S. Appl. No. 13/632,581, Filing Receipt, filed Jan. 22, 2016, 4 pages.
U.S. Appl. No. 13/632,581, Electronic Terminal Disclaimer, filed Mar. 7, 2016, 3 pages.
U.S. Appl. No. 13/632,581, Issue Fee Payment, filed Mar. 16, 2016, 1 page.
U.S. Appl. No. 13/632,581, Amendment after Notice of Allowance, filed Mar. 16, 2016 19 pages.
U.S. Appl. No. 13/632,581: Response to Amendment under Rule 312, dated Mar. 22, 2016, 2 pages.
U.S. Appl. No. 13/632,581, Issue Notification, dated Apr. 13, 2016, 1 page.
U.S. Appl. No. 15/081,612, filed Mar. 25, 2016, 87 Pages.
U.S. Appl. No. 15/081,612, Notice to File Missing Parts and Filing Receipt, filed Apr. 11, 2016, 4 Pages.
U.S. Appl. No. 15/081,612: Filing Receipt, dated Apr. 11, 2016, 3 Pages.
U.S. Appl. No. 15/081,612: Applicant Response to Pre-Exam Formalities Notice and Preliminary Amendments, dated Jun. 13, 2016, 34 pages.
U.S. Appl. No. 15/081,612: Preliminary Amendment, dated Jun. 14, 2016, 4 pages.
U.S. Appl. No. 15/081,612: Filing Receipt, dated Jun. 21, 2016, 3 pages.
U.S. Appl. No. 15/081,612: Non-Final Rejection, dated Jul. 27, 2016, 9 pages.
U.S. Appl. No. 15/081,612, Electronic Terminal Disclaimer, filed Sep. 23, 2016, 3 pages.
U.S. Appl. No. 15/081,612: Notice of Publication, dated Sep. 29, 2016, 1 page.
U.S. Appl. No. 15/081,612, Amendment/Req. Reconsideration—After Non-Final Reject, filed Oct. 17, 2016, 10 pages.
U.S. Appl. No. 15/081,612: Notice of Allowance and Fees, dated Oct. 27, 2016, 5 pages.
U.S. Appl. No. 15/081,612, RCE, filed Jan. 30, 2017, 2 pages.
U.S. Appl. No. 15/081,612, Issue Fee Payment, filed Jan. 30, 2017, 1 page.
U.S. Appl. No. 15/081,612: Notice of Allowance and Fees Due, dated Jan. 30, 2017, 2 pages.
U.S. Appl. No. 15/081,612: Notice of Allowance and Fees Due, dated Feb. 13, 2017, 7 pages.
U.S. Appl. No. 15/081,612: Amendment After Notice of Allowance, dated Mar. 20, 2017, 4 pages.
U.S. Appl. No. 15/081,612, Issue Fee Payment, filed Mar. 20, 2017, 1 page.
U.S. Appl. No. 15/081,612, Issue Notification, filed Apr. 20, 2017, 1 page.
U.S. Appl. No. 15/464,205, filed Mar. 20, 2017, 84 pages.
U.S. Appl. No. 15/464,205, Notice to File Missing Parts, filed Mar. 28, 2017, 5 pages.
U.S. Appl. No. 15/464,205, Applicant Response to Pre-Exam Formalities Notice, filed May 31, 2017, 86 pages.
U.S. Appl. No. 15/464,205, Filing Receipt, filed Mar. 28, 2017, 4 pages.
U.S. Appl. No. 15/464,205: Preliminary Amendment, dated May 31, 2017, 8 pages.
U.S. Appl. No. 15/464,205, Filing Receipt, filed Jun. 2, 2017, 4 pages.
U.S. Appl. No. 15/464,205: Preliminary Amendment, dated Feb. 22, 2019, 11 pages.
U.S. Appl. No. 11/006,842, filed Dec. 7, 2004, 58 pages.
U.S. Appl. No. 11/006,842, Notice to file missing parts filed Jan. 10, 2005, 2 pages.
U.S. Appl. No. 11/006,842, Response to Notice to file missing parts filed Apr. 1, 2005, 7 pages.
U.S. Appl. No. 11/006,842: Preliminary Amendment dated May 2, 2005, 93 pages.
U.S. Appl. No. 11/006,842: Restriction Requirement dated Jan. 23, 2008, 5 pages.
U.S. Appl. No. 11/006,842, Response to Restriction Requirement dated Feb. 25, 2008, 25 pages.
U.S. Appl. No. 11/006,842: Restriction Requirement dated May 13, 2008, 5 pages.
U.S. Appl. No. 11/006,842: Response to Restriction Requirement dated Aug. 13, 2008, 24 pages.
U.S. Appl. No. 11/006,842: Non-Final Office Action dated Nov. 3, 2008.
U.S. Appl. No. 11/006,842: Response to Non-Final Office Action dated May 4, 2009, 35 pages.
U.S. Appl. No. 11/006,842: Supplemental Response dated Jul. 17, 2009, 23 pages.
U.S. Appl. No. 11/006,842: Notice of Allowance dated Jul. 27, 2009, 13 pages.
U.S. Appl. No. 11/006,842, Issue Fee filed Oct. 27, 2009, 1 page.
U.S. Appl. No. 11/006,842: Issue notification dated Nov. 18, 2009, 1 page.
U.S. Appl. No. 12/613,450, Continuation application filed Nov. 5, 2009, 63 pages.
U.S. Appl. No. 12/613,450, Notice of Missing Parts filed Nov. 18, 2009, 2 pages.

(56) References Cited

OTHER PUBLICATIONS

U.S. Appl. No. 12/613,450, Preliminary Amendment and Response to Missing Parts filed Jan. 19, 2010, 16 pages.
U.S. Appl. No. 12/613,450, Filing receipt filed Jan. 27, 2010, 3 pages.
U.S. Appl. No. 12/613,450, Notice of Publication filed May 6, 2010, 1 page.
U.S. Appl. No. 12/613,450: Restriction requirement dated Jun. 10, 2011,5 pages.
U.S. Appl. No. 12/613,450: Response to restriction requirement dated Jul. 6, 2011, 17 pages.
U.S. Appl. No. 12/613,450: Non-Final Office Action, dated Aug. 25, 2011, 15 pages.
U.S. Appl. No. 12/613,450: Non-Final OA response dated Dec. 27, 2011, 28 pages.
U.S. Appl. No. 12/613,450: Final rejection, dated Feb. 14, 2012, 14 pages.
U.S. Appl. No. 12/613,450: Amendment after final, dated Jun. 8, 2012, 23 pages.
U.S. Appl. No. 12/613,450: Advisory Action, dated Jun. 20, 2012, 4 pages.
U.S. Appl. No. 12/613,450, RCE, filed Jul. 12, 2012, 25 pages.
U.S. Appl. No. 12/613,450: Notice of Allowance, dated Oct. 7, 2013, 20 pages.
U.S. Appl. No. 12/613,450, Electronic Terminal Disclaimer filed and approved, filed Jan. 2, 2014, 2 pages.
U.S. Appl. No. 12/613,450: Amendment After Final or Under 37CFR 1.312, initialed by the Examiner, dated Jan. 14, 2014, 2 Pages.
U.S. Appl. No. 12/613,450, Issue Notification, filed Jan. 22, 2014, 1 Page.
U.S. Appl. No. 14/149,749, filed Jan. 7, 2014, 59 Pages.
U.S. Appl. No. 14/149,749, Notice to File Missing Parts and Filing Receipt, filed Jan. 23, 2014, 6 Pages.
U.S. Appl. No. 14/149,749, Applicant Response to Pre-exam Formalities Notice, filed May 23, 2014 12 Pages.
U.S. Appl. No. 14/149,749, Applicant Response to Pre-Exam Formalities Notice, filed Aug. 25, 2014, 103 Pages.
U.S. Appl. No. 14/149,749, Filing Receipt, filed Sep. 4, 2014, 3 Pages.
U.S. Appl. No. 14/149,749, Notice of Publication, filed Dec. 11, 2014, 1 page.
U.S. Appl. No. 14/149,749, Electronic Terminal Disclaimer Filed and Approved filed Feb. 23, 2015.
U.S. Appl. No. 14/149,749: Examiner Initiated Interview Summary, dated Feb. 24, 2015, 2 pages.
U.S. Appl. No. 14/149,749: Notice of Allowance and Fees and Examiner Search, dated Apr. 17, 2015, 30 pages.
U.S. Appl. No. 14/149,749: Amendment after Notice of Allowance, dated May 27, 2015, 10 pages.
U.S. Appl. No. 14/149,749, Issue Fee Payment, filed May 27, 2015, 1 page.
U.S. Appl. No. 14/149,749, Electronic Terminal Disclaimer Filed and Approved, filed May 27, 2015, 3 pages.
U.S. Appl. No. 14/149,749: Response to Amendment under Rule 312, dated May 29, 2015, 1 page.
U.S. Appl. No. 14/149,749: Response to Amendment under Rule 312, dated Jun. 1, 2015, 3 pages.
U.S. Appl. No. 14/149,749, Issue Notification, filed Jun. 17, 2015, 1 page.
U.S. Appl. No. 14/726,192, filed May 29, 2015, 39 pages.
U.S. Appl. No. 14/726,192, Filing Receipt, filed Jun. 9, 2015, 3 pages.
U.S. Appl. No. 14/726,192, Notice to File Missing Parts, filed Jun. 9, 2015, 2 pages.
U.S. Appl. No. 14/726,192, Applicant Response to Pre-Exam Formalities Notice and Amendments, filed Aug. 12, 2015, 114 pages.
U.S. Appl. No. 14/726,192, Filing Receipt, filed Aug. 20, 2015, 3 pages.
U.S. Appl. No. 14/726,192, Electronic Terminal Disclaimer Filed and Approved, filed Nov. 20, 2015, 3 pages.
U.S. Appl. No. 14/726,192: Notice of Publication, dated Nov. 27, 2015, 1 page.
U.S. Appl. No. 14/726,192: Issue Fee Payment and Amendment after Notice of Allowance, dated Jul. 18, 2016, 13 pages.
U.S. Appl. No. 14/726,192: Response to Amendment under Rule 312, dated Jul. 21, 2016, 1 page.
U.S. Appl. No. 14/726,192: Response to Amendment under Rule 312, dated Jul. 22, 2016, 2 pages.
U.S. Appl. No. 14/726,192: Issue Notification, dated Aug. 3, 2016, 1 page.
U.S. Appl. No. 15/240,964: Application and Preliminary Amendments as filed dated Aug. 18, 2016, 70 pages.
U.S. Appl. No. 15/240,964, Filing Receipt, filed Aug. 31, 2016, 3 pages.
U.S. Appl. No. 15/240,964: Notice of Publication, dated Dec. 8, 2016.
U.S. Appl. No. 15/240,964: Non-Final Rejection, dated Mar. 14, 2017, 23 pages.
U.S. Appl. No. 15/240,964: Amendment/Req. Reconsideration⇒After Non-Final Reject, dated Jun. 14, 2017, 27 pages.
U.S. Appl. No. 15/240,964: Final Rejection, dated Aug. 9, 2017, 25 pages.
U.S. 15/240,964, After Final Consideration Program Request, filed Oct. 10, 2017, 30 pages
U.S. Appl. No. 15/240,964: Advisory Action, dated Oct. 30, 2017, 3 pages.
U.S. Appl. No. 15/240,964: RCE and Amendments, dated Nov. 9, 2017, 31 pages.
U.S. Appl. No. 15/240,964: Non-Final Rejection, dated Jul. 30, 2018, 32 pages.
U.S. Appl. No. 15/240,964: Amendment/Req. Reconsideration-After Non-Final Reject, dated Oct. 30, 2018, 43 pages.
U.S. Appl. No. 15/240,964: Notice of Allowance and Fees Due, dated Feb. 21, 2019, 26 pages.
U.S. Appl. No. 11/320,538, filed Dec. 27, 2005, 76 pages.
U.S. Appl. No. 11/320,538, Notice of Missing Parts filed Feb. 2, 2006, 2 pages.
U.S. Appl. No. 11/320,538: Response to Missing Parts filed Aug. 2, 2006, 36 pages.
U.S. Appl. No. 11/320,538: Non-final Office Action dated Apr. 1, 2009, 27 pages.
U.S. Appl. No. 11/320,538: Amendment dated Jul. 1, 2009, 54 pages.
U.S. Appl. No. 11/320,538: Final Office Action dated Nov. 2, 2009, 29 pages.
U.S. Appl. No. 11/320,538: Response to Final Office Action dated Jan. 4, 2010, 23 pages.
U.S. Appl. No. 11/320,538: Advisory Action dated Jan. 19, 2010, 3 pages.
U.S. Appl. No. 11/320,538: RCE and Amendment dated Apr. 2, 2010, 26 pages.
U.S. Appl. No. 11/320,538: Non-Final Office Action dated Jun. 9, 2010, 24 pages.
U.S. Appl. No. 11/320,538: Office action dated Dec. 22, 2010, 10 pages.
U.S. Appl. No. 11/320,538: Notice of Appeal, dated May 23, 2011, 6 pages.
U.S. Appl. No. 11/320,538, Pre-brief appeal conference decision filed Jun. 30, 2011, 2 pages.
U.S. Appl. No. 11/320,538: Request for Continued Examination dated Dec. 23, 2011, 21 pages.
U.S. Appl. No. 11/320,538: Non-Final Office Action, dated Dec. 19, 2012, 12 pages.
U.S. Appl. No. 11/320,538: Response to Non-final office action, dated Apr. 17, 2013, 20 pages.
U.S. Appl. No. 11/320,38: Notice of allowance, dated Aug. 1, 2013, 25 pages.
U.S. Appl. No. 11/320,538, Issue fee payment, filed Nov. 1, 2013, 7 pages.
U.S. Appl. No. 11/320,538: Rule 312 amendment, dated Nov. 19, 2013, 20 pages.

(56) References Cited

OTHER PUBLICATIONS

U.S. Appl. No. 11/320,538: Issue Notification, dated Dec. 4, 2013, 1 page.
U.S. Appl. No. 14/086,741, filed Dec. 12, 2013, 77 Pages.
U.S. Appl. No. 14/086,741, Filing Receipt and Notice to File Missing Parts, filed Dec. 12, 2013, 6 Pages.
U.S. Appl. No. 14/086,741, filed Applicant Response to Pre-Exam Formalities Notice, dated Jun. 12, 2014, 60 Pages.
U.S. Appl. No. 14/086,741, Filing Receipt, dated Jun. 17, 2014, 3 Pages.
U.S. Appl. No. 14/086,741, Notice of Publication, dated Sep. 25, 2014, 1 Page.
U.S. Appl. No. 14/086,741, Terminal Disclaimer as Filed on Sep. 29, 2014, 1 Page.
U.S. Appl. No. 14/086,741, Terminal Disclaimer Review Decision, dated Sep. 30, 2014, 1 Page.
U.S. Appl. No. 14/086,741: Notice of Allowance and Fees and Examiner Summary, dated Oct. 3, 2014, 21 pages.
U.S. Appl. No. 14/086,741: Notice of Allowance and Fees Due, dated Oct. 3, 2014, 22 pages.
U.S. Appl. No. 14/086,741: Amendment after Notice of Allowance, filed Jan. 5, 2015, 14 pages.
U.S. Appl. No. 14/086,741, Issue Fee Payment, filed Jan. 5, 2015, 1 page.
U.S. Appl. No. 14/086,741: Response to Amendment under Rule 312, dated Jan. 22, 2015, 2 pages.
U.S. Appl. No. 14/086,741: Notice of Allowance and Fees and Examiner Search strategy, dated Mar. 16, 2015, 40 pages.
U.S. Appl. No. 14/086,741, Issue Notification, filed Apr. 1, 2015, 1 page.
U.S. Appl. No. 14/596,154, filed Jan. 13, 2015, 60 pages.
U.S. Appl. No. 14/596,154, Filing Receipt, filed Jan. 27, 2015, 3 pages.
U.S. Appl. No. 14/596,154, Notice to File Missing Parts, filed Jan. 27, 2015, 3 pages.
U.S. Appl. No. 14/596,154, Applicant Response to Pre Exam Formalities Notice with Preliminary Amendments, filed Mar. 27, 2015, 85 pages.
U.S. Appl. No. 14/596,154, Filing Receipt, filed Apr. 2, 2015, 3 pages.
U.S. Appl. No. 14/596,154: Notice of Publication, dated Jul. 9, 2015, 1 page.
U.S. Appl. No. 14/596,154, Electronic Terminal Disclaimer Filed and Approved, filed Nov. 20, 2015, 3 pages.
U.S. Appl. No. 14/596,154: Non-Final Rejection, dated Sep. 21/2017, 19 pages
U.S. Appl. No. 14/596,154, Amendment/Req. Reconsideration—After Non-Final Reject, filed Dec. 21, 2017, 37 pages.
U.S. Appl. No. 14/596,154: Notice of Allowance and Fees Due, dated May 2, 2018, 8 pages.
U.S. Appl. No. 14/596,154: Issue Notification, dated Aug. 21, 2018, 1 page.
U.S. Appl. No. 16/048,113, filed Jul. 27, 2018, 81 pages.
U.S. Appl. No. 16/048,113, Filing Receipt, filed Aug. 24, 2018, 3 pages.
U.S. Appl. No. 16/048,113, Notice to File Missing Parts, filed Aug. 24, 2018, 2 pages.
U.S. Appl. No. 16/048,113: Applicant Response to Pre-Exam Formalities Notice and Amendment, dated Oct. 22, 2018, 38 pages.
U.S. Appl. No. 16/048,113, Filing Receipt, filed Oct. 24, 2018, 3 pages.
U.S. Appl. No. 16/048,113: Notice of Publication dated Jan. 31, 2019, 1 page.
U.S. Appl. No. 11/361,500, filed Feb. 23, 2006, 72 pages.
U.S. Appl. No. 11/361,500, Notice to file missing parts filed Mar. 23, 2006, 2 pages.
U.S. Appl. No. 11/361,500, Response to Notice to File Missing Parts filed Jul. 19, 2006, 27 pages.
U.S. Appl. No. 11/361,500: Notice of Publication dated Nov. 16, 2006, 1 page.
U.S. Appl. No. 11/361,500: Office Action dated May 27, 2009, 18 pages.
U.S. Appl. No. 11/361,500: Response to Office Action dated Aug. 27, 2009, 34 pages.
U.S. Appl. No. 11/361,500: Notice of Allowance dated Dec. 11, 2009, 8 pages.
U.S. Appl. No. 11/361,500: Issue Fee Payment and Rule 312 Amendment dated Jan. 6, 2010, 28 pages.
U.S. Appl. No. 11/361,500: Response to Rule 312 Amendment dated Jan. 25, 2010, 4 pages.
U.S. Appl. No. 11/361,500: Issue Notification dated Feb. 24, 2010, 1 page.
U.S. Appl. No. 12/702,243: Continuation Application with Preliminary Amendment dated Feb. 8, 2010, 83 pages.
U.S. Appl. No. 12/702,243, Notice of Missing Parts filed Feb. 25, 2010, 2 pages.
U.S. Appl. No. 12/702,243, Response to Missing Parts dated Apr. 26, 2010, 8 pages.
U.S. Appl. No. 12/702,243, Filing receipt filed May 4, 2010, 3 pages.
U.S. Appl. No. 12/702,243: Notice of Publication dated Aug. 12, 2010, 1 page.
U.S. Appl. No. 12/702,243: Non-Final rejection, dated Aug. 30, 2012, 8 pages.
U.S. Appl. No. 12/702,243: Amendment, dated Nov. 20, 2012, 14 pages.
U.S. Appl. No. 12/702,243, Terminal Disclaimer, filed Jan. 2, 2013, 5 pages.
U.S. Appl. No. 12/702,243, Terminal Disclaimer decision, filed Jan. 4, 2013, 1 page1.
U.S. Appl. No. 12/702,243: Notice of allowance and fees due and examiner interview summary, dated Jan. 10, 2013, pages.
U.S. Appl. No. 12/702,243: Issue notification, dated Apr. 24, 2013, 1 page.
U.S. Appl. No. 13/860,482, filed Apr. 10, 2013, 98 Pages.
U.S. Appl. No. 13/860,482, Notice to File Missing Parts and Filing Receipt, filed May 21, 2013, 5 Pages.
U.S. Appl. No. 13/860,482, Applicant Response to Pre-Exam Formalities Notice, filed Oct. 22, 2013, 3 Pages.
U.S. Appl. No. 13/860,482: Notice of Publication, dated Feb. 6, 2014, 1 Page.
U.S. Appl. No. 13/860,482: Non-Final Office Action, dated Jun. 9, 2014, 11 Pages.
U.S. Appl. No. 13/860,482: Non-Final Office Action Response, dated Sep. 8, 2014, 19 Pages.
U.S. Appl. No. 13/860,482, Terminal Disclaimer Review Decision, filed Sep. 9, 2014, 1 page.
U.S. Appl. No. 13/860,482, Terminal Disclaimer Filed Oct. 8, 2014, 1 page.
U.S. Appl. No. 13/860,482, Terminal Disclaimer Review Decision, filed Oct. 9, 2014, 1 page.
U.S. Appl. No. 13/860,482: Notice of Allowance and Fees Due, dated Nov. 5, 2014, 8 Pages.
U.S. Appl. No. 13/860,482, Issue Fee Payment and Rule 312 Amendments, filed Feb. 4, 2015, 4 pages.
U.S. Appl. No. 13/860,482: Issue Notification, filed Mar. 4, 2015, 1 page.
U.S. Appl. No. 14/614,292, filed Feb. 4, 2015, 76 pages.
U.S. Appl. No. 14/614,292, Notice to File Missing Parts and Filing Receipt, filed Feb. 20, 2015, 5 pages.
U.S. Appl. No. 14/614,292, Applicant Response to Pre-Exam Formalities Notice and Amendments, filed Apr. 17, 2015, 30 pages.
U.S. Appl. No. 14/614,292, Filing Receipt, filed Apr. 24, 2015, 3 pages.
U.S. Appl. No. 14/614,292: Notice of Pulication, dated Aug. 6, 2015, 1 page.
U.S. Appl. No. 14/614,292, Electronic Terminal Disclaimer Filed and Approved, filed Nov. 20, 2015, 3 pages.
U.S. Appl. No. 14/614,292: Non-Final Rejection, dated May 19, 2016, 10 pages.
U.S. Appl. No. 14/614,292: Amendment/Req. Reconsideration—After Non-Final Rejection, dated Aug. 18, 2016, 20 pages.

(56) References Cited

OTHER PUBLICATIONS

U.S. Appl. No. 14/614,292: Notice of Allowance and Fees, dated Sep. 21, 2016, 8 pages.
U.S. Appl. No. 14/614,292: Issue Fee Payment and Amendment after Notice of Allowance, dated Dec. 21, 2016, 4 pages.
U.S. Appl. No. 14/614,292: Issue Notification, dated Jan. 18, 2017, 1 page.
U.S. Appl. No. 15/411,823, filed Jan. 20, 2017, 77 pages.
U.S. Appl. No. 15/411,823: Preliminary Amendment, dated Jan. 20, 2017, 25 pages.
U.S. Appl. No. 15/411,823, Filing Receipt, filed Jan. 31, 2017, 3 pages.
U.S. Appl. No. 15/411,823: Notice of Publication, dated May 11, 2017, 1 page.
U.S. Appl. No. 15/411,823: Non-Final Rejection, dated Jan. 25, 2018, 10 pages.
U.S. Appl. No. 15/411,823: Amendment/Req. Reconsideration—After Non-Final Rejection, dated Apr. 24, 2018, 18 pages.
U.S. Appl. No. 15/411,823, Terminal Disclaimer—Filed and Approved, filed Apr. 24, 2018, 3 pages.
U.S. Appl. No. 15/411,823: Notice of Allowance and Fees Due, dated Jul. 13, 2018, 8 pages.
U.S. Appl. No. 15/411,823: Issue Notification, dated Nov. 7, 2018, 1 page.
U.S. Appl. No. 16/164,430, filed Oct. 18, 2018, 79 pages.
U.S. Appl. No. 16/164,430, Notice to File Missing Parts, filed Nov. 6, 2018, 2 pages.
U.S. Appl. No. 16/164,430, Filing Receipt, filed Nov. 6, 2018, 4 pages.
U.S. Appl. No. 16/164,430, Applicant Response to Pre-Exam Formalities Notice, filed Jan. 18, 2019, 29 pages.
U.S. Appl. No. 16/164,430, Filing Receipt, filed Jan. 23, 2019, 4 pages.
U.S. Appl. No. 16/164,430: Notice of Publication, dated May 2, 2019, 1 page.
U.S. Appl. No 11/412,417, filed Apr. 26, 2006, 96 pages.
U.S. Appl. No. 11/412,417, Notice of Missing Parts filed May 19, 2006, 2 pages
U.S. Appl. No. 11/412,417, Response to Notice of Missing Parts filed Jul. 19, 2006, 14 pages.
U.S. Appl. No. 11/412,417: Non-final Office Action dated Apr. 1, 2008, 53 pages.
U.S. Appl. No. 11/412,417: Amendment filed Aug. 1, 2008, 34 pages.
U.S. Appl. No. 11/412,417: Final Office Action dated Nov. 13, 2008, 40 pages.
U.S. Appl. No. 11/412,417: RCE and Amendment dated May 12, 2009, 36 pages.
U.S. Appl. No. 11/412,417: Non-final Office Action dated Jun. 30, 2009, 141 pages.
U.S. Appl. No. 11/412,417: Examiner Interview Summary dated Oct. 30, 2009, 3 pages.
U.S. Appl. No. 11/412,417: Amendment dated Oct. 30, 2009, 33 pages.
U.S. Appl. No. 11/412,417: Final Office Action dated Jan. 4, 2010, 37 pages.
U.S. Appl. No. 11/412,417: RCE with Amendment dated May 4, 2010, 27 pages.
U.S. Appl. No. 11/412,417: Supplemental Office Action Response dated Jun. 22, 2010, 22 pages.
U.S. Appl. No. 11/412,417: Notice of Allowance and bibliographic data sheet dated Jul. 6,2010, 9 pages.
U.S. Appl. No. 11/412,417: RCE dated Oct. 5, 2010, 4 pages.
U.S. Appl. No. 11/412,417: Notice of Allowance and bibliographic data sheet dated Oct. 26, 2010, 4 pages.
U.S. Appl. No. 11/412,417, Issue Fee Payment and Comments on Reasons for Allowance filed Jan. 26, 2011, 6 pages.
U.S. Appl. No. 11/412,417: Issue Notification dated Feb. 9, 2011, 1 page.
U.S. Appl. No. 13/030,084, filed Feb. 17, 2011, 103 pages.

U.S. Appl. No. 13/030,084: Filing receipt and Notice to File Missing parts filed Mar. 3, 2011, 6 pages.
U.S. Appl. No. 13/030,084, Response to Notice to File Missing Parts, mailed Aug. 3, 2011, 23 pages.
U.S. Appl. No. 13/030,084: Updated filing receipt, filed Aug. 11, 2011, 3 pages
U.S. Appl. No. 13/030,084: Non-Final Rejection dated Oct. 26, 2011, 34 pages.
U.S. Appl. No. 13/030,084: Notice of Publication dated Nov. 17, 2011, 1 page.
U.S. Appl. No. 13/030,084: Amendment, dated Jan. 26, 2012, 35 pages.
U.S. Appl. No. 13/030,084: Notice regarding non-compliant amendment, dated Jan. 31, 2012, 4 pages.
U.S. Appl. No. 13/030,084: Amendment, dated Feb. 9, 2012, 35 pages.
U.S. Appl. No. 13/030,084: Final Rejection, dated Mar. 28, 2012, 62 pages.
U.S. Appl. No. 13/030,084: Amendment after final, dated Jun. 14, 2012, 88 pages.
U.S. Appl. No. 13/030,084: Advisory Action, dated Jun. 26, 2012, 4 pages.
U.S. Appl. No. 13/030,084, RCE, filed Jul. 23, 2012, 89 pages.
U.S. Appl. No. 13/030,084: Notice regarding non-compliant amendment, dated Jul. 25, 2012, 2 pages.
U.S. Appl. No. 13/030,084: Amendment, dated Jan. 2, 2013, 40 pages.
U.S. Appl. No. 13/030,084, Refund request, filed Jan. 23, 2013 17 pages.
U.S. Appl. No. 13/030,084: Non-Final office action, dated Apr. 30, 2013, 39 pages.
U.S. Appl. No. 13/030,084: Response to non-final office action, dated Jul. 30, 2013, 28 pages.
U.S. Appl. No. 13/030,084: Non-final office action, dated Oct. 10, 2013, 44 pages.
U.S. Appl. No. 13/030,084: Response after Non-Final Reject, dated Jan. 2, 2014, 1 Page.
U.S. Appl. No. 13/030,084: Final Rejection, dated Mar. 19, 2014, 41 Pages.
U.S. Appl. No. 13/030,08, Amendment Submitted/Entered with Filing of CPA/RCE, filed May 19, 2014, 38 Pages.
U.S. Appl. No. 13/030,084: Advisory Action (PTOL-303), dated Jun. 6, 2014, 4 Pages.
U.S. Appl. No. 13/030,084: Applicant Initiated Interview Summary KPTOL-413), dated Jul. 1, 2014, 3 Pages.
U.S. Appl. No. 13/030,084: Request for Continued Examination, dated Aug. 15, 2014, 26 Pages.
U.S. Appl. No. 13/030,084: Non-Final Rejection and Examiner's Search, dated Mar. 24, 2015, 24 pages.
U.S. Appl. No. 13/030,084: Amendment/Req. Reconsideration After Non-Final Rejection, dated Jun. 24, 2015, 28 pages.
U.S. Appl. No. 13/030,084, Terminal Disclaimer filed and Approved, filed Sep. 10, 2015, 3 pages.
U.S. Appl. No. 13/030,084: Notice of Allowance and Fees, dated Sep. 17, 2015, 24 pages.
U.S. Appl. No. 13/030,084: Issue Fee Payment and Amendment, dated Dec. 10, 2015, 4 pages.
U.S. Appl. No. 14/968,429, filed Dec. 14, 2015.
U.S. Appl. No. 14/968,429, Filing Receipt, filed Jan. 4, 2016, 3 pages.
U.S. Appl. No. 14/968,429, Applicant Response to Pre-Exam Formalities Notice, filed Jan. 14, 2016, 35 pages.
U.S. Appl. No. 14/968,429, Filing Receipt, filed Jan. 21, 2016, 3 pages.
U.S. Appl. No. 14/968,429: Notice of Publication, dated Apr. 28, 2016, 1 page.
U.S. Appl. No. 14/968,429: Non-Final Rejection, dated May 15, 2017, 8 pages.
U.S. Appl. No. 14/968,429: Amendment/Req. Reconsideration—After Non-Final Reject, dated Aug. 9, 2017, 19 pages.
U.S. Appl. No. 14/968,429: Final Rejection, dated Oct. 24, 2017, 10 pages.

(56) References Cited

OTHER PUBLICATIONS

U.S. Appl. No. 14/968,429: Response After Final Action, dated Dec. 26, 2017, 28 pages.
U.S. Appl. No. 14/968,429: Advisory Action, dated Jan. 11, 2018, 5 pages.
U.S. Appl. No. 14/968,429, Terminal Disclaimer—Filed and Approved, filed Feb. 7, 2018, 3 pages.
U.S. Appl. No. 14/968,429: Response After Final Action, dated Feb. 7, 2018, 13 pages.
U.S. Appl. No. 14/968,429: Notice of Allowance and Fees Due, dated Feb. 26, 2018, 8 pages.
U.S. Appl. No. 14/968,429: Notice of Allowance and Fees Due, dated Mar. 19, 2018, 6 pages.
U.S. Appl. No. 14/968,429: Amendment after Notice of Allowance, dated May 31, 2018, 12 pages.
U.S. Appl. No. 14/968,429: Amendment after Notice of Allowance, dated Jun. 13, 2018, 12 pages.
U.S. Appl. No. 14/968,429: Response to Amendment under Rule 312, dated Jul. 10, 2018, 2 pages.
U.S. Appl. No. 14/968,429: Response to Amendment under Rule 312, dated Jul. 23, 2018, 2 pages.
U.S. Appl. No. 14/968,429: Issue Notification, dated Aug. 1, 2018, 1 page.
U.S. Appl. No. 16/048,061, filed Jul. 27, 2018, 101 pages.
U.S. Appl. No. 16/048,061, Notice to File Missing Parts, filed Aug. 13, 2018, 2 pages.
U.S. Appl. No. 16/048,061, Filing Receipt, filed Aug. 13, 2018, 4 pages.
U.S. Appl. No. 16/048,061, Applicant Response to Pre-Exam Formalities Notice, filed Oct. 12, 2018, 13 pages
U.S. Appl. No. 16/048,061, Filing Receipt, filed Oct. 16, 2018, 4 pages.
U.S. Appl. No. 16/048,061, Request for Corrected Filing Receipt, filed Oct. 31, 2018, 6 pages.
U.S. Appl. No. 16/048,061, Filing Receipt, filed Nov. 5, 2018, 4 pages.
U.S. Appl. No. 16/048,061: Notice of Publication, dated Jan. 24, 2019, 1 page.
U.S. Appl. No. 16/164,535, filed Oct. 18, 2018, 115 pages.
U.S. Appl. No. 16/164,535, Filing Receipt, filed Nov. 7, 2018, 4 pages.
U.S. Appl. No. 16/164,535, Notice to File Corrected Application Papers, filed Nov. 7, 2018, 2 pages.
U.S. Appl. No. 16/164,535, Applicant Response to Pre-Exam Formalities Notice, filed Jan. 7, 2019, 23 pages.
U.S. Appl. No. 16/164,535, Filing Receipt, filed Jan. 11, 2019, 4 pages.
U.S. Appl. No. 11/480,094, filed Jun. 29, 2006, 125 pages.
U.S. Appl. No. 11/480,094, Notice to File Corrected Application Papers filed Aug. 2, 2006, 2 pages.
U.S. Appl. No. 11/480,094, Response to Notice to File Corrected Application Papers filed Nov. 2, 2006, 32 pages.
U.S. Appl. No. 11/480,094, Filing Receipt filed Dec. 7, 2006, 3 pages.
U.S. Appl. No. 11/480,094: Non-final Office Action dated Nov. 7, 2008, 28 pages.
U.S. Appl. No. 11/480,094: Amendment dated May 7, 2009, 37 pages.
U.S. Appl. No. 11/480,094: Final Office Action filed Jul. 28, 2009, 16 pages.
U.S. Appl. No. 11/480,094, RCE with Amendment filed Dec. 28, 2009, 39 pages.
U.S. Appl. No. 11/480,094: Office Action dated Dec. 15, 2010, 15 pages.
U.S. Appl. No. 11/480,094: Office Action response, dated May 16, 11, 29 pages.
U.S. Appl. No. 11/480,094: Final Office Action, dated Aug. 1, 2011, 13 pages.
U.S. Appl. No. 11/480,094: Amendment after final dated Nov. 1, 2011, 32 pages.
U.S. Appl. No. 11/480,094: Advisory Action dated Nov. 14, 2011, 3 pages.
U.S. Appl. No. 11/480,094: Notice of Appeal dated Nov. 28, 2011, 1 page.
U.S. Appl. No. 11/480,094, Abandonment, filed Jul. 31, 2012, 2 pages.
Fluri, "Change Distilling: Tree Differencing for Fine-Grained Source Code Change Extraction", IEEE pp. 725-743 (2007), Doc 2354.
Sahinalp, "Distance Based Indexing for String Proximity Search", IEEE, pp. 125-136 (2003), Doc 2355.
Vion-Dury, "Experimenting with the Circus Language for XML Modeling and Transformation", ACM pp. 82-87 (2002), Doc 2352.
Zanibbi, "Recognizing Mathematical Expressions Using Tree Transformation," IEEE, pp. 1455-1467 (2002), Doc 2353.
Zhang, "B ed-Tree: An All-Purpose Index Structure for String Similarity Search Based on Edit Distance", ACM, pp. 915-926 (2010), Doc 2351.
U.S. Appl. No. 16/209,872: Notice of Allowance/Allowability dated Jul. 13, 2021, 12 pages, Doc 2314.
U.S. Appl. No. 16/209,872, Issue Fee Payment and 312 Response filed Oct. 11, 2021, 14 pages, Doc 2357.
U.S. Appl. No. 16/820,457, Supplemental Preliminary Amendment filed Jul. 30, 2021, 17 pages, Doc 2315.
U.S. Appl. No. 17/158,804: Supplemental Preliminary Amendment filed Jul. 30, 2021, 14 pages, Doc 2316.
U.S. Appl. No. 17/381,142: Patent Application and Preliminary Amendment filed Jul. 20, 2021, 146 pages, Doc 2317.
U.S. Appl. No. 17/381,142: Filing Receipt dated Aug. 3, 2021, 4 pages, Doc 2318.
U.S. Appl. No. 16/909,899: Non-final Office Action dated Aug. 11, 2021, pages, Doc 2336.
U.S. Appl. No. 16/459,930: Response to Non-final Office Action filed Oct. 12, 2021, 18 pages, Doc 2358.
U.S. Appl. No. 16/513,021: Response to Non-final Office Action filed Sep. 28, 2021, 36 pages, Doc 2346.
U.S. Appl. No. 16/513,021: Final Office Action dated Nov. 2, 2021, 37 pages, Doc 2359.
U.S. Appl. No. 15/464,205, Request for Continued Examination and 312 Response filed Aug. 26, 2021, 13 pages, Doc 2337.
U.S. Appl. No. 15/464,205: Notice of Allowance/Allowability dated Sep. 9, 2021, 5 pages, Doc 2347.
U.S. Appl. No. 15/464,205: Notice of Allowance/Allowability dated Oct. 29, 2021, 105 pages, Doc 2360.
U.S. Appl. No. 16/427,054, Request for Continued Examination filed Aug. 25, 2021, 3 pages, Doc 2338.
U.S. Appl. No. 16/710,731, Response to Non-Final Rejection filed Sep. 15, 2021, 24 pages, Doc 2348.
U.S. Appl. No. 16/710,731: Final Office Action dated Nov. 2, 2021, 39 pages, Doc 2361.
U.S. Appl. No. 16/048,113: Issue Notification dated Aug. 4, 2021, 1 page, Doc 2339.
U.S. Appl. No. 17/396,488, Patent Application filed Aug. 6, 2021, 84 pages, Doc 2340.
U.S. Appl. No. 17/396,488, Filing Receipt and Notice of Missing Parts filed Aug. 19, 2021, 7 pages, Doc 2341.
U.S. Appl. No. 17/396,488, Response to Notice of Missing Parts and Preliminary Amendment filed Nov. 3, 2021, 95 pages, Doc 2365.
U.S. Appl. No. 16/898,134: Response to Non-final Office Action and Terminal Disclaimer dated Jul. 30, 2021, 30 pages, Doc 2342.
U.S. Appl. No. 16/898,134: Notice of Allowance/Allowability dated Sep. 22, 2021, 8 pages, Doc 2349.
U.S. Appl. No. 16/898,134: Supplemental Notice of Allowability dated Oct. 14, 2021, 23 pages, Doc 2362.
U.S. Appl. No. 16/898,134: Supplemental Notice of Allowability dated Oct. 20, 2021, 23 pages, Doc 2363.
U.S. Appl. No. 16/048,061: Issue Notification dated Aug. 4, 2021, 1 page, Doc 2350.
U.S. Appl. No. 16/164,535, Issue Fee Payment and 312 Response filed Oct. 8, 2021, 17pages, Doc 2356.
U.S. Appl. No. 17/378,119, filed Jul. 16, 2021, 125 pages, Doc 2343.
U.S. Appl. No. 17/378,119, Filing Receipt filed Jul. 29, 2021, 4 pages, Doc 2344.

(56) References Cited

OTHER PUBLICATIONS

U.S. Appl. No. 17/378,119, Notice to File Corrected Application Papers dated Jul. 29, 2021, 2 pages, Doc 2345.
U.S. Appl. No. 17/378,119, Response to Notice to File Corrected Application Papers dated Nov. 3, 2021, 27 pages, Doc 2364.
Jaiswal, "Local Pattern Transformation Based Feature Extraction Techniques for Classification of Epileptic EEG Signals", Biomedical Signal Processing and Control (2017) pp. 81-92, 12 pages, Doc 2205.
Knott—"A Balanced Tree Storage and Retrieval Algorithm" ACM pp. 175-196, 1971, Doc 2296.
L-—"An Immediate Approach to Balancing Nodes in Binary Search Trees" ACM, pp. 238-245, 2006, Doc 2242.
Minn, "Linear Transformation of Multi-Level Signal Set in Multi-Code CDM", IEEE (2001) pp. 1239-1243, 5 pages, Doc 2214.
Murray, "Code Transformation and Instruction Set Extension", Journal of the Association for Computing Machinery (2009) pp. 1-31, 32 pages, Doc 2215.
Paik, "Mining Association Rules in Tree Structured XML Data" ACM, pp. 807-811, 2009, Doc 2243.
Rizum, "Code Transformation by Direct Transformation of ASTs", Journal of the Association for Computing Machinery (2015) pp. 1-7, 7 pages, Doc 2220.
Stefanov "Algorithmic Transformation Techniques for Efficient Exploration of Alternative Application Instances" Journal for the Association for Computing Machinery (ACM) (2002) pp. 7-12, 6 pages, Doc 2234.
U.S. Appl. No. 16/209,872, Notice of Publication, filed Jun. 6, 2019, 1 page, Doc 1144.
U.S. Appl. No. 16/209,872: Office Action, dated Sep. 17, 2020, 63 pages, Doc 2155.
U.S. Appl. No. 16/209,872: Response to Office Action, dated Sep. 17, 2020, 63 pages, Doc 2156.
U.S. Appl. No. 16/209,872, Terminal Disclaimer, filed Sep. 17, 2020, 6 pages, Doc 2157.
U.S. Appl. No. 16/209,872: Notice of Allowance and Allowability dated Mar. 26, 2021, 17 pages, Doc 2171.
U.S. Appl. No. 16.209,872: Amendment After dated Apr. 30, 2021, 11 pages, Doc 2245.
U.S. Appl. No. 16/209,872: Notice of Allowance/Allowability dated Jun. 10, 2021, 4 pages, Doc 2297.
U.S. Appl. No. 16/209,872, Request for Continued Examination and Amendment filed Jun. 25, 2021, 17 pages, Doc 2299.
U.S. Appl. No. 16/820,457: Application and Preliminary Amendment dated Mar. 16, 2020, 148 pages, Doc 1147.
U.S. Appl. No. 16/820,457, Filing Receipt, filed Mar. 31, 2020, 3 pages, Doc 1148.
U.S. Appl. No. 16/820,457: Notice of Publication, dated Jul. 9, 2020, 1 page, Doc 1149.
U.S. Appl. No. 17/158,804, Patent Application filed Jan. 26, 2021, 146 pages, Doc 2158.
U.S. Appl. No. 17/158,804, Filing Receipt dated Feb. 9, 2021, 5 pages, Doc 2172.
U.S. Appl. No. 17/158,804: Notice of Publication dated Feb. 9, 2021, 1 page, Doc 2246.
U.S. Appl. No. 15/043,267: Response to Office Action, dated Jul. 2, 2019, 24 pages, Doc 1212.
U.S. Appl. No. 15/043,267: Final Office Action, dated Oct. 18, 2019, 14 pages, Doc 1213.
U.S. Appl. No. 15/043,267: Response to Final Office Action, dated Jan. 21, 2020, 20 pages, Doc 1214.
U.S. Appl. No. 15/043,267: Advisory Action, filed Jan. 29, 2020, 12 pages, Doc 1215.
U.S. Appl. No. 15/043,267: RCE Amendment, dated Mar. 3, 2020, 21 pages, Doc 1216.
U.S. Appl. No. 15/043,267: Notice of Allowance, dated Mar. 23, 2020, 9 pages, Doc 1217.
U.S. Appl. No. 15/043,267, Issue Fee, filed Jun. 23, 2020, 18 pages, Doc 1218.
U.S. Appl. No. 15/043,267, Issue Notification, filed Jul. 15, 2020, 1 page, Doc 1219.
U.S. Appl. No. 16/911,282, filed Jun. 24, 2020, 98 pages, Doc 1220.
U.S. Appl. No. 16/911,282, Filing Receipt and Notice to File Missing Parts, filed Jul. 7, 2020, 7 pages, Doc 1221.
U.S. Appl. No. 16/911,282, Preliminary Amendment and Response to Notice to File Missing Parts filed Sep. 8, 2020, 18 pages, Doc 2145.
U.S. Appl. No. 16/911,282, Updated Filing Receipt, filed Sep. 10, 2020, 5 pages, Doc 2146.
U.S. Appl. No. 16/911,282: Notice of Publication, dated Dec. 17, 2020, 1 page, Doc 2159.
U.S. Appl. No. 11/006,848, Request to Correct Inventorship and for a Certificate of Correction, filed Sep. 12, 2016, 14 pages, Doc 1262.
U.S. Appl. No. 11/006,848, Certificate of Correction, filed Aug. 8, 2017, 1 page, Doc. 1263.
U.S. Appl. No. 12/573,829: Notice of Allowance dated May 21, 2019, 32 pages, Doc 1318.
U.S. Appl. No. 12/573,829, Issue Fee & Terminal Disclaimer filed Aug. 21, 2019, 12 pages, 1320.
U.S. Appl. No. 12/573,829, Issue Notification filed Sep. 18, 2019, 1 page, Doc 1322.
U.S. Appl. No. 16/549,185, filed Sep. 23, 2019, 73 pages, Doc. 1323.
U.S. Appl. No. 16/549,185, Filing Receipt and Notice to File Missing Parts filed Sep. 4, 2019, 6 pages, Doc. 1324.
U.S. Appl. No. 16/549,185, Response to Notice to File Missing Parts and Preliminary Amendment filed Sep. 5, 2019, 18 pages, Doc. 2147.
U.S. Appl. No. 16/549,185: Notice of Publication dated Dec. 19, 2019, 1 page, Doc. 1325.
U.S. Appl. No. 16/549,185, Updated Filing Receipt filed Sep. 6, 2019, 4 pages, Doc. 1326.
U.S. Appl. No. 12/578,411, Terminal Disclaimer filed Nov. 8, 2017, 7 pages, Doc. 1376.
U.S. Appl. No. 15/250,118, Issue Notification dated May 29, 2019, 1 page, Doc 2298.
U.S. Appl. No. 16/710,577, US Reissue Patent Application and Preliminary Amendment filed Dec. 11, 2019, 88 pages, Doc 1017.
U.S. Appl. No. 16/710,577, Filing Receipt filed Jan. 10, 2020, 4 pages, Doc 1018.
U.S. Appl. No. 16/710,577: Non-final Office Action dated Mar. 19, 2021, 11 pages, Doc. 2174.
U.S. Appl. No. 15/802,348: Final Office Action dated Jul. 9, 2019, 24 pages, Doc 1019.
U.S. Appl. No. 15/802,348: Response to Final Office Action dated Aug. 20, 2019, 29 pages, Doc 1020.
U.S. Appl. No. 15/802,348: Advisory Action dated Sep. 4, 2019, 3 pages, Doc 1021.
U.S. Appl. No. 15/802,348, RCE and Amendment filed Sep. 16, 2019, 30 pages, Doc 1022.
U.S. Appl. No. 15/802,348, Terminal Disclaimer filed Mar. 18, 2020, 9 pages, Doc. 1488.
U.S. Appl. No. 15/802,348: Notice of Allowance and Fees Due dated Mar. 27, 2020, 178 pages, Doc. 1489.
U.S. Appl. No. 15/802,348, Issue Fee Payment filed Jun. 19, 2020, 9 pages, Doc. 1491.
U.S. Appl. No. 15/802,348, Issue Notification filed Jul. 8, 2020, 1 page, Doc. 1494.
U.S. Appl. No. 16/909,899, filed Jun. 23, 2020, 98 pages, Doc. 2140.
U.S. Appl. No. 16/909,899, Filing Receipt and Notice to File Missing Parts filed Jul. 6, 2020, 8 pages, Doc. 2141.
U.S. Appl. No. 16/909,899, Preliminary Amendment and Response to Missing Parts filed Sep. 8, 2020, 31 pages, Doc. 2142.
U.S. Appl. No. 16/909,899, Updated Filing Receipt filed Sep. 10, 2020, 6 pages, Doc. 2143.
U.S. Appl. No. 16/909,899: Notice of Publication dated Dec. 17, 2020, 6 pages, Doc. 2161.
U.S. Appl. No. 12/830,236, Supplemental Notice of Allowability filed May 21, 2019, 24 pages, Doc 1023.
U.S. Appl. No. 12/830,236, Issue Fee Payment filed Jul. 1, 2019, 3 pages, Doc 1024.

(56) References Cited

OTHER PUBLICATIONS

U.S. Appl. No. 12/830,236, Supplemental Allowability filed Jul. 9, 2019, 8 pages, Doc. 1573.
U.S. Appl. No. 12/830,236, Issue Notification filed Jul. 24, 2019, 1 page, Doc 1025.
U.S. Appl. No. 16/459,930, U.S. Appl. No. 16/459,930, filed Jul. 2, 2019, 99 pages, Doc 1026.
U.S. Appl. No. 16/459,930, Filing Receipt and Notice to File Missing Parts and Filing Receipt filed Jul. 18, 2019, 7 pages, Doc. 1577.
U.S. Appl. No. 16/459,930, Response to Notice to File Missing Parts and Preliminary Amendment filed Sep. 4, 2019, 19 pages, Doc 1029.
U.S. Appl. No. 16/459,930, Updated Filing Receipt filed Sep. 6, 2019, 4 pages, Doc 1030.
U.S. Appl. No. 16/459,930: Notice of Publication dated Dec. 12, 2019, 1 page, Doc 1031.
U.S. Appl. No. 16/459,930: Non-Final Rejection dated Oct. 6, 2020, 43 pages, Doc. 1581.
U.S. Appl. No. 16/459,930: Response to Non-Final Rejection dated Mar. 8, 2021, 19 pages, Doc. 2175.
U.S. Appl. No. 16/459,930: Non-final Office Action dated Jun. 9, 2021, 17 pages, Doc 2304.
U.S. Appl. No. 13/625,812, List of References Considered by Examiner filed Apr. 3, 2015, 2 pages, Doc. 1640.
U.S. Appl. No. 13/625,812, Issue Notification Apr. 8, 2015, 1 page, Doc. 1641.
U.S. Appl. No. 13/625,812, Terminal Disclaimer filed Apr. 14, 2015, 14 pages, Doc 1642.
U.S. Appl. No. 13/625,812, Terminal Disclaimer Review Decision filed Apr. 17, 2015, 1 page, Doc. 1643.
U.S. Appl. No. 14/641,735, Issue Fee Payment and Response under 37 CFR § dated Jul. 12, 2019, 8 pages, Doc 1032.
U.S. Appl. No. 14/641,735: Notice of Allowance and Fees Due Jul. 26, 2019, 7 pages, Doc. 1667.
U.S. Appl. No. 14/641,735, Supplemental Notice of Allowability dated Jul. 26, 2019, 7 pages, Doc 1033.
U.S. Appl. No. 14/641,735, Issue Notification filed Aug. 7, 2019, 1 page, Doc 1034.
U.S. Appl. No. 16/513,021, filed Jul. 16, 2019, 130 pages, Doc 1035.
U.S. Appl. No. 16/513,021, Filing Receipt and Notice to File Missing Parts filed Jul. 30, 2019, 7 pages, Doc. 1671.
U.S. Appl. No. 16/513,021, Response to Notice to File Missing Parts and Preliminary Amendment dated Sep. 11, 2019, 45 pages, Doc 1038.
U.S. Appl. No. 16/513,021, Updated Filing Receipt filed Sep. 12, 2019, 4 pages, Doc 1039.
U.S. Appl. No. 16/513,021: Notice of Publication dated Dec. 19, 2019, 1 page, Doc 1040.
U.S. Appl. No. 16/513,021: Non-final Office Action dated May 5, 2021, 36 pages, Doc 2290.
U.S. Appl. No. 15/464,205: Non-final Office Action dated Jul. 25, 2019, 64 pages, Doc 1041.
U.S. Appl. No. 15/464,205: Response to Non-Final Rejection dated Oct. 22, 2019, 21 pages, Doc. 1750.
U.S. Appl. No. 15/464,205, Terminal Disclaimer filed Oct. 22, 2019, 5 pages, Doc 1043.
U.S. Appl. No. 15/464,205: Final Office Action dated Nov. 14, 2019, 11 pages, Doc 1044.
U.S. Appl. No. 15/464,205: Response to Final Office Action dated Feb. 12, 2020, 11 pages, Doc 1062.
U.S. Appl. No. 15/464,205: Advisory Action dated Feb. 25, 2020, 5 pages, Doc 1063.
U.S. Appl. No. 15/464,205: Request for Continued Examination and Amendment dated Mar. 5, 2020, 20 pages, Doc 1064.
U.S. Appl. No. 15/464,205: Non-Final Rejection dated Mar. 27, 2020, 52 pages, Doc. 1755.
U.S. Appl. No. 15/464,205: Response to Non-Final Rejection, 19 pages, Doc. 1756.
U.S. Appl. No. 15/464,205: Final Rejection dated Sep. 3, 2020, 100 pages, Doc. 1757.
U.S. Appl. No. 15/464,205: Interview Summary dated Oct. 26, 2020, 8 pages, Doc. 1758.
U.S. Appl. No. 15/464,205: Response to Final Rejection dated Nov. 3, 2020, 21 pages, Doc. 1759.
U.S. Appl. No. 15/464,205: Advisory Action dated Nov. 16, 2020, 10 pages, Doc. 1760.
U.S. Appl. No. 15/464,205, Request for Continued Examination filed Nov. 20, 2020, 24 pages, Doc. 1761.
U.S. Appl. No. 15/464,205: Notice of Allowance/Allowability filed May 26, 2020, 20 pages, Doc. 2291.
U.S. Appl. No. 15/240,964, Issue Fee Payment and Response Under 37 CFR § 1.312 filed May 16, 2019, 16 pages, Doc 1045.
U.S. Appl. No. 15/240,964, Notice to File Corrected Application Papers filed May 16, 2019, 3 pages, Doc 1046.
U.S. Appl. No. 15/240,964, Response to Notice to File Corrected Application Papers filed Jul. 22, 2019, 11 pages, Doc. 1853.
U.S. Appl. No. 15/240,964, Issue Notification filed Aug. 21, 2019, 1 page, Doc 1048.
U.S. Appl. No. 16/427,054, filed May 30, 2019, 68 pages, Doc 1049.
U.S. Appl. No. 16/427,054, Filing Receipt and Notice to File Missing Parts filed Jun. 6, 2019, 7 pages, Doc. 1857.
U.S. Appl. No. 16/427,054, Response to Notice to File Missing Parts and Preliminary Amendment filed Aug. 8, 2019, 19 pages, Doc 1052.
U.S. Appl. No. 16/427,054, Updated Filing Receipt filed Aug. 12, 2019, 4 pages, Doc 1053.
U.S. Appl. No. 16/427,054: Notice of Publication dated Nov. 21, 2019, 1 page, Doc 1054.
U.S. Appl. No. 16/427,054: Non-Final Rejection dated Nov. 9, 2020, 367 pages, Doc. 1861.
U.S. Appl. No. 16/427,054: Response to Non-Final Rejection dated Feb. 8, 2021, 22 pages, Doc. 2163.
U.S. Appl. No. 16/427,054, Terminal Disclaimer filed Feb. 8, 2021, 5 pages, Doc. 2164.
U.S. Appl. No. 16/427,054: Final Office Action dated Mar. 25, 2021, 22 pages, Doc. 2176.
U.S. Appl. No. 16/710,731, Reissue Application filed Dec. 11, 2019, 91 pages, Doc. 1914.
U.S. Appl. No. 16/710,731, Filing Receipt filed Dec. 12, 2019, 5 pages, Doc. 1915.
U.S. Appl. No. 16/710,731, Request for Corrected Filing Receipt filed Feb. 19, 2020, 16 pages, Doc. 1916.
U.S. Appl. No. 16/710,731, Corrected Filing Receipt dated Feb. 24, 2020, 4 pages, Doc 1066.
U.S. Appl. No. 16/710,731: Non-Final Rejection dated Nov. 24, 2020, 15 pages, Doc. 1918.
U.S. Appl. No. 16/710,731: Response to Non-Final Rejection dated Nov. 24, 2020, 21 pages, Doc 2177.
U.S. Appl. No. 16/710,731: Non-Final Rejection dated Apr. 21, 2021, 11 pages, Doc 2292.
U.S. Appl. No. 16/048,113: Non-Final Rejection dated Oct. 2, 2020, 130 pages, Doc. 1924.
U.S. Appl. No. 16/048,113: Response to Non-Final Rejection dated Feb. 2, 2021, 22 pages, Doc. 2165.
U.S. Appl. No. 16/048,113, Terminal Disclaimer filed Oct. 2, 2020, 5 pages, Doc. 2166.
U.S. Appl. No. 16/048,113: Notice of Allowance/Allowability dated Apr. 6, 2021, 75 pages, Doc 2293.
U.S. Appl. No. 16/048,113, Issue Fee Payment and 312 Response filed Jul. 6, 2021, 12 pages, Doc 2307.
U.S. Appl. No. 16/164,430: Non-Final Rejection filed Oct. 18, 2019, 122 pages, Doc. 2014.
U.S. Appl. No. 16/164,430: Non-final Office Action dated Oct. 18, 2019, 107 pages, Doc 1058.
U.S. Appl. No. 16/164,430: Response to Non-Final Rejection filed Jan. 21, 2020, 15 pages, Doc. 2015.
U.S. Appl. No. 16/164,430: Notice of Allowance Mar. 6, 2020, 86 pages, Doc. 2016.
U.S. Appl. No. 16/164,430, Issue Fee Payment filed Jun. 8, 2020, 4 pages, Doc. 2017.

(56) References Cited

OTHER PUBLICATIONS

U.S. Appl. No. 16/164,430, Supplemental Notice of Allowability filed Jun. 16, 2020, 12 pages, Doc. 2018.
U.S. Appl. No. 16/164,430, Issue Notification Jun. 17, 2020, 1 page, Doc. 2154.
U.S. Appl. No. 16/164,430: Request for Certificate of Correction filed Sep. 3, 2020, 6 pages, Doc. 2021.
U.S. Appl. No. 16/164,430, Certificate of Correction filed Oct. 6, 2020, 1 page, Doc. 2023.
U.S. Appl. No. 16/898,134, Application filed Jun. 10, 2020, 84 pages, Doc. 2024.
U.S. Appl. No. 16/898,134, Filing Receipt and Notice to File Missing Parts filed Jun. 19, 2020, 8 pages, Doc. 2025.
U.S. Appl. No. 16/898,134, Preliminary Amendment and Response to Mising Parts filed Aug. 18, 2020, 39 pages, Doc. 2026.
U.S. Appl. No. 16/898,134, Updated Filing Receipt filed Aug. 21, 2020, 6 pages, Doc. 2027.
U.S. Appl. No. 16/898,134: Notice of Publication dated Nov. 27, 2020, 2 pages, Doc. 2028.
U.S. Appl. No. 16/898,134: Non-final Office Action dated Jun. 30, 2021, 57 pages, Doc 2308.
U.S. Appl. No. 13/030,084, Issue Notification filed Jan. 16, 2016, 1 page, Doc. 2086.
U.S. Appl. No. 14/968,429, Request for Certificate of Correction filed Oct. 12, 2018, 6 pages, Doc. 2108.
U.S. Appl. No. 14/968,429, Certificate of Correction filed Nov. 20, 2018, 1 page, Doc. 2109.
U.S. Appl. No. 16/048,061: Non-Final Rejection dated Sep. 25, 2020, 68 pages, Doc. 2117.
U.S. Appl. No. 16/048,061: Response to Non-Final Rejection dated Jan. 25, 2021, 17 pages, Doc. 2167.
U.S. Appl. No. 16/048,061, Terminal Disclaimer filed Jan. 25, 2021, 6 pages, Doc. 2168.
U.S. Appl. No. 16/048,061: Notice of Allowance/Allowability dated Apr. 9, 2021, 33 pages, Doc 2294.
U.S. Appl. No. 16/048,061, Issue Fee Payment and 312 Response filed Jul. 9, 2021, 19 pages, Doc 2312.
U.S. Appl. No. 16/048,061, eTerminal Disclaimer filed Jul. 9, 2021, 3 pages, Doc 2313.
U.S. Appl. No. 16/164,535: Notice of Publication dated Apr. 25, 2019, 1 page, Doc. 2122.
U.S. Appl. No. 16/164,535: Non-Final Rejection dated Nov. 24, 2020, 76 pages, Doc. 2123.
U.S. Appl. No. 16/164,535: Response to Non-Final Rejection dated Feb. 19, 2021, 17 pages, Doc. 2169.
U.S. Appl. No. 16/164,535, Terminal Disclaimer filed Feb. 19, 2021, 6 pages, Doc. 2170.
U.S. Appl. No. 16/164,535: Notice of Allowance/Allowability dated Feb. 19, 2021, 6 pages, Doc 2295.
U.S. Appl. No. 16/164,535: Request for Continued Examination and Amendment dated Jun. 17, 2021, 58 pages, Doc 2309.
U.S. Appl. No. 16/164,535, Notice of Allowance / Allowability and Examiner—Initialed SB08 Listing filed Jul. 8, 2021, 20 pages, Doc 2311.
U.S. Appl. No. 16/209,872: Issue Notification dated Dec. 1, 2021, 1 page.
U.S. Appl. No. 17/381,142: Notice of Publication dated Nov. 11, 2021, 1 page.
U.S. Appl. No. 16/909,899: Response to Non-final Office Action filed Nov. 11, 2021, 27 pages.
U.S. Appl. No. 16/459,930: Response to Non-final Office Action filed Oct. 12, 2021, 18 pages.
U.S. Appl. No. 16/164,535: Issue Notification dated Nov. 17, 2021, 1 page.

* cited by examiner

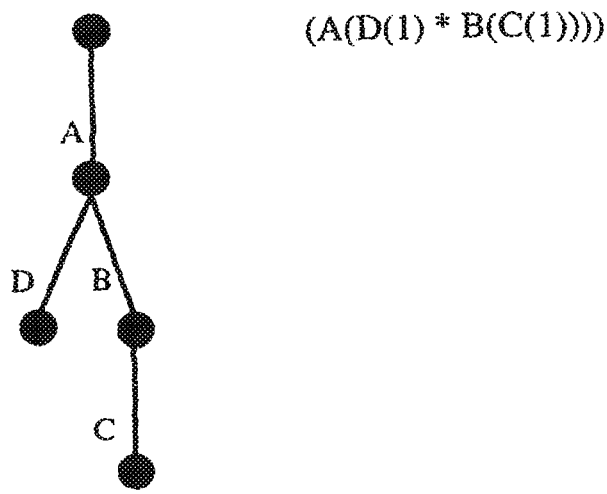
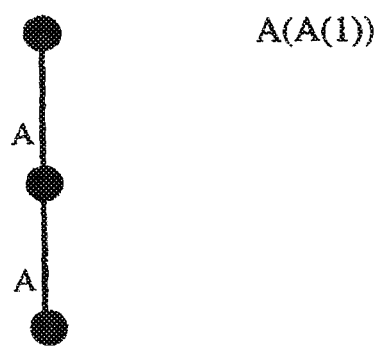
Fig. 2

$Q(0) \Rightarrow 2$ $Q(1) \Rightarrow 3$ $Q(2) \Rightarrow 5$ $Q(3) \Rightarrow 7$ $Q(4) \Rightarrow 11$ $Q(5) \Rightarrow 13$ $Q(6) \Rightarrow 17$ $Q(7) \Rightarrow 19$ $Q(8) \Rightarrow 23$ $Q(9) \Rightarrow 29$ $Q(10) \Rightarrow 31$ $Q(11) \Rightarrow 37$ $Q(12) \Rightarrow 41$

Finite Rooted Unordered 2 Valued Edge-Labeled Trees

*Signature* = < 2 , 2 , 1 >
*Alphabet* = {0, 1, A, B, * }

*Expressions*

$$(x * y) = (y * x);$$
$$((x * y) * z) = (x * (y * z));$$

$$(0 * x) = 0;$$
$$(1 * x) = x;$$

$$A(0) = 1;$$
$$B(0) = 1.$$

*Core Model Isomorph (based upon the natural number universe)*

$$A(x) = Q(2x - 2), x \text{ not } 0;$$
$$B(x) = Q(2x - 1), x \text{ not } 0;$$

$$(x * y) = (x \text{ multiplied by } y).$$

700     Fig. 7

Finite Rooted Unordered 3 Valued Edge-Labeled Trees

*Signature* = < 2, 3, 1 >
*Alphabet* = {0, 1, A, B, C, * }

*Expressions*

$$(x * y) = (y * x);$$
$$((x * y) * z) = (x * (y * z));$$

$$(0 * x) = 0;$$
$$(1 * x) = x;$$

$$A(0) = 1;$$
$$B(0) = 1;$$
$$C(0) = 1.$$

*Core Model Isomorph (based upon the natural number universe)*

$$A(x) = Q(3x - 3), x \text{ not } 0;$$
$$B(x) = Q(3x - 2), x \text{ not } 0;$$
$$C(x) = Q(3x - 1), x \text{ not } 0;$$

$$(x * y) = (x \text{ multiplied by } y).$$

Fig. 8

Finite Rooted Unordered 4 Valued Edge-Labeled Trees

*Signature* = < 2, 4, 1 >
*Alphabet* = {0, 1, A, B, C, D, * }

*Expressions*

910 — $(x * y) = (y * x);$
920 — $((x * y) * z) = (x * (y * z));$

930 — $\begin{cases} (0 * x) = 0; \\ (1 * x) = x; \end{cases}$

940 — $\begin{cases} A(0) = 1; \\ B(0) = 1; \\ C(0) = 1; \\ D(0) = 1. \end{cases}$

*Core Model Isomorph (based upon the natural number universe)*

$A(x) = Q(4x - 4), x \text{ not } 0;$
$B(x) = Q(4x - 3), x \text{ not } 0;$
$C(x) = Q(4x - 2), x \text{ not } 0;$
$D(x) = Q(4x - 1), x \text{ not } 0;$ $(x * y) = (x \text{ multiplied by } y).$

Finite Rooted Unordered 5 Valued Edge-Labeled Trees

*Signature* = < 2 , 5 , 1 >
*Alphabet* = { 0, 1, A, B, C, D, E  * }

*Expressions*

$$(x * y) = (y * x);$$
$$((x * y) * z) = (x * (y * z));$$

$$(0 * x) = 0;$$
$$(1 * x) = x;$$

$$A(0) = 1;$$
$$B(0) = 1;$$
$$C(0) = 1;$$
$$D(0) = 1;$$
$$E(0) = 1.$$

*Core Model Isomorph (based upon the natural number universe)*

$$A(x) = Q(5x - 5), x \text{ not } 0;$$
$$B(x) = Q(5x - 4), x \text{ not } 0;$$
$$C(x) = Q(5x - 3), x \text{ not } 0;$$
$$D(x) = Q(5x - 2), x \text{ not } 0;$$
$$E(x) = Q(5x - 1), x \text{ not } 0;$$

$$(x * y) = (x \text{ multiplied by } y).$$

1000  Fig. 10

Finite Rooted Unordered 6 Valued Edge-Labeled Trees

*Signature* = <2, 6, 1>
*Alphabet* = {0, 1, A, B, C, D, E, F *}

*Expressions*

$$(x * y) = (y * x);$$
$$((x * y) * z) = (x * (y * z));$$

$$(0 * x) = 0;$$
$$(1 * x) = x;$$

$$A(0) = 1;$$
$$B(0) = 1;$$
$$C(0) = 1;$$
$$D(0) = 1;$$
$$E(0) = 1;$$
$$F(0) = 1.$$

*Core Model Isomorph (based upon the natural number universe)*

$$A(x) = Q(6x - 6), x \text{ not } 0;$$
$$B(x) = Q(6x - 5), x \text{ not } 0;$$
$$C(x) = Q(6x - 4), x \text{ not } 0;$$
$$D(x) = Q(6x - 3), x \text{ not } 0;$$
$$E(x) = Q(6x - 2), x \text{ not } 0;$$
$$F(x) = Q(6x - 1), x \text{ not } 0;$$

$$(x * y) = (x \text{ multiplied by } y).$$

|    | 2-ary | 3-ary | 4-ary | 5-ary | 6-ary |
|----|-------|-------|-------|-------|-------|
| 0  | ○ | [------------------------------------------------→ | | | |
| 1  | ● | [------------------------------------------------→ | | | |
| 2  | A | [------------------------------------------------→ | | | |
| 3  | B | [------------------------------------------------→ | | | |
| 4  | A A | [------------------------------------------------→ | | | |
| 5  | A / A | C | [-------------------------------→ | | |
| 6  | A / B | [------------------------------------------------→ | | | |
| 7  | B / A | A / A | D | [------------------→ | |
| 8  | A A A | [------------------------------------------------→ | | | |
| 9  | B B | [------------------------------------------------→ | | | |
| 10 | A A A | A C | [-------------------------------→ | | |

*Fig. 12*

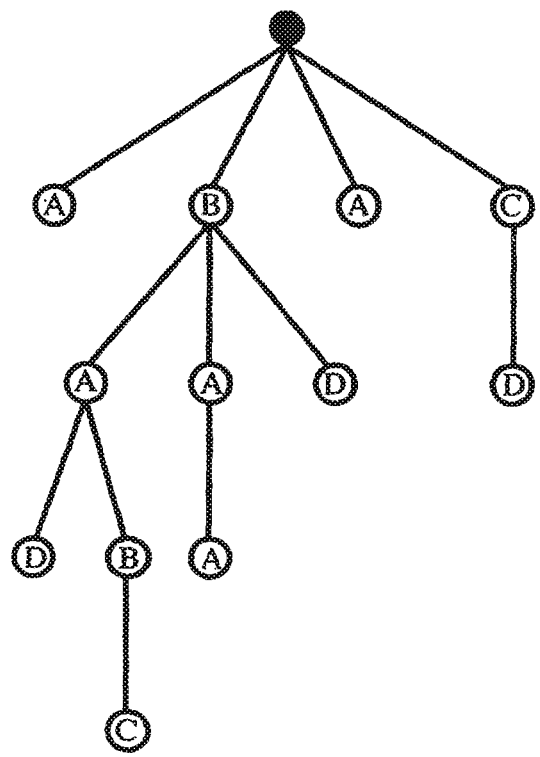
1400   Fig. 14

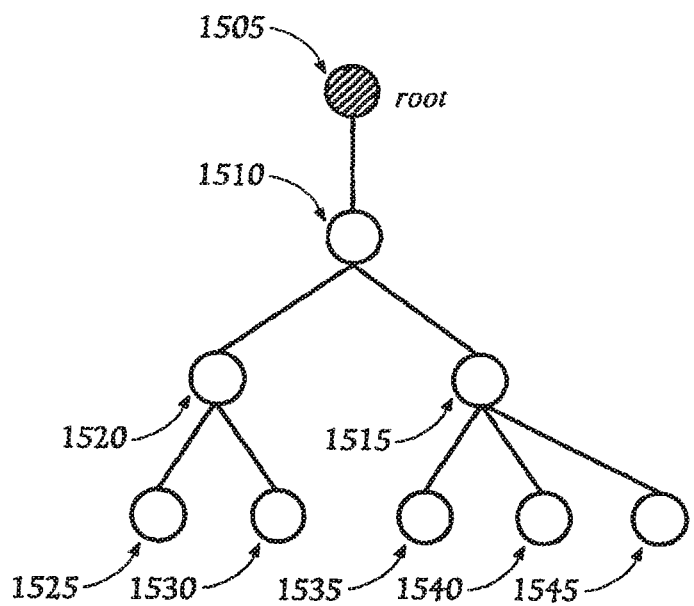
1500    Fig. 15

Natural #   BEL Trees
0   
1   
2   
3   
4   
5   
6   
1600   Fig. 16

1700

METHOD AND/OR SYSTEM FOR MANIPULATING TREE EXPRESSIONS

This disclosure claims priority pursuant to 35 USC 119(e) from U.S. provisional patent application Ser. No. 60/623,280, filed on Oct. 29, 2004, by LeTourneau, titled, "METHOD AND/OR SYSTEM FOR MANIPULATING TREE EXPRESSIONS," assigned to the assignee of the presently claimed subject matter.

BACKGROUND

This disclosure is related to manipulating tree expressions In a variety of fields, data or a set of data, may be represented in a hierarchical fashion. This form of representation may, for example, convey information, such as particular relationships or patterns between particular pieces of data or groups of data and the like. However, manipulating and/or even recognizing specific data representations or patterns is not straight-forward, particularly where the data is arranged in a complex hierarchy. Without loss of generality, examples may include a database, and further, without limitation, a relational database. Techniques for performing operations on such databases or recognizing specific patterns, for example, are computationally complex, time consuming, and/or otherwise cumbersome. A need, therefore, continues to exist for improved techniques for performing such operations and/or recognizing such patterns.

BRIEF DESCRIPTION OF THE DRAWINGS

Subject matter is particularly pointed out and distinctly claimed in the concluding portion of the specification. The claimed subject matter, however, both as to organization and method of operation, together with objects, features, and advantages thereof, may best be understood by reference of the following detailed description when read with the accompanying drawings in which:

FIG. 2 is a schematic diagram of embodiments of several unordered edge-labeled trees and symbolic expressions mathematically representing the tree embodiments;

FIG. 6 is a table providing an embodiment of a function that relates natural numerals to composite numerals;

FIG. 7 is a table providing symbolic expressions for an embodiment of rooted, unordered, 2-valued edge-labeled trees;

FIG. 8 is a table providing symbolic expressions for an embodiment of rooted, unordered, 3-valued edge-labeled trees;

FIG. 9 is a table providing symbolic expressions for an embodiment of rooted, unordered, 4-valued edge-labeled trees;

FIG. 10 is a table providing symbolic expressions for an embodiment of rooted, unordered, 5-valued edge-labeled trees;

FIG. 11 is a table providing symbolic expressions for an embodiment of rooted, unordered, 6-valued edge-labeled trees;

FIGS. 12 and 13 provide an embodiment of a table relating the natural numerals and embodiments of different tree views;

FIG. 14 is a schematic diagram of an unordered node labeled tree;

FIG. 15 is a schematic diagram of an unordered edge labeled tree;

FIG. 16 is a table illustrating an embodiment of a relationship between BELTs and natural numerals.

DETAILED DESCRIPTION

Figure 1:
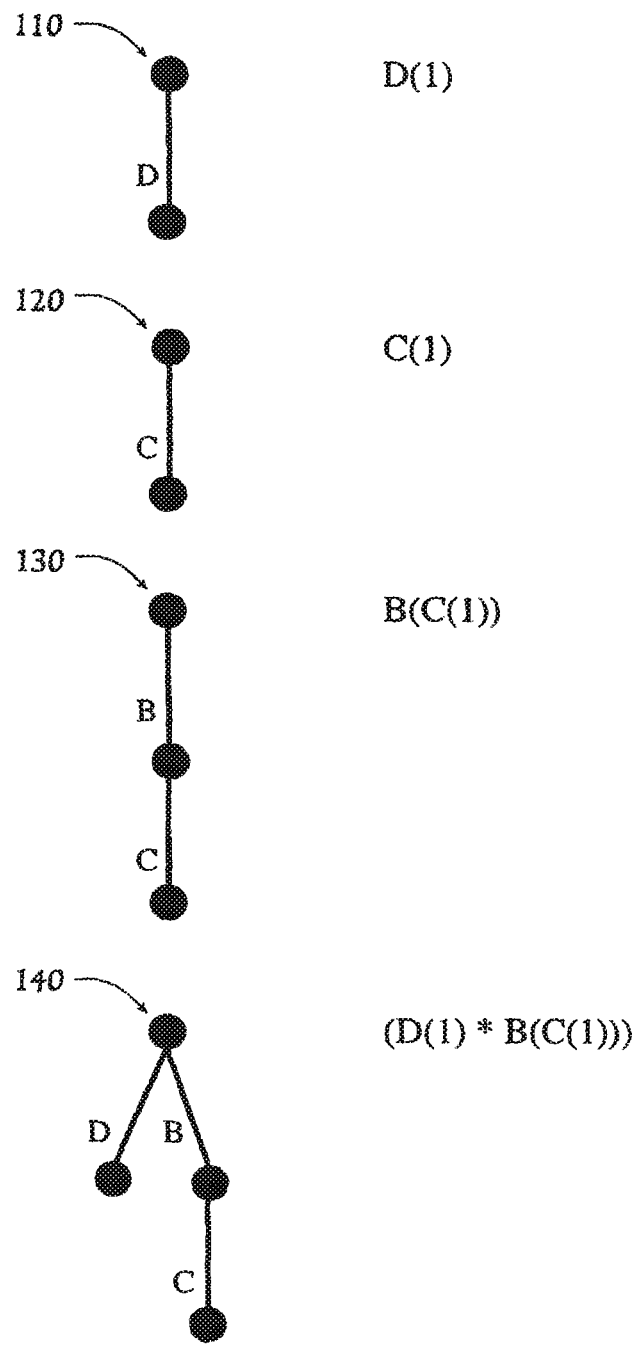
FIG. 1 is a schematic diagram of embodiments of several unordered edge-labeled trees and symbolic expressions mathematically representing the tree embodiments.

In the following detailed description, numerous specific details are set forth to provide a thorough understanding of the claimed subject matter. However, it will be understood by those skilled in the art that the claimed subject matter may be practiced without these specific details. In other instances, well-known methods, procedures, components and/or circuits have not been described in detail so as not to obscure the claimed subject matter.

Some portions of the detailed description which follow are presented in terms of algorithms and/or symbolic representations of operations on data bits or binary digital signals stored within a computing system, such as within a computer or computing system memory. These algorithmic descriptions and/or representations are the techniques used by those of ordinary skill in the data processing arts to convey the substance of their work to others skilled in the art. An algorithm is here, and generally, considered to be a self-consistent sequence of operations and/or similar processing leading to a desired result. The operations and/or processing involve physical manipulations of physical quantities. Typically, although not necessarily, these quantities may take the form of electrical and/or magnetic signals capable of being stored, transferred, combined, compared and/or otherwise manipulated. It has proven convenient, at times, principally for reasons of common usage, to refer to these signals as bits, data, values, elements, symbols, characters, terms, numbers, numerals and/or the like. It should be understood, however, that all of these and similar terms are to be associated with the appropriate physical quantities and are merely convenient labels. Unless specifically stated otherwise, as apparent from the following discussion, it is appreciated that throughout this specification discussions utilizing terms such as "processing", "computing", "calculating", "determining" and/or the like refer to the actions and/or processes of a computing platform, such as a computer or a similar electronic computing device, that manipulates and/or transforms data represented as physical electronic and/or magnetic quantities and/or other physical quantities within the computing platform's processors, memories, registers, and/or other information storage, transmission, and/or display devices.

In a variety f fields, data or a set of data, may be represented in a hierarchical fashion. This form of representation may, for example, convey information, such as particular relationships or patterns between particular pieces of data or groups of data and the like. However, manipulating and/or even recognizing specific data representations or patterns is not straight-forward, particularly where the data is arranged in a complex hierarchy. Without loss of generality, examples may include a database and further, without limitation, a relational database. Techniques for performing operations on such databases or recognizing specific patterns, for example, are computationally complex, time consuming, and/or otherwise cumbersome. A need, therefore, continues to exist for improved techniques for performing such operations and/or recognizing such patterns.

As previously discussed, in a variety of fields, it is convenient and/or desirable to represent data, a set of data and/or other information in a hierarchical fashion. In this context, such a hierarchy of data shall be referred to as a "tree." In a particular embodiment, a tree may comprise a finite, rooted, connected, acyclic graph. Likewise, such trees may be either ordered or unordered. Here, ordered refers to the notion that there is an ordering or precedence among nodes attached to a common node corresponding to the order of the attached nodes shown in a graphical illustration. An unordered tree is illustrated here, for example, in FIG. 15 by embodiment 100. As illustrated, the root of this particular embodiment encompasses node 105. In addition to 105, there are eight other nodes designated 110 to 145, respectively. Likewise, the nodes are connected by branches referred to, in this context, as edges. Thus, the nodes of this tree are connected by eight edges. This embodiment, therefore, illustrates a finite tree that is rooted by node 105. Furthermore, the nodes are connected, meaning, in this context, that a path exists between any two nodes of the tree. The tree is likewise acyclic, meaning here, that no path in the tree forms a complete loop.

As previously suggested, in a variety of contexts, it may be convenient and/or desirable to represent a hierarchy of data and/or other information using a structure, such as the embodiment illustrated in FIG. 15. One particular embodiment, without loss of generality, of a tree may include edges that are labeled with data and/or other values. Likewise, in one particular embodiment, such data and/or values may be limited to a particular set of data. For example, in this context, a binary edge labeled tree refers to a tree in which the data and/or values comprise binary data, that is, in this example, either a binary one or a binary zero. Likewise, alternatively, the edges of a tree may be labeled with three values, such as 0, 1, 2. Continuing, the edges may be labeled with four values, five values, etc. In this context, the class of all trees in which the edges are labeled with a specific number of distinct values, that is, in this context, values chosen from a set having a specific number of distinct elements, shall be referred to as edge-labeled trees (ELTs). It is likewise noted that such trees are not limited to being labeled with the numerals previously described. Any distinctly identifiable labels may be employed; however, in this context, it shall be understood that employing numerals to label the edges is sufficiently general to encompass any sort of data labels that may be desirable, regardless of their form.

To reiterate, in this context, a tree comprises an edge labeled tree if each edge of the string or tree respectively stores a value or single piece of data. Likewise, in this context, two nodes are employed to support an edge holding a single piece of data. At this point, it is worth noting that trees having nodes and edges, such as previously described, may be represented in a computing platform or similar computing device through a data structure or a similar mechanism intended to capture the hierarchical relationship of the data, for example. It is intended that all such embodiments are included within the scope of the claimed subject matter.

It is noted that binary edge labeled trees (BELTs) may be listed or enumerated. See, for example, U.S. provisional patent application Ser. No. 60/543,371, titled "Manipulating Sets of Hierarchical Data," filed on Feb. 8, 2004, by J. J. LeTourneau, and assigned to the assignee of the current provisional application. This is illustrated, here, for example, in FIG. 16. It is noted that this particular figure also includes the associated natural numerals. The association of such numerals for this particular embodiment should be clear based at least in part on previously cited U.S. provisional patent application Ser. No. 60/543,371. However, it is, of course, again noted that the claimed subject matter is not limited in scope to employing the approach or approaches described in aforementioned U.S. provisional patent application Ser. No. 60/543,371. U.S. provisional patent application Ser. No. 60/543,371 is provided simply as an example of listing or enumerating unordered BELTs.

However, for this particular embodiment, although the claimed subject matter is not limited in scope in this respect, a method of enumerating a set of unordered trees may begin with enumeration of an empty binary edge labeled tree and a one node binary edge labeled tree. Thus, the empty tree is associated with the natural numeral zero and has a symbolic representation as illustrated in FIG. 16 (circle). Likewise, the one node tree, which holds no data, is associated with the natural numeral one and has a graphical representation of a single node. For higher positive natural numbers, ordered trees may be generated by a process described, for example, in "The Lexicographic Generation of Ordered Trees," by S. Zaks, The Journal of Theoretical Computer Science, Vol. 10(1), pp 63-82, 1980, or, "Enumerating Ordered Trees Lexicographically," by M. C. Er, Computation Journal, Vol. 28, Issue 5, pp 538-542, 1985. This may be illustrated, for example in FIG. 16, as described in more detail below.

As illustrated, for this particular embodiment, and as previously described, the empty tree has zero nodes and is associated with the natural numeral zero. Likewise, the one node tree root comprises a single node and is associated with the natural numeral one. Thus, to obtain the tree at position two, a root node is attached and connected to the prior root node by an edge. Likewise, here, by convention, the edge is labeled with a binary zero. If, however, the tree formed by the immediately proceeding approach were present in the prior enumeration of trees, then a similar process embodiment is followed, but, instead, the new edge is labeled with a binary one rather than a binary zero. Thus, for example, to obtain the binary edge labeled tree for position three, a new root node is connected to the root node by an edge and that edge is labeled with a binary one.

Continuing with this example, to obtain the binary edge labeled tree for position four, observe that numeral four is the product of numeral two times numeral two. Thus, a union is formed at the root of two trees, where, here, each of those trees is associated with the positive natural numeral two. Likewise, to obtain the binary edge labeled tree for position five, begin with the binary edge labeled tree for position two and follow the previously articulated approach of adding a root and an edge and labeling it with a binary zero.

In this context, adding a root node and an edge and labeling it binary zero is referred to as a "zero-push" operation and adding a root node and an edge and labeling it binary one is referred to as a "one-push" operation. Thus, referring again to FIG. 16, the one-push of the root tree is the tree at position three. This follows from FIG. 9 of previously referenced U.S. provisional patent application Ser. No. 60/543,371, since Q((1*2)−1)=Q(1)=3. Likewise, the tree at position five is the zero-push of the tree at position 2. Again, this follows from FIG. 9 of the previously referenced US provisional patent application, since Q((2*2)−2)=Q(2)=5.

In the embodiment just described, binary edge labeled trees use binary numerals "0" and "1." However, the claimed subject matter is not limited in scope to binary edge Tabled trees. For example, trees may employ any number of numeral combinations as labels, such as triplets, quadruplets, etc. Thus, using a quadruplet example, it is possible to construct trees, such as a zero-push of a particular tree, a one-push of that tree, a two-push of that tree, and a three-push of that tree. Thus, for such trees, edges may be labeled 0, 1, 2 or 3, etc., as previously described and as explained in more detail hereinafter.

Figure 17:
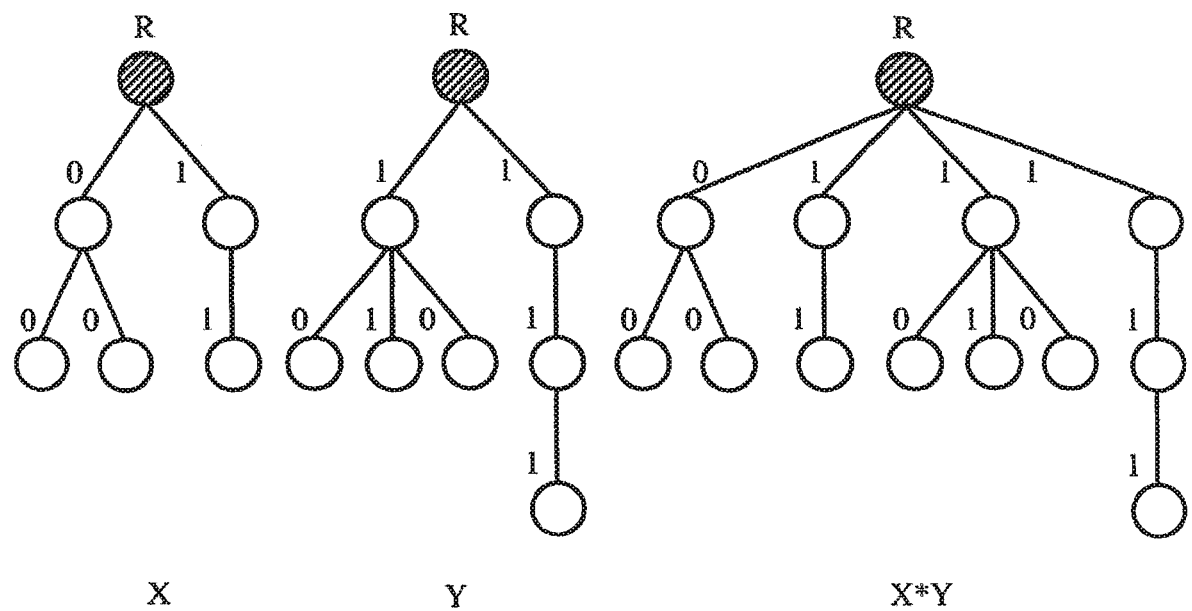
FIG. 17 is a schematic diagram illustrating an embodiment of merging two edge-labeled trees.

The foregoing discussion has begun to characterize an algebra involving trees, in this particular embodiment, an algebra for unordered edge labeled trees or unordered ELTs, such as BELTs. The foregoing discussion defines a value zero, a zero node tree for this particular embodiment, a value one, a one node tree for this particular embodiment, and a monadic operation, previously described as zero-push. For example, alternatively, a "one-push" may be employed. For this embodiment, this is analogous, for example, to the convention that "0" represent "off" and "1" represent "on." Alternatively and equivalently, "1" may be employed to represent "off," and "0" may be employed to represent "on," without loss of generality. For this particular embodiment, an additional operation may be characterized, a "merger" operation. The merger operation with respect to trees refers to merging two trees at their roots. This operation is illustrated, for example, in FIG. 17.

As will now be appreciated, the merger operation comprises a binary operator. Likewise, the constants zero/one, referred to above, may be viewed as an operation having no argument or as a zero valued argument operator or operation. Thus, this operation, in effect, returns the same value whenever applied. Here, for this particular embodiment, the constant value, or zero valued argument operation that returns "c" and is denoted as "c." The merger operator is denoted as "*".

Figure 4:
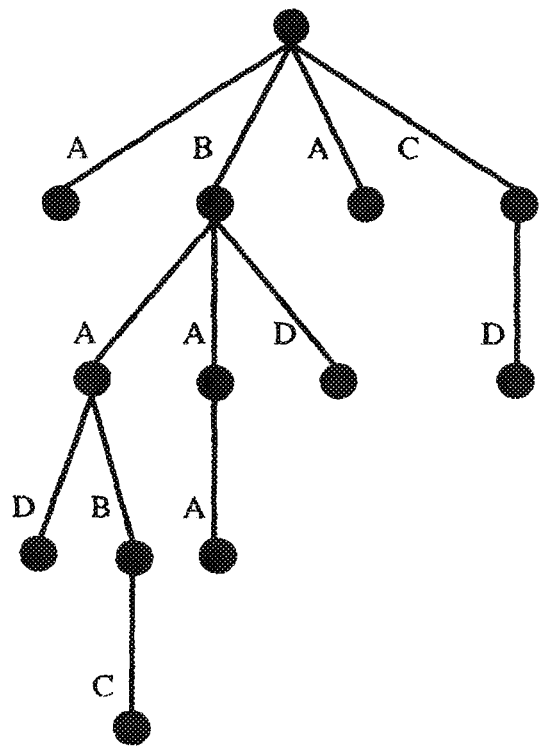
FIG. 4 is a schematic diagram illustrating an embodiment of an unordered edge-labeled tree and a symbolic expression mathematically representing the tree embodiment.

FIG. 4 is schematic diagram illustrating an embodiment of an edge labeled tree, here a 4 valued edge labeled tree. In this particular embodiment, four distinct values are employed to label the edges. Here, the labels comprising A, B, C and D, although, of course, the claimed subject matter is not limited to 4 valued edge labeled trees, to edge labeled trees, or to employing these particular edge labels. It is noted that the labels A, B, C, and D in this embodiment are similar to the labels binary 0 and binary 1 for BELTs. Below tree 400 is a symbolic expression mathematically representing tree 400. Performing the operations indicated by the expression shown in FIG. 4 below tree 400 will provide a natural numeral that corresponds, for this particular embodiment, to this particular tree, as described in more detail hereinafter.

To assist in understanding the relationship between the symbolic expression shown in FIG. 4 and tree 400, for this particular embodiment, FIG. 1 provides an embodiment 110 of another tree. As illustrated, tree 110 comprises an edge label D connecting two nodes. For this particular context, this embodiment may be expressed symbolically as follows: D(1). Thus, a technique to describe the embodiment of tree 110 would refer to the "push" of the natural number 1. Here, for this particular embodiment, this particular push operation comprises the "D" push of 1, resulting in D being the label of the edge connecting the two nodes. More specifically, as previously described, a single node comprises the natural numeral 1 in this particular embodiment. To perform a push operation, an edge is attached to that node and labeled. Here, applying a D push, the label provided comprises the label D.

Figure 3:
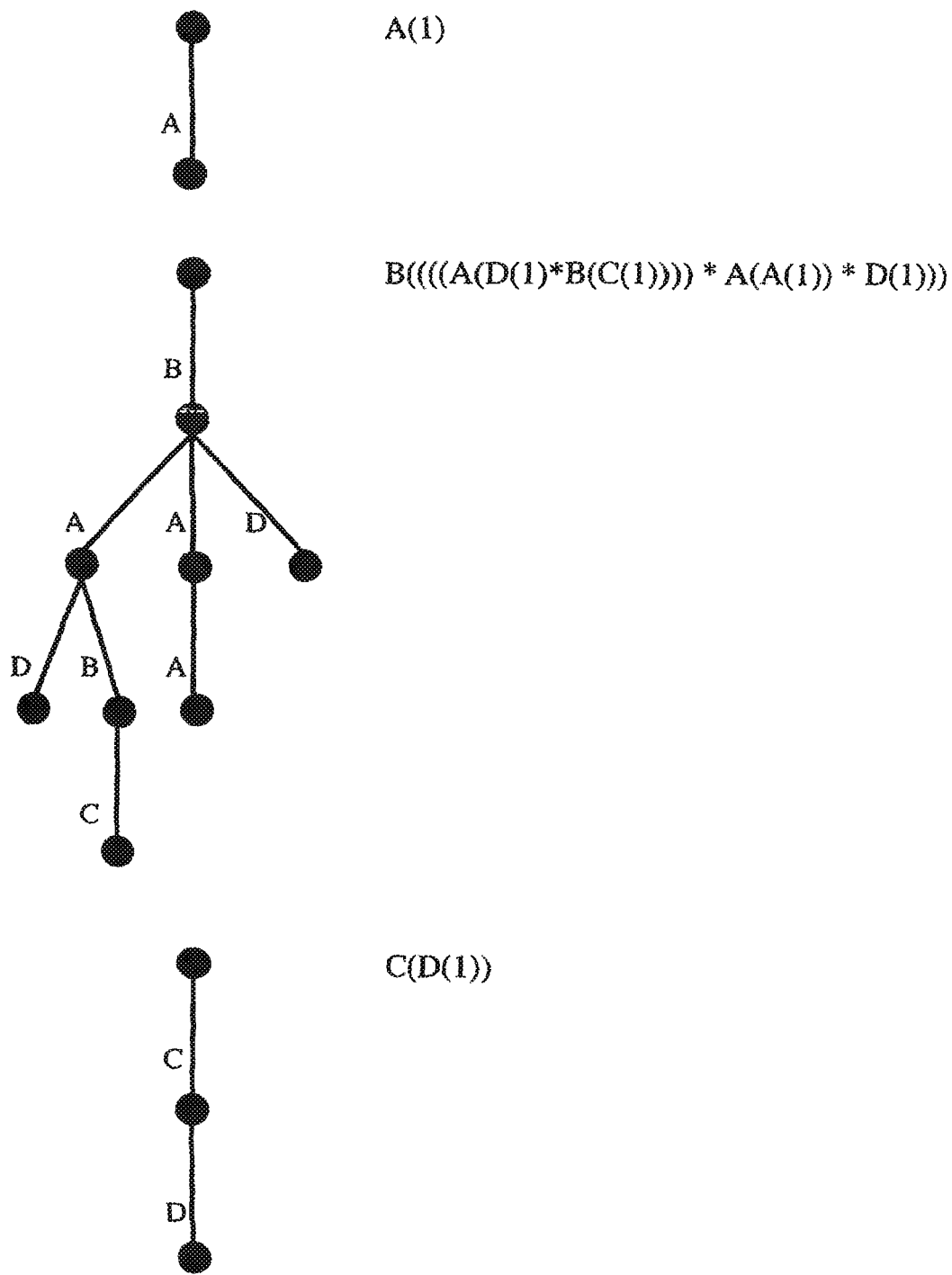
FIG. 3 is a schematic diagram of embodiments of several unordered edge-labeled trees and symbolic expressions mathematically representing the tree embodiments.

Continuing, the "C" push of "1" is illustrated as two nodes with an edge labeled C connecting the two nodes for tree embodiment 120. Applying similar reasoning provides an edge labeled tree embodiment 130 representing the following expression: B(C(1)). Likewise, for this particular embodiment, the operation of merger may be represented as "*", as previously suggested. Thus, applying a merger operation provides tree embodiment 140 at the bottom of FIG. 1 corresponding, for this particular embodiment, to the following expression: (D(1)*B(C(1))). Applying similar reasoning to FIGS. 2 and 3 and the tree embodiments shown ultimately produces tree 400 illustrated in FIG. 4, along with the corresponding symbolic expression.

As the previous discussion suggests, here A, B, C and D comprise monadic operators and the merger operation comprises a binary operation. In U.S. provisional patent application No. 60/575,784, titled "Method and/or System for Simplifying Tree Expressions, such as for Pattern Matching," filed May 28, 2004, by J. J. LeTourneau, assigned to the assignee of the current application, monadic operators similar to those described here were designed as successor operators, using the symbol S(x). Here, these monadic operators comprise multiple successive operators.

Figure 5:
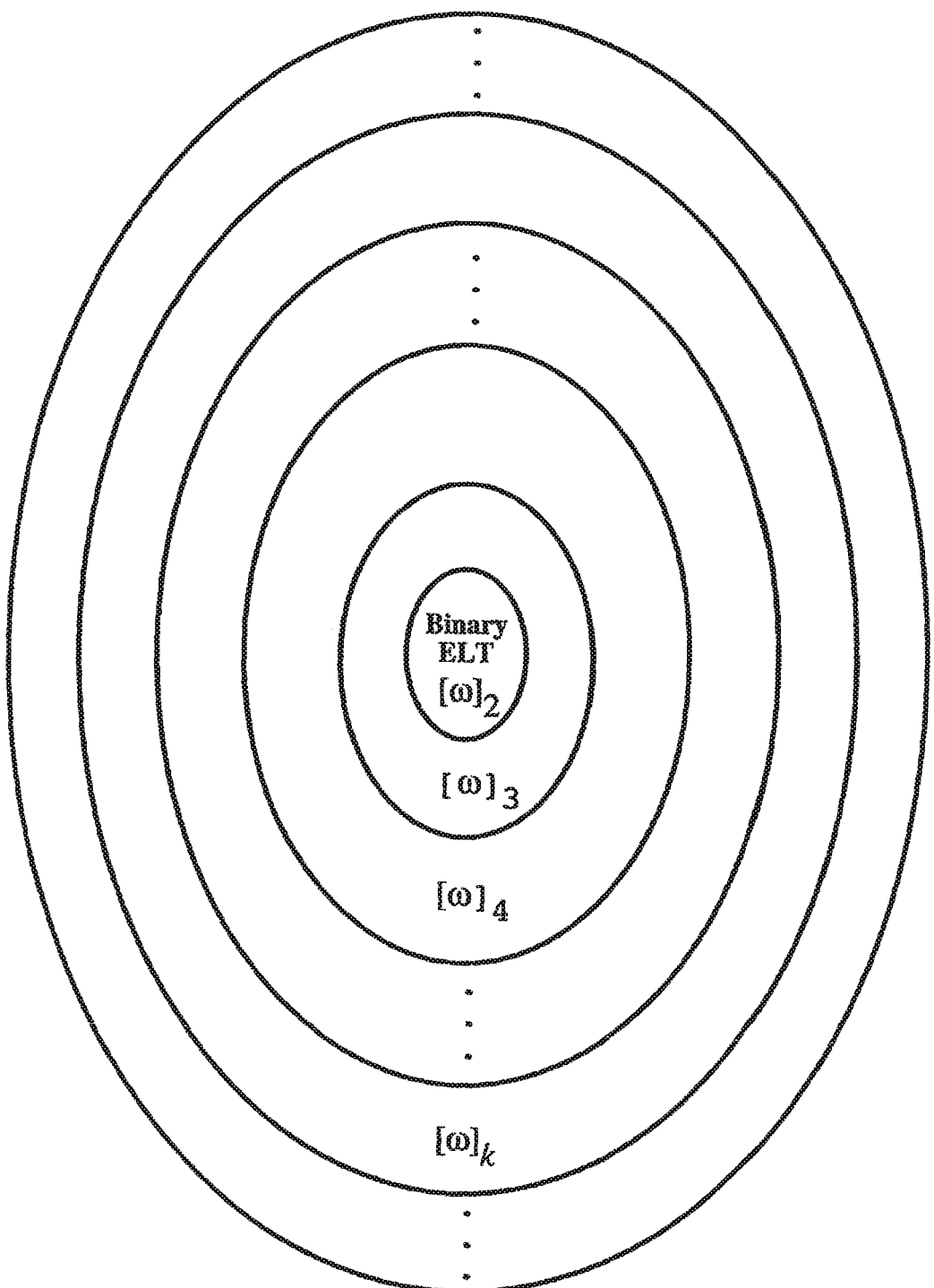
FIG. 5 is a schematic diagram illustrating all N-valued rooted, unordered edge-labeled trees, where N is a natural numeral greater than or equal to 2.

Previously, an embodiment for manipulating binary edge labeled trees or BELTs was described in connection with U.S. provisional patent application 60/543,371. In that context, binary edge labeled trees comprise finite rooted, unordered two valued edge labeled trees. Thus, for the particular embodiment of binary edge labeled trees described, the two values comprise "0" and "1," although alternately they could comprise A and B, for example, or any other two values. Referring now to FIG. 5, a Venn diagram 500 is illustrated providing the set of all edge labeled trees, structured or organized in a particular manner here. In the center of the diagram, binary or two valued edge labeled trees are depicted as a subset. Furthermore, as illustrated, two valued edge labeled trees are also depicted as a subclass or subset of three valued edge labeled trees. Likewise, three valued edge labeled trees are depicted as a subclass or subset of four valued edge labeled trees and so forth. Thus, depending at least in part on the particular set of distinct values employed to label the edges, an edge labeled tree that employs two distinct values may comprise an example of a three valued edge labeled tree in which one of the values is specifically not employed in the particular tree. As shall be explained in more detail hereinafter, this raises a question regarding proper interpretation of the data that the tree may represent or store. More specifically, an identical tree may represent different data depending at least in part on whether the tree is "viewed" as, to continue with this example, a two valued edge labeled tree or a three valued edge labeled tree. Thus, in this embodiment, we refer to this as the "view" of the particular tree. For example, a two valued edge labeled tree is referred to as view 2 and a three valued edge labeled tree is referred to as view 3, although, for example, the particular tree may not contain three different values. The view in this embodiment refers to the set of distinct values from which the labels may be selected, as previously described. FIG. 5 therefore depicts the set of all edge labeled trees as the union of all such edge labeled trees in which the edge values are selected from a set having a specific number of distinct values.

Previously in U.S. provisional application 60/543,371, an embodiment was demonstrated in which an association existed between natural numerals and binary edge labeled trees. For this particular embodiment, similar associations also exist, here between any N valued edge labeled tree and the natural numerals, where N is a numeral. Of course, many different associations are possible and the claimed subject matter is intended to cover all such associations regardless of the particular embodiment. Thus, for example, three valued edge label trees may be converted to numerals, four valued edge labeled trees may be converted to numerals and so forth. Thus, manipulations, such as those previously described, for example, in aforementioned provisional U.S. patent application 60/543,371, as well as additional manipulations, may be applied to N valued edge labeled trees, as described in more detail hereinafter.

As suggested in previously referenced U.S. provisional application 60/543,371, in one particular embodiment, when converting between binary edge labeled trees and numerals, a relationship was found to exist between a "push" operation and non-composite numerals. Thus, in this context, it may be convenient to define an operation indexed by the natural numerals that provides in ascending order the non-composite numerals, although, of course, the claimed subject matter is not limited in scope in this respect. Such an operation is depicted specifically in FIG. 6. As described in more detail hereinafter, this operation is also convenient in this context in connection with edge labeled trees of any number of distinct edge values.

As previously suggested in aforementioned U.S. provisional patent application No. 60/575,784, a set of congruence operations on the set of tree expressions may be isomorphic to the set of finite, rooted, unordered binary edge labeled trees. Thus, or more particularly, under such an isomorphism, in the particular embodiment, a one-to-one relationship between the equivalence classes that satisfy the tree expressions and the finite, rooted, ordered binary edge labeled trees may exist.

Thus, beginning with binary edge labeled trees or finite rooted unordered two valued edge labeled trees, but continuing to edge labeled trees of higher numbers of values, such as, for example, three valued edge labeled trees, four valued edge labeled trees and so forth, for this embodiment, a similar association or relationship between tree expressions and edge labeled trees may be constructed. Thus, for this embodiment, with a set of operations that satisfies a set of tree expressions an isomorphism with a set of finite routed unordered N valued edge labeled trees results in a similar one to one relationship between the equivalence classes that satisfy the tree expressions and the edge labeled trees themselves. Likewise, by demonstrating that these tree expressions are also isomorphic with natural numerals, tree manipulations are able to be constructed for edge labeled trees using natural numerals, as had similarly been done for binary edge labeled trees. Thus, as shall become more clear hereinafter, manipulating tree expressions is isomorphic to manipulating numerals for this particular embodiment.

Previously, binary edge labeled trees have been discussed. For purposes of illustration, it shall instructive to now discuss another type of edge labeled tree, such as four valued edge labeled trees. For example, FIG. 9 corresponds to finite rooted unordered four valued edge labeled trees, which were also discussed previously with respect to FIG. 4. Thus, for this example embodiment, an algebra may be constructed that is isomorphic to the natural numerals for such four valued edge labeled trees. Likewise, similar algebras may be constructed by use a similar set of tree expressions, as shown, for example, by FIGS. 7, 8, 10 and 11. The similarity of these expressions allows us to write a schema or generalized description and thereby cover all such similar algebras.

Thus, similar to an approach previously described, FIG. 9 provides a set of constants and operators here, constants 0 and 1, monadic operators A, B, C, and D and binary operator *. Thus, we designate this algebra with the signature <2,4,1> as a result. The expressions for this particular embodiment are provided in FIG. 9. The first expression, 910, denotes communitivity and the second expression, 920, denotes associativity. Likewise, the next two expressions, 930, define the relationship of the merger of the constants with any other value. The next four expressions, 940, define the monadic operators A, B, C and D.

Thus, for this embodiment, these expressions therefore define a set of edge labeled trees with particular properties. Specifically, the properties are isomorphic to the natural numerals. Thus, as shall be demonstrated further, for this embodiment, four valued edge labeled trees, for example, may be manipulated using natural numerals.

Figure 13:

At least in part because natural numerals are isomorphic to N valued trees, a way to depict this relationship for this embodiment is illustrated by FIGS. 12 and 13. Previously, a particular view for a particular edge labeled tree, for this embodiment, was discussed. In these figures, each column represents a different potential view for a set of edge labeled trees for this embodiment. Likewise, each row provides the edge labeled tree in the view corresponding to the column for the natural number on the left-hand side of FIG. 12.

For example, column one shows the trees with for two valued edge labeled trees edges, otherwise referred to as binary edge labeled trees. Thus, as previously described, no nodes corresponds to "0". Continuing, a single node corresponds to "1" or to "root". Likewise, the numerals two and three in this view turn out to be push operations. In this case, the numeral 2 is the tree corresponding to the A push of one denoted A(1). Likewise, the numeral 3 is the tree corresponding to the B push of one, denoted B(1).

For this embodiment, these relationships may also be confirmed by referring back to FIG. 7. Here, the operations A(x) and B(x) as defined in terms of the function, previously defined in connection with FIG. 6. Thus, using these expressions, to determine the push of 1 denoted A(1), as provided in FIG. 7, this is Q((2*1)−2). This provides Q(0) or the value 2, as demonstrated from FIG. 6. As similar result may be obtained for B(1). Referring to FIG. 7, this corresponds to Q((2*1)−1), or Q(1), again from FIG. 6, the value 3.

A similar relationship may be established for three valued edge labeled trees, described by the expressions provided in FIG. 8, for example. Referring again to FIGS. 12 and 13, the edge labeled trees corresponding to these expressions are depicted in the second column. It is noted that the tree structures using this notation are the same between the first column and the second column for the numerals from zero to four. However, a difference is noted between the first column and the second column at numeral 5. Thus, for view 3, the numeral 5 is the C push of 1. More particularly, again referring to FIG. 8, C(1) equals Q(3*1)−1), or Q(2). From FIG. 6, the corresponding value is 5, as previously suggested. Similarly, looking at column 3 of FIG. 12, for view 5, the D push of 1 is numeral 7.

Thus, for this embodiment, regardless of the "view" of the edge labeled trees, there is a unique one to one correspondence, here, an association embodiment, between the natural numerals and that set of edge labeled trees. This embodiment, therefore, provides the capability to manipulate and combine edge labeled trees of different view. For example, for two edge labeled trees from two different views, one of the edge labeled trees may be converted so that the two edge labeled trees are in the same view. Once in the same view, the trees may be manipulated, such as by a merger, for example. Likewise, in an alternative embodiment, both trees may be converted to numerals, the numerals may be manipulated and then the manipulated numerals may be converted back to edge labeled trees of a particular view. Likewise, the edge labeled trees may be converted to any desirable view.

It is likewise noted that for this particular embodiment one way of manipulation an edge labeled tree is to apply a push operation to the edge labeled tree. Likewise, as previously described, for this embodiment, a push operation comprises adding an edge and labeling it. Assuming for this embodiment that the labels for the edge labeled tree comprise numerals, the label for a particular view will be a numeral that is less than the view itself. For example if the view is 5 than the set of distinct values to label an edge comprises 0, 1, 2, 3 or 4. Of course, this is merely one potential embodiment and the claimed subject matter is not limited in scope in this respect. For example, as previously described, letters may be employed. Likewise, any set of values where each value is distinct may be employed and remain within the scope of the claimed subject matter.

A similar set of manipulations may be applied to node labeled trees rather than edge labeled trees. Thus, node labeled trees may be represented in different views, may be converted to the same view, may be converted to numerals, combined, and converted back to a node labeled tree of a particular view. Likewise, a push operation may be applied to a node labeled tree, as previously described for edge labeled trees.

Although the claimed subject matter is not limited in scope in this respect, one technique for implementing this approach may be to apply a table look up approach. For example, a table providing different embodiments associating different views to natural numerals may be employed. Of course, the claimed subject matter is not limited in scope in this respect. For example, instead, a table look-up may be employed for the operation Q and the expressions previously described may be applied to perform manipulations, such as those previously illustrated, for example.

Techniques for performing table look-ups are well-known and well-understood. Thus, this will not be discussed in detail here. However, it shall be appreciated that any and all of the previously described and/or later described processing, operations, conversions, transformations, manipulations, etc. of strings, trees, numerals, data, etc. may be performed on one or more computing platforms or similar computing devices, such as those that may include a memory to store a table as just described, although, the claimed subject matter is not necessarily limited in scope to this particular approach. Thus, for example, a hierarchy of data, such as a tree as previously described, for example, may be formed. Likewise, operations and/or manipulations, as described, may be performed; however, operations and/or manipulations in addition to those described or instead of those described may also be applied. It is intended that the claimed subject matter cover such embodiments.

As described in prior embodiments, one technique for manipulating edge labeled trees includes converting such trees to natural numerals, performing manipulation of the natural numerals, and converting back to an edge labeled tree of a particular view. Furthermore, as described above, one technique for such conversions may include table look-up, as described above. Likewise, in another embodiment, it may be possible to convert a natural numeral directly to an edge labeled tree using a table look-up for the operation Q, previously described. For example, if it were desirable to convert the natural numeral 61 to an edge labeled tree in view 4, the numeral could be factored and the factors converted to trees. In this example, 61 is a non-composite, so, using a table look-up, Q(17) provides 61. Thus, 61 is a push of 17. Using the expressions provided on FIG. 9, for example, we may determine whether 61 is the A, B, C, or D push of 17 and so forth. Likewise, for this particular embodiment, previously an example of converting between an edge labeled tree of a particular view and a natural numeral was provided.

Embodiments of a method of manipulating tree expressions have a variety of potentially useful applications. As described previously, trees provide a technique for structuring and/or depicting hierarchical data. Thus, for example, trees may be employed to represent language sentence structures, computer programs, algebraic formulae, molecular structures, family relationships and more. For example, one potential application of such a tree reduction technique is in the area of pattern matching See, for example, "A VLSI Architecture for Object Recognition using Tree Matching" K. Sitaraman, N. Ranganathan and A. Ejnioui; Proceedings of the IEEE International Conference on Application-Specific Systems, Architectures, and Processors (ASAP'02) 2000; "Expressive and efficient pattern languages for tree-structured data" by Frank Neven and Thomas Schwentick; Proceedings of the Nineteenth ACM SIGACT-SIGMOD-SIGART Symposium on Principles of Database Systems, May 2000. Thus, in pattern matching, substructures, in the form of a tree, for example, may be located within a larger structure, also in the form of a tree, referred to in this context as the target. This may be accomplished by comparing the structures; however, typically, such a comparison is complex, cumbersome, and/or time consuming.

Of course, the claimed subject matter is not limited to unordered edge labeled trees. For example, as described in previously cited U.S. provisional patent application 60/543, 371, binary edge labeled trees and binary node labeled trees may be employed nearly interchangeably to represent substantially the same hierarchy of data. In particular, a binary node labeled tree may be associated with a binary edge labeled tree where the nodes of the binary node labeled tree take the same values as the edges of the binary edge labeled tree, except that the root node of the binary node labeled tree may comprise a node having a zero value or a null value. Thus, rather than employing edge labeled trees (ELTs), the previously described embodiments may alternatively be performed using node labeled trees (NLTs). One example of a NLT is illustrated in the diagram of FIG. 14 by tree 1400. As one example embodiment, operations and/or manipulations may be employed using edge labeled trees and the resulting edge labeled tree may be converted to a node labeled tree. However, in another embodiment, operations and/or manipulations may be performed directly using node labeled trees.

In accordance with the claimed subject matter, therefore, any tree, regardless of whether it is edge labeled, node labeled, non-binary, a feature tree, or otherwise, may be manipulated and/or operated upon in a manner similar to the approach of the previously described embodiments. Typically, different views shall be employed, depending at least in part, for example, upon the particular type of tree.

Furthermore or alternatively, as described in the previously referenced U.S. provisional patent application 60/543,371, a node labeled tree in which the nodes are labeled with natural numerals or data values may be converted to an edge labeled tree. Furthermore, this may be accomplished with approximately the same amount of storage. For example, for this particular embodiment, this may involve substantially the same amount of node and/or edge data label values. However, for convenience, without intending to limit the scope of the claimed subject matter in any way, here, operations and/or manipulations and the like have been described primarily in the context of ELTs.

In another embodiment, however, a particular tree may include null types or, more particularly, some node values denoted by the empty set. An advantage of employing null types includes the ability to address a broader array of hierarchical data sets. For example, without loss of generality and not intending to limit the scope of the claimed subject matter in any way, a null type permits representing in a database or a relational database, as two examples, situations where a particular attribute does not exist. As may be appreciated, this is different from a situation, for example, where a particular attribute may take on a numeral value of zero. Again, as described in the previously referenced U.S. provisional patent application 60/543,371, a tree with nulls, as described above, may be converted to a tree without nulls; however, the claimed subject matter is not limited in scope in this respect, of course. Thus, it may be desirable to be able to address both situations when representing, operating upon, manipulating and/or searching for patterns regarding hierarchical sets of data.

Likewise, in an alternative embodiment, a node labeled tree, for example, may comprise fixed length tuples of numerals. For such an embodiment, such multiple numerals may be combined into a single numeral, such as by employing Cantor pairing operations, for example. See, for example, *Logical Number Theory, An Introduction*, by Craig Smorynski, pp, 14-23, available from Springer-Verlag, 1991. This approach should produce a tree to which the previously described embodiments may then be applied.

Furthermore, a tree in which both the nodes and the edges are labeled may be referred to in this context as a feature tree and may be converted to an edge labeled tree and/or a node labeled tree. For example, without intending to limit the scope of the claimed subject matter, in one approach, a feature tree may be converted by converting any labeled node with its labeled outgoing edge to an ordered pair of labels for the particular node.

In yet another embodiment, for trees in which data labels do not comprise simply natural numerals, such as, as one example, trees that include negative numerals, such data labels may be converted to an ordered pair of numerals. For example, the first numeral may represent a data type. Examples include a data type such as negative, dollars, etc. As described above, such trees may also be converted to edge labeled trees, for example. However, again, this is provided for purposes of explanation and illustration. The claimed subject matter is not limited in scope to employing the approach of the previously referenced provisional patent application.

It will, of course, be understood that, although particular embodiments have just been described, the claimed subject matter is not limited in scope to a particular embodiment or implementation. For example, one embodiment may be in hardware, such as implemented to operate on a device or combination of devices, for example, whereas another embodiment may be in software. Likewise, an embodiment may be implemented in firmware, or as any combination of hardware, software, and/or firmware, for example. Likewise, although the claimed subject matter is not limited in scope in this respect, one embodiment may comprise one or more articles, such as a storage medium or storage media. This storage media, such as, one or more CD-ROMs and/or disks, for example, may have stored thereon instructions, that when executed by a system, such as a computer system, computing platform, or other system, for example, may result in an embodiment of a method in accordance with the claimed subject matter being executed, such as one of the embodiments previously described, for example. As one potential example, a computing platform may include one or more processing units or processors, one or more input/output devices, such as a display, a keyboard and/or a mouse, and/or one or more memories, such as static random access memory, dynamic random access memory, flash memory, and/or a hard drive. For example, a display may be employed to display one or more queries, such as those that may be interrelated, and or one or more tree expressions, although, again, the claimed subject matter is not limited in scope to this example.

In the preceding description, various aspects of the claimed subject matter have been described. For purposes of explanation, specific numbers, systems and/or configurations were set forth to provide a thorough understanding of the claimed subject matter. However, it should be apparent to one skilled in the art having the benefit of this disclosure that the claimed subject matter may be practiced without the specific details. In other instances, well-known features were omitted and/or simplified so as not to obscure the claimed subject matter. While certain features have been illustrated and/or described herein, many modifications, substitutions, changes and/or equivalents will now occur to those skilled in the art. It is, therefore, to be understood that the appended claims are intended to cover all such modifications and/or changes as fall within the true spirit of the claimed subject matter.

The invention claimed is:

1. A method of arranging database content comprising:
    manipulating one or more labeled complex two-dimensional graphical hierarchies, in which the one or more labeled complex two-dimensional graphical hierarchies comprise one or more labeled tree hierarchies;
    wherein the method of arranging database content comprises:
    executing instructions on one or more processors of one or more computing devices comprising:
    converting a first labeled tree hierarchy in a first view to the first labeled tree hierarchy in a second view; and
    combining the first labeled tree hierarchy in the first view and the first labeled tree hierarchy in the second view to form a combined labeled tree hierarchy, wherein the first view is different from the second view.

2. The method of claim 1, wherein the converting comprises accessing a data structure stored on one or more physical memory devices to identify one or more numerical signal values associated with the first labeled tree hierarchy in the first view.

3. The method of claim 2, wherein the accessing the data structure stored on the one or more physical memory devices comprises performing a table look up operation to determine the one or more numerical signal values associated with the first labeled tree hierarchy in the first view.

4. The method of claim 1, comprising comparing one or more numerical signal values associated with the first labeled tree hierarchy in the first view and one or more other numerical signal values stored in a database, or a portion thereof, to detect a presence of the one or more numerical signal values, wherein a correspondence is indicative of a presence of content stored in the database, or the portion thereof, corresponding to the one or more numerical signal values and is indicative of one or more locations thereof in the database, or the portion thereof.

5. The method of claim 1, comprising generating an association between one or more labeled tree hierarchies and one or more numerical signal values;
wherein the generating the association comprises associating the first labeled tree hierarchy in the first view with at least one numerical signal value.

6. The method of claim 1, wherein the one or more labeled tree hierarchies comprise one or more labeled tree hierarchies having one or more associated numerical signal values.

7. The method of claim 1, wherein the one or more labeled tree hierarchies comprise one or more edge-labeled tree (ELT) hierarchies having one or more associated numerical signal values.

8. The method of claim 1, wherein the one or more labeled tree hierarchies comprise one or more node-labeled tree (NLT) hierarchies having one or more associated numerical signal values.

9. The method of claim 1, wherein the converting comprises associating the first labeled tree hierarchy in the first view and/or the first labeled tree hierarchy in the second view using one or more numerical signal values via a look up table.

10. The method of claim 1, wherein the converting the first labeled tree hierarchy in the first view to the first labeled tree hierarchy in the second view comprises using one or more numerical signal values associated with the view of the first labeled tree hierarchy via a look up table.

11. An apparatus comprising:
one or more processors coupled to one or more physical memory devices to store executable instructions and to store binary digital signal quantities, as physical memory states, wherein the executable instructions are to be accessible from the one or more physical memory devices for execution by the one or more processors;
wherein the one or more processors are to store in at least one of the physical memory devices, binary signal quantities, if any, that are to result from execution of the instructions on the one or more processors, wherein the one or more physical memory devices are also to store a database, or a portion thereof, wherein the executable instructions are to arrange database content;
wherein the instructions to arrange database content are executable to:
convert a first labeled tree hierarchy in a first view to the first labeled tree hierarchy in a second view; and
combine the first labeled tree hierarchy in the first view and the first labeled tree hierarchy in the second view to form a combined labeled tree hierarchy, wherein the first view is to be different from the second view.

12. The apparatus of claim 11, wherein the instructions to arrange database content comprise executable instructions to access a data structure in the database, or the portion thereof, to identify one or more numerical signal values to be associated with the first labeled tree hierarchy in the first view.

13. The apparatus of claim 12, wherein the instructions to access the data structure comprise executable instructions to perform a table look up operation to determine the one or more numerical signal values to be associated with the first labeled tree hierarchy in the first view.

14. The apparatus of claim 11, wherein the instructions to arrange database content comprise executable instructions to compare one or more numerical signal values to be associated with the first labeled tree hierarchy in the first view and one or more other numerical signal values to be stored in the database, or the portion thereof, to detect a presence of the one or more numerical signal values, wherein a correspondence is to be indicative of a presence of content in the database, or the portion thereof, to correspond to the one or more numerical signal values and is to be indicative of one or more locations thereof in the database, or the portion thereof.

15. The apparatus of claim 11, wherein the instructions to arrange database content comprise executable instructions to generate an association between the first labeled tree hierarchy and the combined labeled tree hierarchy and one or more numerical signal values;
wherein the executable instructions to generate the association comprise executable instructions to associate the first labeled tree hierarchy in the first view with at least one numerical signal value.

16. The apparatus of claim 11, wherein the instructions to arrange database content comprise executable instructions so that the first labeled tree hierarchy and the combined labeled tree hierarchy are to comprise one or more labeled tree hierarchies to have one or more associated numerical signal values.

17. The apparatus of claim 11, wherein the instructions to arrange database content comprise executable instructions so that the first labeled tree hierarchy and the combined labeled tree hierarchy are to comprise one or more edge-labeled tree (ELT) hierarchies to have one or more associated numerical signal values.

18. The apparatus of claim 11, wherein the instructions to arrange database content comprise executable instructions so that the first labeled tree hierarchy and the combined labeled tree hierarchy are to comprise one or more node-labeled tree (NLT) hierarchies to have one or more associated numerical signal values.

19. The apparatus of claim 11, wherein the instructions to convert the first labeled tree hierarchy in the first view to the first labeled tree hierarchy in the second view are executable to: associate the first labeled tree hierarchy in the first view and/or the first labeled tree hierarchy in the second view with one or more numerical signal values via a look up table.

20. The apparatus of claim 11, wherein the instructions to convert the first labeled tree hierarchy in the first view to the first labeled tree hierarchy in the second view are executable to: convert the first labeled tree hierarchy in the first view to the first labeled tree hierarchy in the second view substantially in accordance with one or more numerical signal values associated with the view of the first labeled tree hierarchy via a look up table.

21. An article comprising: a non-transitory storage medium that includes executable instructions stored thereon; wherein the instructions are executable by one or more processors to be coupled to one or more physical memory devices;
wherein the one or more physical memory devices are to store a database, or a portion thereof, wherein the executable instructions are to arrange database content;
wherein the instructions to arrange database content are to:

convert a first labeled tree hierarchy in a first view to the first labeled tree hierarchy in a second view; and combine the first labeled tree hierarchy in the first view and the first labeled tree hierarchy in the second view to form a combined labeled tree hierarchy, wherein the first view is to be different from the second view.

22. The article of claim 21, wherein the instructions to arrange database content comprise executable instructions to access a data structure in the database, or the portion thereof, to identify one or more numerical signal values to be associated with the first labeled tree hierarchy in the first view.

23. The article of claim 22, wherein the instructions to access the data structure comprise executable instructions to perform a table look up operation to determine the one or more numerical signal values to be associated with the first labeled tree hierarchy in the first view.

24. The article of claim 21, wherein the instructions to arrange database content comprise executable instructions to compare one or more numerical signal values to be associated with the first labeled tree hierarchy in the first view and one or more other numerical signal values to be stored in the database, or the portion thereof, to detect a presence of the one or more numerical signal values, wherein a correspondence is to be indicative of a presence of content in the database, or the portion thereof, to correspond to the one or more numerical signal values and is to be indicative of one or more locations thereof in the database, or the portion thereof.

25. The article of claim 21, wherein the instructions to arrange database content comprise executable instructions to generate an association between the first labeled tree hierarchy and the combined labeled tree hierarchy and one or more numerical signal values;

wherein the executable instructions to generate the association are to comprise executable instructions to associate the first labeled tree hierarchy in the first-view with at least one numerical signal value.

26. The article of claim 21, wherein the instructions to arrange database content comprise executable instructions so that the first labeled tree hierarchy and the combined labeled tree hierarchy are to comprise one or more labeled tree hierarchies to have one or more associated numerical signal values.

27. The article of claim 21, wherein the instructions to arrange database content comprise executable instructions so that the first labeled tree hierarchy and the combined labeled tree hierarchy are to comprise one or more edge-labeled tree (ELT) hierarchies to have one or more associated numerical signal values.

28. The article of claim 21, wherein the instructions to arrange database content comprise executable instructions so that the first labeled tree hierarchy and the combined labeled tree hierarchy are to comprise one or more node-labeled tree (NLT) hierarchies to have one or more associated numerical signal values.

29. The article of claim 21, wherein the instructions to convert the first labeled tree hierarchy in the first view to the first labeled tree hierarchy in the second view are executable to: associate the first labeled tree hierarchy in the first view and/or the first labeled tree hierarchy in the second view with one or more numerical signal values via a look up table.

30. The article of claim 21, wherein the instructions to convert the first labeled tree hierarchy in the first view to the first labeled tree hierarchy in the second view are executable to: convert the first labeled tree hierarchy in the first view to the first labeled tree hierarchy in the second view substantially in accordance with one or more numerical signal values associated with the view of the first labeled tree hierarchy via a look up table.

* * * * *